United States Patent
Fu et al.

(10) Patent No.: US 11,843,937 B2
(45) Date of Patent: Dec. 12, 2023

(54) METHOD AND APPARATUS FOR TRANSMITTING UPLINK INFORMATION

(71) Applicant: Samsung Electronics Co., Ltd., Suwon-si (KR)

(72) Inventors: Jingxing Fu, Beijing (CN); Qi Xiong, Beijing (CN); Chen Qian, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/968,840

(22) PCT Filed: Feb. 12, 2019

(86) PCT No.: PCT/KR2019/001659
§ 371 (c)(1),
(2) Date: Aug. 10, 2020

(87) PCT Pub. No.: WO2019/156527
PCT Pub. Date: Aug. 15, 2019

(65) Prior Publication Data
US 2021/0007139 A1    Jan. 7, 2021

(30) Foreign Application Priority Data

Feb. 12, 2018 (CN) .......................... 201810145762.9
Feb. 13, 2018 (CN) .......................... 201810151467.4
(Continued)

(51) Int. Cl.
H04W 74/08   (2009.01)
H04W 72/1268   (2023.01)
(Continued)

(52) U.S. Cl.
CPC ..... *H04W 74/0808* (2013.01); *H04L 41/0896* (2013.01); *H04W 72/1268* (2013.01); *H04W 72/23* (2023.01); *H04W 72/0453* (2013.01)

(58) Field of Classification Search
CPC .......... H04W 72/042; H04W 74/0808; H04W 72/1268; H04W 72/0453
See application file for complete search history.

(56) References Cited

U.S. PATENT DOCUMENTS 8,730,924 B2   5/2014   Kazmi et al.
9,392,595 B2   7/2016   Guan et al.
(Continued)

FOREIGN PATENT DOCUMENTS

CN   101536446 A   9/2009
CN   102098765 A   6/2011
(Continued)

OTHER PUBLICATIONS

Notification of Transmittal of the International Search Report and the Written Opinion of the International Searching Authority, or the Declaration dated Jun. 14, 2019, in connection with International Patent Application No. PCT/KR2019/001659, 10 pages.
(Continued)

*Primary Examiner* — James P Duffy

(57) ABSTRACT

The present disclosure provides a method for transmitting uplink information, including: determining a frequency band for carrier sensing and an allocation manner of uplink frequency domain resources by receiving a signaling or by predefining via a protocol; performing carrier sensing at the determined frequency band for carrier sensing; and transmitting uplink information in uplink frequency domain resources determined according to the allocation manner of uplink frequency domain resources when a carrier is idle.

(Continued)

The present disclosure also provides a user equipment for transmitting uplink information.

12 Claims, 46 Drawing Sheets

(30) Foreign Application Priority Data

May 10, 2018 (CN) .......................... 201810444664.5
Oct. 31, 2018 (CN) .......................... 201811289799.5

(51) Int. Cl.
*H04W 72/23* (2023.01)
*H04W 72/0453* (2023.01)
*H04L 41/0896* (2022.01)

(56) References Cited

U.S. PATENT DOCUMENTS

| | | | |
|---|---|---|---|
| 2011/0222489 A1* | 9/2011 | Awad | H04L 5/0053 370/329 |
| 2013/0128847 A1 | 5/2013 | Wang et al. | |
| 2014/0036853 A1 | 2/2014 | Kim et al. | |
| 2014/0328260 A1 | 11/2014 | Papasakellariou et al. | |
| 2015/0131536 A1 | 5/2015 | Kaur et al. | |
| 2016/0050667 A1 | 2/2016 | Papasakellariou et al. | |
| 2016/0262176 A1 | 9/2016 | Moulsley et al. | |
| 2016/0345181 A1 | 11/2016 | Bendlin et al. | |
| 2017/0273056 A1 | 9/2017 | Papasakellariou | |
| 2017/0280476 A1* | 9/2017 | Yerramalli | H04W 72/0453 |
| 2019/0110307 A1 | 4/2019 | Kim et al. | |
| 2019/0394798 A1* | 12/2019 | Tomeba | H04W 72/1268 |
| 2020/0136701 A1 | 4/2020 | Kim et al. | |
| 2020/0413430 A1 | 12/2020 | Kim et al. | |
| 2022/0377712 A1 | 11/2022 | Von Elbwart et al. | |

FOREIGN PATENT DOCUMENTS

| | | |
|---|---|---|
| CN | 102412947 A | 4/2012 |
| CN | 102781111 A | 11/2012 |
| CN | 103024807 A | 4/2013 |
| CN | 103733711 A | 4/2014 |
| CN | 103873212 A | 6/2014 |
| CN | 105682241 A | 6/2016 |
| CN | 107113787 A | 8/2017 |
| WO | 2012019361 A1 | 2/2012 |
| WO | 2012155436 A1 | 11/2012 |
| WO | 2016/163973 A1 | 10/2016 |
| WO | 2017015787 A1 | 2/2017 |
| WO | 2017020761 A1 | 2/2017 |
| WO | 2017/171325 A1 | 10/2017 |
| WO | 2017194022 A1 | 11/2017 |
| WO | 2018/004211 A1 | 1/2018 |

OTHER PUBLICATIONS

Supplementary European Search Report dated Dec. 17, 2020 in connection with European Patent Application No. 19 75 0423, 9 pages.
Intellectual Property India, "Examination report under sections 12 & 13 of the Patents Act," dated Apr. 19, 2022, in connection with Indian Patent Application No. 202027034355, 7 pages.
European Patent Office, "Communication pursuant to Article 94(3) EPC," dated Sep. 19, 2022, in connection with European Patent Application No. 19750423.6, 8 pages.
China National Intellectual Property Administration, "Office Action," dated Mar. 31, 2023, in connection with China Patent Application No. 201810444664.5, 23 pages.
China National Intellectual Property Administration, "Office Action," dated Apr. 20, 2023, in connection with China Patent Application No. 201810145762.9, 19 pages.
China National Intellectual Property Administration, "Office Action," dated Apr. 20, 2023, in connection with China Patent Application No. 201811289799.5, 16 pages.
Fujitsu, "Discussion on time domain resource allocation," 3GPP TSG RAN WG1 NR Ad-Hoc#2 R1-1710238, Qingdao, P.R. China Jun. 27-30, 2017, 3 pages.
Nokia et al., "On resource allocation in frequency domain for PDSCH and PUSCH in NR," 3GPP TSG RAN WG1 Ad Hoc Meeting #2 R1-1710989, Qingdao, China, Jun. 27-30, 2017, 4 pages.
InterDigital, Inc., "Bandwidth Adaptation via BWP Selection in NR," 3GPP TSG RAN WG1 NR Ad-Hoc #2 R1-1710878, Qingdao, China, Jun. 27-30, 2017, 3 pages.
Vivo, "Discussion on the activation/deactivation of the bandwidth part," 3GPP TSG RAN WG1 Meeting#90 R1-1712870, Prague, Czech Republic, Aug. 21-25, 2017, 3 pages.
InterDigital, Inc., "Remaining details of BWP," 3GPP TSG RAN WG1 Meeting #90 R1-1714117 Prague, Czech Republic, Aug. 21-25, 2017, 4 pages.
Samsung, "PUCCH resource configuration for bandwidth restricted UE," 3GPP TSG RAN WG1 Meeting #90 R1-1714539, Prague, Czechia Aug. 21-25, 2017, 3 pages.
Apple Inc., "BWP of Size Zero for UE Power Saving," 3GPP TSG-RAN WG1 #91 R1-1720546, Reno, US, Nov. 27-Dec. 1, 2017, 6 pages.
Huawei et al., "MAC impact of bandwidth part activation/deactivation," 3GPP TSG-RAN WG2#99bis Meeting R2-1711441, Prague, Czech Republic, Oct. 9-13, 2017, 3 pages.
ZTE, "Discussion on user plane bearer mapping and comparison," 3GPP TSG-RAN WG2#103bis, Chengdu, China Oct. 8-12, 2018, 6 pages.

* cited by examiner

METHOD AND APPARATUS FOR TRANSMITTING UPLINK INFORMATION

CROSS-REFERENCE TO RELATED APPLICATIONS

This application is a 371 of International Application No. PCT/KR2019/001659 filed on Feb. 12, 2019, which claims priority to Chinese Patent Application No. 201810145762.9 filed on Feb. 12, 2018, Chinese Patent Application No. 201810151467.4 filed on Feb. 13, 2018, Chinese Patent Application No. 201810444664.5 filed on May 10, 2018 and Chinese Patent Application No. 201811289799.5 filed on Oct. 31, 2018, the disclosures of which are herein incorporated by reference in their entirety.

FIELD

The present disclosure relates to the field of wireless communication technologies, and in particular, to a method and a user equipment for transmitting uplink information, to a method and equipment for determining an activation state of bandwidth part, and to a method and a device for transmitting signals.

DESCRIPTION OF RELATED ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

In the New Radio (NR) air interface system, the bandwidth of the carrier is relatively large. Some UEs have limited bandwidth capability and can only transmit or receive control information and data in a part of the bandwidth of the carrier's frequency domain, while some UEs have strong bandwidth capability and can transmit or receive control information and data in the entire bandwidth of the carrier's frequency domain. The bandwidth capability of the UE referred to herein refers to the maximum bandwidth at which the UE can simultaneously receive or transmit data in the frequency domain. For example, some UEs have a bandwidth capacity of 20 MHz, and some UEs have a bandwidth capacity of 5 MHz. For a UE with poor bandwidth capability, in order to improve the user's frequency diversity performance, the user may work in a limited frequency band with good performance in different time. A limited frequency band is referred to as a bandwidth part (BWP). That is, the UE may receive and transmit control information and data in different BWPs at different times.

As the contradiction between users' explosive demand for broadband wireless services and scarcity of spectrum resources becomes increasingly acute, mobile operators have begun to consider the unlicensed band (also known as the unauthorized band) as a supplement to the licensed band. The 3rd Generation Partnership Project (3GPP) has determined that by using the scheme of effective carrier aggregation of unlicensed band and license band, the spectrum utilization rate of the whole network is effectively improved under the premise of ensuring no significant impact on other technologies in the unlicensed frequency band.

Unlicensed bands have generally been allocated for some other purpose, such as radar or 802.11 series Wireless Fidelity (WiFi). Therefore, the interference level has uncertainty in the unlicensed frequency band, which makes the quality of service (QoS) of LTE transmission generally difficult to guarantee. However, the unlicensed bands can be used for data transmission with low QoS requirements. Here, the Long Term Evolution (LTE) system of the secondary cell deployed on the unlicensed bands is referred to as a Licensed Assisted Access (LAA) system. In the unlicensed bands, how to avoid mutual interference between the LAA system and other wireless systems such as radar or WiFi is a key issue. Carrier Sensing (or Clear Channel Assessment, CCA) is a collision avoidance mechanism commonly used in unlicensed bands. A mobile station (STA) must detect the radio channel before transmitting signals, and can only occupy the radio channel to transmit signals when it detects that the radio channel is idle. LAA also follows a similar mechanism to ensure less interference with other signals. The LAA device (for example, the base station or the user terminal) dynamically switches on or off according to the carrier sensing result, that is, if the channel is detected to be idle, it transmits signals, and if the channel is busy, it does not transmit. In the LAA system, the bandwidth of the frequency band at which the UE performs CCA is the bandwidth of the carrier, and the bandwidth capability of all the UEs is greater than or equal to the bandwidth of the carrier. Therefore, all UEs perform CCA on the entire bandwidth of the carrier.

However, in the NR system, the bandwidth capability of some UEs is greater than or equal to the bandwidth of the carrier, and the bandwidth capability of some UEs is smaller than the bandwidth of the carrier. In this system, how to perform carrier sensing for different UEs is a problem to be solved.

In the New Radio (NR) air interface system, the User Equipment (UE) can receive downlink control signaling and data only in a part of the bandwidth of a large frequency-domain bandwidth. This is because the bandwidth capacity for frequency-domain processing of the UE is limited, and the system bandwidth is relatively large. The bandwidth capacity of the UE refers to the maximum bandwidth in which the UE can receive data in the frequency domain at the same time. For example, some UEs have a bandwidth capacity of 20 MHz. In order to improve the frequency diversity performance of the UE, the UE may work in limited frequency band with different good performance at different times. As shown in FIG. 16, the limited frequency band shown by the shadow is referred as to a Bandwidth Part (BWP). When the UE moves from one BWP in the time-domain position n to another BWP in the time-domain position n+1, an adjustment time is required, and the UE is unable to receive data normally in this adjustment time interval, as shown in FIG. 17.

If the UE is configured to receive a Physical Downlink Control Channel (PDCCH) and a Physical Downlink Shared Channel (PDSCH) in multiple downlink BWPs, the downlink BWPs in which the UE is receiving the PDCCH and the PDSCH are referred as to the active downlink BWPs of the UE. If the UE can only receive the PDCCH and the PDSCH in one downlink BWP at the same time, it is said that the UE has only one active downlink BWP (DL BWP), and if the UE can receive the PDCCH and the PDSCH in multiple DL BWPs at the same time, it is said that the UE has multiple active DL BWPs.

When the UE may have multiple active DL BWPs, the technical solutions of the determining of the activation state of DL BWP and dynamically switching between the active DL BWP and inactive DL BWP are not disclosed in the published literature, therefore, it cannot be ensured that the UE can receive the control signaling and data on multiple active DL BWPs with good performances, which affects the overall performance of the system.

In view of the above, it is necessary to provide a method and equipment for determining the activation state of bandwidth part capable of solving the above technical problems.

A transmission performed in a wireless communication system includes a transmission from a base station (gNB) to a user equipment (UE) (referred to as a downlink transmission), of which a corresponding time slot is called a downlink time slot, and a transmission from a user equipment (UE) to a base station (referred to as an uplink transmission), of which a corresponding time slot is called an uplink time slot.

In the downlink communication of the wireless communication system, a reliability of receiving downlink data is ensured by a Hybrid Automatic Repeat Request (HARQ) technique. Downlink data is transmitted from the base station to the UE through a Physical Downlink Shared Channel (PDSCH), and the UE informs the base station, by transmitting a Hybrid Automatic Repeat Request-Acknowledgement (HARQ-ACK) feedback information, whether the UE correctly received the PDSCH. The HARQ-ACK information is transmitted from the UE to the base station through a Physical Uplink Control Channel (PUCCH).

For each transmission block (TB) in the received PDSCH, or the received Physical Downlink Control Channel (PDCCH) indicating the release of the Semi-Persistent Scheduling (SPS) (hereinafter, the above two are collectively referred to as a downlink HARQ transmission), the UE is required to feed ACK (correct reception) bits or NACK (error reception or loss) bits (which are hereinafter collectively referred to as HARQ-ACK bits) back to the base station through a corresponding uplink subframe. If the gNB received the NACK bits, the transmission block corresponding to the NACK or the PDCCH indicating the release of the SPS would be retransmitted.

In a new radio (NR) communication system, the performance of a random access directly affects the user's experience before establishing a radio resource control, such as during the random access procedure. In a conventional wireless communication system, such as LTE and LTE-Advanced, the random access procedure is applied to a plurality of scenarios such as an establishment of an initial link, a cell handover, a re-establishment of an uplink, and an RRC connection re-establishment, etc., and divided into a contention-based random access and a contention-free random access according to whether the user monopolizes a preamble sequence resource. In the contention-based random access, since each user selects a preamble sequence from the same preamble sequence resources during the process of attempting to establish the uplink, and multiple users may select the same preamble sequence to send to the base station, conflict resolution mechanism is an important research direction in the random access, and it is a key indicator affecting the performance of the random access how to reduce a probability of the conflict and how to quickly resolve the conflict that has already occurred.

The contention-based random access procedure in LTE-A is divided into four steps, as illustrated in FIG. 41. In the first step, the user randomly selects a preamble sequence from a preamble sequence resource pool and sends the selected sequence to the base station. The base station performs a correlation detection on the received signal to identify the preamble sequence sent by the user. In the second step, the base station sends random access responses (RARs) to the user, including a random access preamble sequence identifier, a timing advance instruction determined based on the delay estimate between the user and the base station, a Cell-Radio Network Temporary Identifier (C-RNTI), and a time-frequency resource allocated for the next uplink transmission of the user. In the third step, the user sends a third message (Msg3) to the base station according to information in the RAR. The Msg3 includes information such as a user terminal identifier and an RRC link request, etc., where the user terminal identifier is a unique to the user and is used to resolve the conflict. In the fourth step, the base station sends a conflict resolution identifier to the user, including a user terminal identifier of the user who wins in the conflict resolution. After detecting his or her identification, the user upgrades a temporary C-RNTI to a C-RNTI, sends an ACK signal to the base station to complete the random access procedure and waits for the scheduling of the base station. Otherwise, the user will start a new random access procedure after a period of time delay.

For the contention-free random access procedure, the preamble sequence can be assigned to the user since the base station knows the user identification. Therefore, when transmitting the preamble sequence, the user does not need to randomly select the sequence, but uses the assigned preamble sequence. After detecting the assigned preamble sequence, the base station sends a corresponding random access response, including information such as a timing advance and an uplink resource allocation, etc. After receiving the random access response, the user considers that uplink synchronization has been completed and waits for further scheduling of the base station. Therefore, the contention-free random access procedure only includes two steps: S1 is a step of sending a preamble sequence; and S2 is a step of sending a random access response.

The random access procedure in LTE is applicable to the following scenarios:
1. Initial access under RRC_IDLE;
2. Re-establishing the RRC connection;
3. Cell handover;
4. In the RRC connection state, the downlink data arrives and requests a random access procedure (when the uplink is in a non-synchronous manner);
5. In the RRC connection state, the uplink data arrives and requests a random access procedure (when the uplink is in the non-synchronous manner, or a scheduling request is not allocated with a resource from the PUCCH resource);
6. Positioning.

In the LTE, the above six scenarios use the same random access procedure.

When the UE transmits the HARQ-ACK feedback information through the PUCCH, the UE needs to know the PUCCH resource for transmitting the HARQ-ACK. However, when the UE is before RRC being connected, when the system uses the compact PDCCH format to schedule uplink resources or downlink resources, there is no good solution for setting the redundancy version and setting the transmission power control, and the like, and it needs to be solved.

SUMMARY

A method for transmitting uplink information is provided. The method comprises: determining a frequency band for carrier sensing and an allocation manner of uplink frequency domain resources by receiving a signaling or by predefining via a protocol; performing carrier sensing at the determined frequency band for carrier sensing; and transmitting uplink information in uplink frequency domain resources determined according to the allocation manner of uplink frequency domain resources when a carrier is idle. A user equipment for transmitting uplink information is also provided.

BRIEF DESCRIPTION OF THE DRAWINGS

In order to more clearly illustrate technical solutions in embodiments of the present disclosure, the attached drawings, which are to be used in the descriptions of the embodiments, will be briefly described below. It is apparent that the attached drawings in the following descriptions are merely examples of the present disclosure, and other drawings may be obtained by those skilled in the art based on these drawings without creative efforts.

DETAILED DESCRIPTION

Figure 1:
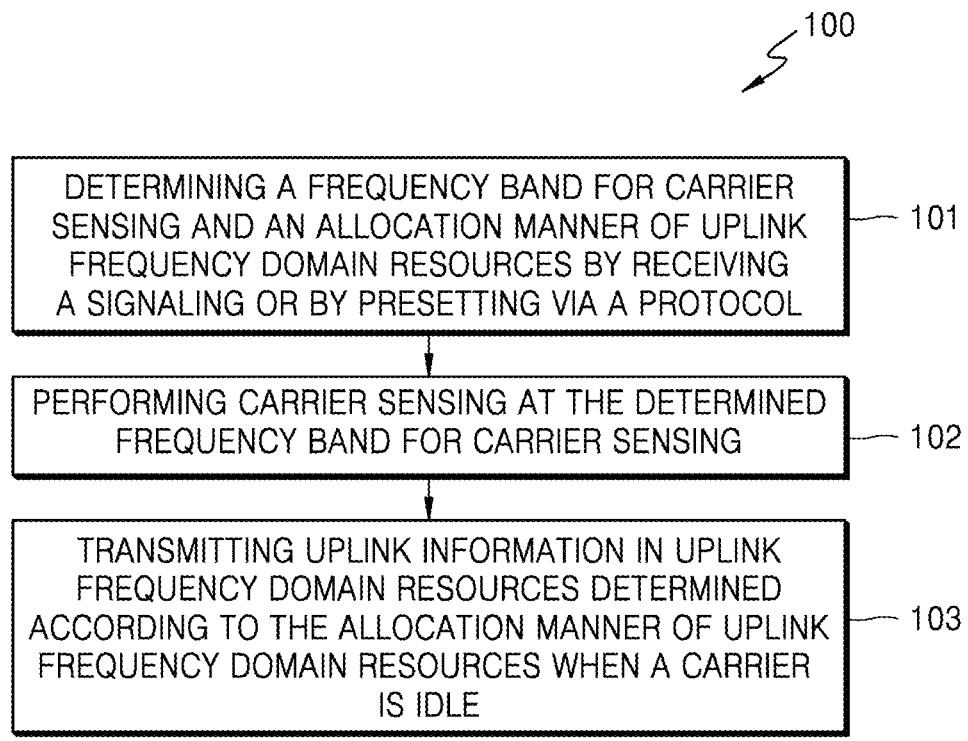
FIG. 1 illustrates a schematic flowchart of a method for transmitting uplink information according to an embodiment of the present disclosure.

In view of this, an object of the present disclosure is to provide a method and a user equipment for transmitting uplink information (for example, control information and data) capable of solving the above technical problem.

In order to achieve the above object, in one aspect, an embodiment of the present disclosure provides a method for transmitting uplink information comprising the following steps: determining a frequency band for performing carrier sensing and an allocation manner of uplink frequency domain resources by receiving a signaling; performing carrier sensing at the determined frequency band for performing carrier sensing; and transmitting uplink information in uplink frequency domain resources determined according to the allocation manner of uplink frequency domain resources when a carrier is idle.

In accordance with an embodiment of the present disclosure, the signaling comprises a user equipment (UE)-specific higher layer signaling, and a physical layer signaling, or a combination of a higher layer signaling and a physical layer signaling, or system information.

In accordance with an embodiment of the present disclosure, the physical layer signaling comprises information in Downlink Control Information (DCI).

In accordance with an embodiment of the present disclosure, the determining the frequency band for performing carrier sensing and the allocation manner of uplink frequency domain resources by receiving the signaling comprises: determining a bandwidth of the frequency band and a frequency band position at which UE performs carrier sensing by receiving a UE-specific higher layer signaling, and then obtaining the allocation manner of uplink frequency domain resources.

In accordance with an embodiment of the present disclosure, the determining the frequency band for performing carrier sensing by receiving the signaling comprises: determining a bandwidth of the frequency band and a plurality of frequency band positions at which UE performs carrier sensing by receiving a UE-specific higher layer signaling; and determining a frequency band position at which UE performs carrier sensing among the plurality of frequency band positions by receiving a physical layer signaling or a medium access layer signaling.

In accordance with an embodiment of the present disclosure, the determining the frequency band position at which UE performs carrier sensing among the plurality of frequency band positions by receiving the physical layer signaling or the medium access layer signaling comprises: indicating the frequency band position at which UE performs carrier sensing by a new field in a Downlink Control Information (DCI) in which a Physical Uplink Shared Channel (PUSCH) is scheduled, a redundant field in the DCI, or other fields reinterpreted in the DCI; or determining the frequency band position at which UE performs carrier sensing by frequency domain resources allocated by a frequency resource allocation field in the DCI in which the PUSCH is scheduled.

In accordance with an embodiment of the present disclosure, the determining the frequency band for performing carrier sensing by receiving the signaling comprises: configuring a plurality of bandwidths of the frequency bands and a plurality of frequency band positions at which UE performs carrier sensing by receiving a UE-specific higher layer signaling; and determining a bandwidth of the frequency band and a frequency band position at which UE performs carrier sensing among the plurality of bandwidths of the frequency bands and the plurality of frequency band positions by receiving a physical layer signaling.

In accordance with an embodiment of the present disclosure, the method further comprises: for a bandwidth of the frequency band for carrier sensing, determining an interval for interlacing in resource allocation within the frequency band by predefining via a protocol or by receiving a higher layer signaling.

In accordance with an embodiment of the present disclosure, the determining the bandwidth of the frequency band at which UE performs carrier sensing among the plurality of bandwidths of the frequency bands and the plurality of frequency band positions by receiving the physical layer signaling comprises: determining the bandwidth of the frequency band for carrier sensing by using a field in a Downlink Control Information (DCI) in which a Physical Uplink Shared Channel (PUSCH) is scheduled, or a field in a dedicated DCI which is used to indicate the bandwidth of the frequency band for carrier sensing; or determining the bandwidth of the frequency band for carrier sensing by using a joint coding field formed of a field indicating the bandwidth of the frequency band for carrier sensing and other fields in a DCI in which a Physical Uplink Shared Channel (PUSCH) is scheduled.

In accordance with an embodiment of the present disclosure, the determining the bandwidth of the frequency band for carrier sensing by using the field in the DCI in which the PUSCH is scheduled, or the field in the dedicated DCI which is used to indicate the bandwidth of the frequency band for carrier sensing comprises: determining the bandwidth of the frequency band for carrier sensing by using a new field, a redundant field, or other reinterpreted fields in the DCI as an indication field for frequency band bandwidth.

In accordance with an embodiment of the present disclosure, the joint coding field formed of a field indicating the bandwidth of the frequency band for carrier sensing and other fields comprises a frequency band bandwidth indication and frequency domain resources allocation field which is used to indicate the bandwidth of the frequency band for carrier sensing and allocation of frequency domain resources.

In accordance with an embodiment of the present disclosure, the determining the frequency band position at which UE performs carrier sensing among the plurality of bandwidths of the frequency bands and the plurality of frequency band positions by receiving the physical layer signaling comprises: determining the frequency band position for carrier sensing by using a field in a Downlink Control Information (DCI) in which a Physical Uplink Shared Channel (PUSCH) is scheduled, or a field in a dedicated DCI which is used to indicate the bandwidth of frequency band for carrier sensing; or determining the frequency band position for carrier sensing by using a joint coding field formed of a field indicating the frequency band position for carrier sensing and other fields in a Downlink Control Information (DCI) in which a Physical Uplink Shared Channel (PUSCH) is scheduled.

In accordance with an embodiment of the present disclosure, the determining the frequency band position for carrier sensing by using the field in the DCI in which the PUSCH is scheduled, or the field in the dedicated DCI which is used to indicate the bandwidth of the frequency band for carrier sensing comprises: determining the frequency band position for carrier sensing by using a new field, a redundant field, or other reinterpreted fields in the DCI as a frequency band position indication field.

In accordance with an embodiment of the present disclosure, the joint coding field formed of a field indicating the frequency band position for carrier sensing and other fields comprises a frequency band position indication and frequency domain resources allocation field which is used to indicate the frequency band position for carrier sensing and allocation of frequency domain resources.

In accordance with an embodiment of the present disclosure, the method further comprises: for different bandwidths of the frequency bands for carrier sensing, performing bit populating on the joint coding field formed of a field indicating the frequency band position for carrier sensing and other fields, so that the number of bits of the DCI in which the PUSCH is scheduled is the same. In another aspect, the present disclosure also provides a user equipment for transmitting uplink information comprising: a receiving module configured to receive signalings from a base station; and a determining module, configured to determine a frequency band for performing carrier sensing and an allocation manner of uplink frequency domain resources based on the received signaling or by predefining via a protocol, and to transmit uplink information in uplink frequency domain resources determined according to the allocation manner of uplink frequency domain resources when a carrier is idle.

In another aspect, the present disclosure also provides a user equipment for transmitting uplink information, comprising a memory and a processor, the memory storing computer executable instructions, the instructions causing the processor to perform the method in accordance with embodiments of the present disclosure when executed by the processor.

In another aspect, the present disclosure also provides a computer readable medium having stored thereon computer executable instructions, the instructions causing a processor to perform the method in accordance with embodiments of the present disclosure when executed by the processor.

With the solution of the embodiments of the present disclosure, under the condition that the bandwidth capabilities of the UEs are different, by dynamically changing the bandwidth of the CCA, the unlicensed spectrum can be better utilized to provide greater throughput for the UEs.

Another object of the present disclosure is to overcome the deficiencies of the prior art and provide a method and equipment for determining the activation state of bandwidth part.

In one aspect, the present disclosure provides a method for determining the activation state of bandwidth part, the method comprises the following steps: determining activation information; and determining an activation state of at least one downlink (DL) bandwidth part (BWP) according to the activation information.

In accordance with an embodiment of the present disclosure, the determining activation information comprises:

receiving downlink control information (DCI) for scheduling physical downlink shared channel (PDSCH) on the current-active DL BWP, and determining the activation information according to a bandwidth part indicator (BWPI) field in the DCI; and determining the activation state of at least one DL BWP according to the activation information comprises: determining that the DL BWP indicated by the activation information is the newly-added active DL BWP, if the DL BWP indicated by the activation information is not the current-active DL BWP.

In accordance with an embodiment of the present disclosure, if the DL BWP indicated by the activation information is not the current-active DL BWP, and after determining that the DL BWP indicated by the activation information is the newly-added active DL BWP, the method comprises: the newly-added active DL BWP and all existing active DL BWPs being active DL BWPs, if the newly-added active DL BWP and all existing active DL BWPs are contained in a bandwidth range determined by a bandwidth capacity; the newly-added active DL BWP and the existing active DL BWP in a bandwidth capacity range being active DL BWPs, and the remaining existing active DL BWPs becoming inactive DL BWPs, if the newly-added active DL BWP and all existing active DL BWPs are not completely contained in the bandwidth range determined by the bandwidth capacity.

In accordance with an embodiment of the present disclosure, the determining activation information comprises: receiving the DCI or the PDSCH on the active DL BWP, accumulating a timer, if the reception is unsuccessful; and setting the timer to 0, and determining a timer value as the activation information, if the reception is successful; the determining an activation state of DL BWP according to the activation information comprises: the active DL BWP becoming an inactive DL BWP, if the activation information reaches a predefined value.

In accordance with an embodiment of the present disclosure, after the activation information reaches a predefined value and the active DL BWP becomes an inactive DL BWP, the method comprises: one or more default DL BWPs being active DL BWPs, if all configured DL BWPs become inactive DL BWPs, wherein the one or more default DL BWPs are configured by high layer signaling, or the one default DL BWP is the DL BWP for initial access, or the multiple default DL BWPs are a combination of the DL BWP for initial access and the DL BWP configured by high layer signaling.

In accordance with an embodiment of the present disclosure, the determining activation information comprises: receiving the DCI or the PDSCH on the active DL BWP, accumulating the timer, if the reception is unsuccessful on all the DL BWPs; setting the timer to 0 and determining the timer value as the activation information, if the reception is successful on any one DL BWP; and the determining the activation state of at least one DL BWP according to the activation information, comprises: one or more default DL BWPs becoming active DL BWPs, if the activation information reaches a predefined value; wherein the one or more default DL BWPs are configured by high layer signaling, or the one default DL BWP is the DL BWP for initial access, or the multiple default DL BWPs are a combination of the DL BWP for initial access and the DL BWP configured by high layer signaling.

In accordance with an embodiment of the present disclosure, the determining activation information comprises: receiving the DCI for scheduling the PDSCH on the current-active DL BWP, and determining the activation information according to the BWPI field in the DCI; and the determining the activation state of at least one DL BWP according to the activation information, comprises: determining that the DL BWP indicated by the activation information is the active DL BWP, and the current-active DL BWP becoming the inactive DL BWP, if the DL BWP indicated by the activation information is not the current-active DL BWP.

In accordance with an embodiment of the present disclosure, the determining activation information comprises: receiving the DCI for scheduling the PDSCH on the current-active DL BWP, and determining first activation information and second activation information according to the BWPI field in the DCI; the determining the activation state of at least one DL BWP according to the activation information, comprises: determining the newly-added active DL BWP according to an indication of the first activation information, and determining that the current-active DL BWP is the active DL BWP or inactive DL BWP according to an indication of the second activation information; or determining the activation state of at least one DL BWP according to the activation information, comprises: determining that the corresponding DL BWP is the active DL BWP or inactive DL BWP according to a one-to-one bit mapping indication of the first activation information, and determining the DL BWP where the PDSCH is according to an indication of the second activation information.

In accordance with an embodiment of the present disclosure, the determining the activation state of at least one DL BWP according to the activation information, comprises: determining an activation state of a group of DL BWPs according to the activation information, wherein one group of DL BWPs contains one or more DL BWPs, and all DL BWPs in the one group of DL BWPs are within the bandwidth capacity.

In accordance with an embodiment of the present disclosure, the determining activation information comprises: receiving the DCI for scheduling the PDSCH on the DL BWP in the group of current-active DL BWPs, and determining the activation information according to the BWPI field in the DCI; and the determining the activation state of the group of DL BWPs according to the activation information, comprises: determining that the group of current-active DL BWPs becomes a group of inactive DL BWPs, and determining that the group of DL BWPs of the DL BWP indicated by the activation information becomes the group of active DL BWPs, if the DL BWP indicated by the activation information is not the DL BWP in the group of current-active DL BWPs, wherein all the DL BWPs in the group of active DL BWPs are all active DL BWPs, and all the DL BWPs in the group of inactive DL BWPs are all inactive DL BWPs.

In accordance with an embodiment of the present disclosure, the determining activation information comprises: receiving the DCI for scheduling the PDSCH on the DL BWP in the group of current-active DL BWPs, and determining the activation information according to the BWPI field in the DCI; the determining the activation state of the group of DL BWPs according to the activation information, comprises: determining that the group of current-active DL BWPs becomes a group of inactive DL BWPs, and determining that the group of DL BWPs indicated by the activation information is the group of active DL BWPs, if the group of DL BWPs indicated by the activation information is not the group of current-active DL BWPs, wherein all the DL BWPs in the group of active DL BWPs are all active DL BWPs, and all the DL BWPs in the group of inactive DL BWPs are all inactive DL BWPs.

In accordance with an embodiment of the present disclosure, the determining activation information comprises: receiving the DCI or the PDSCH on the DL BWP in the group of active DL BWPs; accumulating the timer, if the reception is unsuccessful on all the DL BWPs in the group of active DL BWPs; setting the timer to 0 and determining the timer value as the activation information, if the reception is successful on any one DL BWP in the group of active DL BWPs; and the determining the activation state of the group of DL BWPs according to the activation information, comprises: the group of active DL BWPs becoming a group of inactive DL BWPs, the default group of DL BWPs becoming the group of active DL BWPs, if the activation information reaches a predefined value, wherein the default group of DL BWPs is configured by high layer signaling, or the default group of DL BWPs is the group of DL BWPs for initial access, or the default group of DL BWPs is composed of the group of DL BWPs for initial access and the group of DL BWPs configured by high layer signaling; all the DL BWPs in the group of active DL BWPs are all active DL BWPs, all the DL BWPs in the group of inactive DL BWPs are all inactive DL BWPs.

In accordance with an embodiment of the present disclosure, the determining activation information comprises: receiving the DCI specifically for indicating DL BWP switching, and determining the activation information according to the BWPI field in the DCI; the determining the activation state of at least one DL BWP according to the activation information, comprises: determining that the corresponding DL BWP is the active DL BWP or inactive DL BWP according to a one-to-one bit mapping indication of the activation information.

In accordance with an embodiment of the present disclosure, the determining activation information comprises: receiving the DCI for scheduling the PDSCH, and determining the activation information according to the BWPI field in the DCI; and the determining the activation state of at least one DL BWP according to the activation information, comprises: determining the DL BWP indicated by the activation information at the time when the PDSCH starts, if the activation information indicates to activate more than two DL BWPs.

In accordance with an embodiment of the present disclosure, the determining activation information comprises: receiving the DCI not for scheduling the PDSCH, and determining the activation information according to the BWPI field in the DCI; and the determining the activation state of at least one DL BWP according to the activation information, comprises: determining to active DL BWPs indicated by the activation information after a period of time interval from the end of the physical downlink control channel (PDCCH) of the DCI, if the activation information indicates to activate more than two DL BWPs, wherein the time interval is determined in units of a reference time length.

In another aspect, for achieving the above purpose, the present disclosure also provides a user equipment, comprising: an activation information determining module, configured to determining activation information; and an activation state determining module, configured to determine a downlink bandwidth part activation state according to the activation information.

Compared with the prior art, the technical effects of the present disclosure include, but are not limited to, the signaling overhead is saved, and the impact of the adjustment time interval for BWP switching on the normal receiving data of the UE is reduced, and the reception performance and the throughput level of the receiving data of the UE are guaranteed by determining the activation state of DL BWP by the activation information.

Still another object of the present disclosure is to overcome a deficiency of the prior art and provide a method and device for transmitting a signal when scheduling an uplink or downlink transmission using a compact downlink control signaling.

To achieve the above object, in one aspect, the present disclosure provides a method for transmitting a signal, the method includes the following steps: detecting a downlink control channel by a UE using a compact DCI format; acquiring configuration information by the UE in a preconfigured manner when the UE correctly detected the downlink control channel using the compact DCI format; and performing an uplink transmission by the UE based on the configuration information.

In accordance with an embodiment of the present disclosure, the configuration information includes at least one of the following: a redundancy version configuration used by a scheduled uplink resource; a transmission power control configuration used by the scheduled uplink resource; a frequency hopping flag configuration used by the scheduled uplink resource; a transmission power control configuration used by a HARQ feedback resource corresponding to a scheduled downlink resource; a resource indication configuration used by the HARQ feedback resource corresponding to the scheduled downlink resource; and a time interval configuration used by the HARQ feedback resource corresponding to the scheduled downlink resource.

In accordance with an embodiment of the present disclosure, when the configuration information includes the redundancy version configuration used by the scheduled uplink resource, the acquiring the configuration information by the UE in the preconfigured manner, comprising at least one of: the UE using the same redundancy version as the redundancy version configured by an uplink license carried in a random access response as the redundancy version configuration used by the scheduled uplink resource; the UE using a preset redundancy version as the redundancy version configuration used by the scheduled uplink resource; and the UE determining the redundancy version configuration used by the scheduled uplink resource in an order of an uplink transmission and an order of the preset redundancy version.

In accordance with an embodiment of the present disclosure, when the configuration information includes the transmission power control configuration used by the scheduled uplink resource, the acquiring the configuration information by the UE in the preconfigured manner, comprising at least one of: using, by the UE, the same configuration as the transmission power control configured by an uplink license carried in a random access response as the transmission power control configuration used by the scheduled uplink resource; using, by the UE, a preset value of the transmission power control as the transmission power control configuration used by the scheduled uplink resource; and determining, by the UE, the transmission power control configuration used by the scheduled uplink resource based on the number of retransmissions sent by the uplink and a transmission power control step size preset by a system.

In accordance with an embodiment of the present disclosure, when the configuration information includes the frequency hopping flag configuration used by the scheduled uplink resource, the acquiring the configuration information by the UE in the preconfigured manner, comprising at least one of: using, by the UE, the same configuration as the frequency hopping flag configured by an uplink license carried in a random access response as the frequency hopping flag configuration used by the scheduled uplink resource; using, by the UE, a preset frequency hopping flag configuration as the frequency hopping flag configuration used by the scheduled uplink resource; and determining, by the UE, the frequency hopping flag configuration used by the scheduled uplink resource based on a preset rule, wherein the preset rule comprises: if the number of the scheduled uplink transmission exceeds a preset number of retransmissions, the UE determines that the frequency hopping flag configuration used by the scheduled uplink resource is enabling the frequency hopping, otherwise the UE determines that the frequency hopping flag configuration used by the scheduled uplink resource is disenabling the frequency hopping.

In accordance with an embodiment of the present disclosure, when the configuration information includes the transmission power control configuration used by the HARQ feedback resource corresponding to the scheduled downlink resource, the acquiring the configuration information by the UE in a preconfigured manner, comprising at least one of: using, by the UE, the same configuration as the transmission power control configured by an uplink license carried in a random access response as the transmission power control configuration used by the HARQ feedback resource corresponding to the scheduled downlink resource; using, by the UE, the same configuration as the transmission power control configured in the latest scheduled uplink transmission as the transmission power control configuration used by the HARQ feedback resource corresponding to the scheduled downlink resource; using, by the UE, a preset value of the transmission power control as the transmission power control configuration used by the HARQ feedback resource corresponding to the scheduled downlink resource; and determining, by the UE based on the number of retransmissions sent by the uplink and a transmission power control step size preset by a system, the transmission power control configuration used by the HARQ feedback resource corresponding to the scheduled downlink resource.

In accordance with an embodiment of the present disclosure, when the configuration information includes the resource indication configuration used by the HARQ feedback resource corresponding to the scheduled downlink resource, the acquiring the configuration information by the UE in a preconfigured manner, comprising at least one of: determining, by the UE based on a resource index of receiving the correct PDCCH, the PUCCH resource configuration used by the HARQ feedback resource corresponding to the scheduled downlink resource from a PUCCH resource configuration set configured or pre-configured in the system information; and determining, by the UE, the PUCCH resource configuration used by the HARQ feedback resource corresponding to the scheduled downlink resource based on the pre-configured PUCCH resource configuration.

In accordance with an embodiment of the present disclosure, when the configuration information includes the time interval configuration used by the HARQ feedback resource corresponding to the scheduled downlink resource, the acquiring the configuration information by the UE in a preconfigured manner, comprising at least one of: using, by the UE, a preset time interval as the time interval configuration used by the HARQ feedback resource corresponding to the scheduled downlink resource; and determining, by the UE, the time interval configuration used by the HARQ feedback resource corresponding to the scheduled downlink resource based on a resource index of searching the correct PDCCH and a preset rule.

In accordance with an embodiment of the present disclosure, the resource index of the foregoing PDCCH includes at least one of: a PDCCH index, a CCE index, an index of search space, and an index of control resource set.

In accordance with an embodiment of the present disclosure, the preset rule includes determining the time interval configuration used by the HARQ feedback resource corresponding to the scheduled downlink resource based on an index of search the correct PDCCH, a reference time interval preset by a system, and a preset time interval step size.

In another aspect, the present disclosure further provides a user equipment (UE), the UE include a downlink control channel receiving and detecting unit, a configuration determining unit, and a transmission unit; wherein the downlink control channel receiving and detecting unit is configured to detect a downlink control channel using a compact DCI format; the configuration determining unit is configured to acquire configuration information in a preconfigured manner when the user equipment correctly detected the downlink control channel using the compact DCI format; the transmission unit is configured to perform an uplink transmission based on the configuration information.

In another aspect, the present disclosure further provides a user equipment (UE), the UE includes: a processor; and a memory configured to store machine readable instructions that, when executed by the processor, cause the processor to perform the foregoing method for transmitting a signal.

Additional aspects and advantages of the present disclosure will partly be presented in the following description, and become apparent in the following description or be appreciated in practicing of the present disclosure.

In order to enable those skilled in the art to better understand the aspects of the present disclosure, the technical solutions in the embodiments of the present disclosure will be clearly and completely described below in conjunction with the drawings in the embodiments of the present disclosure.

Embodiments of the present disclosure will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present disclosure and should not be regarded as any limitations thereto.

It should be understood by those skill in the art that singular forms "a", "an", "the", and "said" may be intended to include plural forms as well, unless otherwise stated. It should be further understood that terms "include/including" used in this specification of the present disclosure specify the presence of the stated features, integers, steps, operations, elements and/or components, but not exclusive of the presence or addition of one or more other features, integers, steps, operations, elements, components, and/or combinations thereof. It should be understood that when an element is referred to as being "connected to" or "coupled to" another element, it may be directly connected or coupled to other elements or provided with intervening elements therebetween. In addition, "connected to" or "coupled to" as used herein may include wireless connection or coupling. As used herein, terms "and/or" include all or any of one or more of associated listed items or combinations thereof.

It should be understood by a person of ordinary skill in the art that, unless otherwise defined, all terms (including technical and scientific terms) used herein have the same meaning as commonly understood by those skill in the art to which the present disclosure belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

Those skilled in the art may understand that the "terminal" and "terminal device" as used herein include both a wireless signal receiver device only having a wireless signal receiver without a transmitting capability, and a receiving and transmitting hardware having a device capable of receiving and transmitting hardware for two-way communication over a two-way communication link. Such device may include: a cellular or other communication device having a single line display or a multi-line display, or a cellular or other communication device without a multi-line display; a personal communications service (PCS), which may combine voice, data processing, fax and/or data communication capabilities; a PDA (Personal Digital Assistant), which may include a radio frequency receiver, a pager, Internet/Intranet access, a web browser, a notepad, a calendar, and/or a GPS (Global Positioning System) receiver; a conventional laptop and/or a palmtop computer or other devices having a conventional laptop and/or palmtop computer or other devices and/or having a radio frequency receiver. As used herein, "terminal" and "terminal device" may be portable, transportable, installed in a vehicle (in aviation, sea and/or land), or adapted and/or configured to operate locally, and/or operated in any other location on the earth and/or space in a distributed form. As used herein, "terminal" and "terminal device" may also be a communication terminal, an internet terminal, and a music/video playing terminal, for example, a PDA, a MID (Mobile Internet Device), and/or a mobile phone having a music/video playback function, and may also be a smart TV, a set-top box and other devices.

In the processes described in the specification and claims of the present disclosure and the above-described drawings, a plurality of operations in a specific order are included, but it should be clearly understood that the operations may not be performed in the order in which they appear, or the operations may be executed in parallel. The serial number of the operation such as 101, 102, etc., is only used to distinguish different operations, and the serial number itself does not represent any execution order. Additionally, these processes may include more or fewer operations, and these operations may be performed sequentially or in parallel. It should be noted that the descriptions of "first" and "second" herein are used to distinguish different messages, devices, modules, etc., and do not represent the order, nor restrict the "first" and "second" to different types.

The technical solutions in the embodiments of the present disclosure will be described in a clear and complete manner in conjunction with the attached drawings in the embodiments of the present disclosure, and obviously, the described embodiments are merely part of the present disclosure, and not all embodiments. All other embodiments obtained by those skilled in the art based on the embodiments of the present disclosure without creative work should fall within the protection scope of the present disclosure.

Referring to FIG. 1, the method 100 of transmitting uplink control information and data of the present disclosure includes the following steps.

In step 101, a frequency band for performing carrier sensing and an allocation manner of uplink frequency domain resources are determined by receiving a signaling or by predefining via a protocol.

In step 102, carrier sensing is performed at the determined frequency band for performing carrier sensing.

In step 103, when a carrier is idle, uplink information is transmitted in uplink frequency domain resources determined according to the allocation manner of uplink frequency domain resources.

Figure 2:
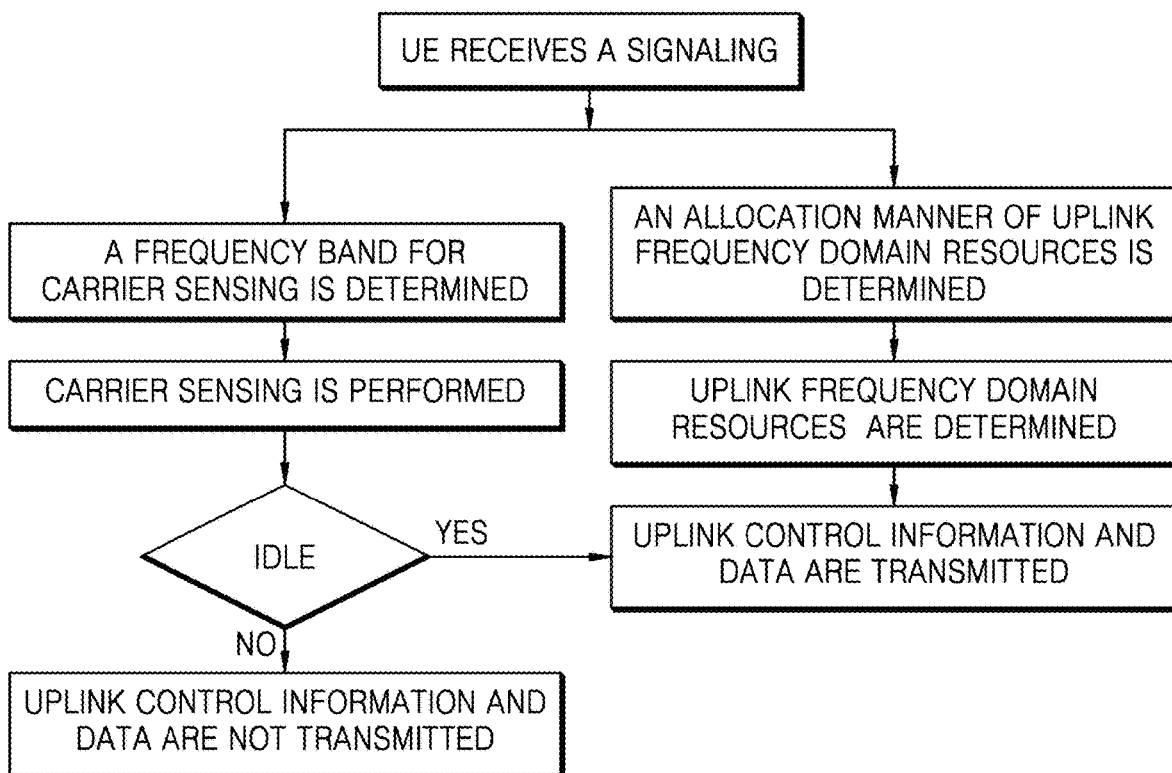
FIG. 2 illustrates a detailed flowchart of a method for transmitting uplink information according to an embodiment of the present disclosure.

Specifically, the UE determines whether to transmit uplink control information and data according to the carrier sensing result. When the sensed carrier is busy, the UE does not transmit information; when the carrier is idle, the UE transmits information in uplink frequency domain resources determined according to the determined allocation manner of uplink frequency domain resources, as shown in the specific flow chart of transmitting uplink information in FIG. 2.

The signaling in the step 101 may comprise UE-specific higher layer signaling, and physical layer signaling, or a combination of higher layer signaling and physical layer signaling, or system information (for example, Master Information Block (MIB) information, or System Information Block (SIB) information). Physical layer signaling refers to information in Downlink Control Information (DCI).

The allocation manner of uplink frequency domain resource in the step 101 refers to the usage mode (or description mode) of the frequency domain resource allocation field in the DCI.

By way of illustration and not limitation, the determining frequency band for carrier sensing by predefining via a protocol may be determining a fixed value by a protocol, for example, determining 5 MHz of the frequency band for carrier sensing by a protocol. The determining frequency band for carrier sensing by predefining via a protocol may be predefining the frequency band for carrier sensing by a protocol.

The method for transmitting uplink information in the present disclosure may be applied to a wireless communication system of UEs with limited bandwidth capabilities, and applied to a shared frequency band or an unlicensed band. The UE performs carrier sensing before transmitting uplink control information and data, and can transmit uplink control information and data only when the carrier is idle. If the carrier is busy, the UE cannot transmit uplink control information and data. The UE performs carrier sensing in a certain band range, for example, a band range of 10 MHz or 20 MHz.

Figure 3:
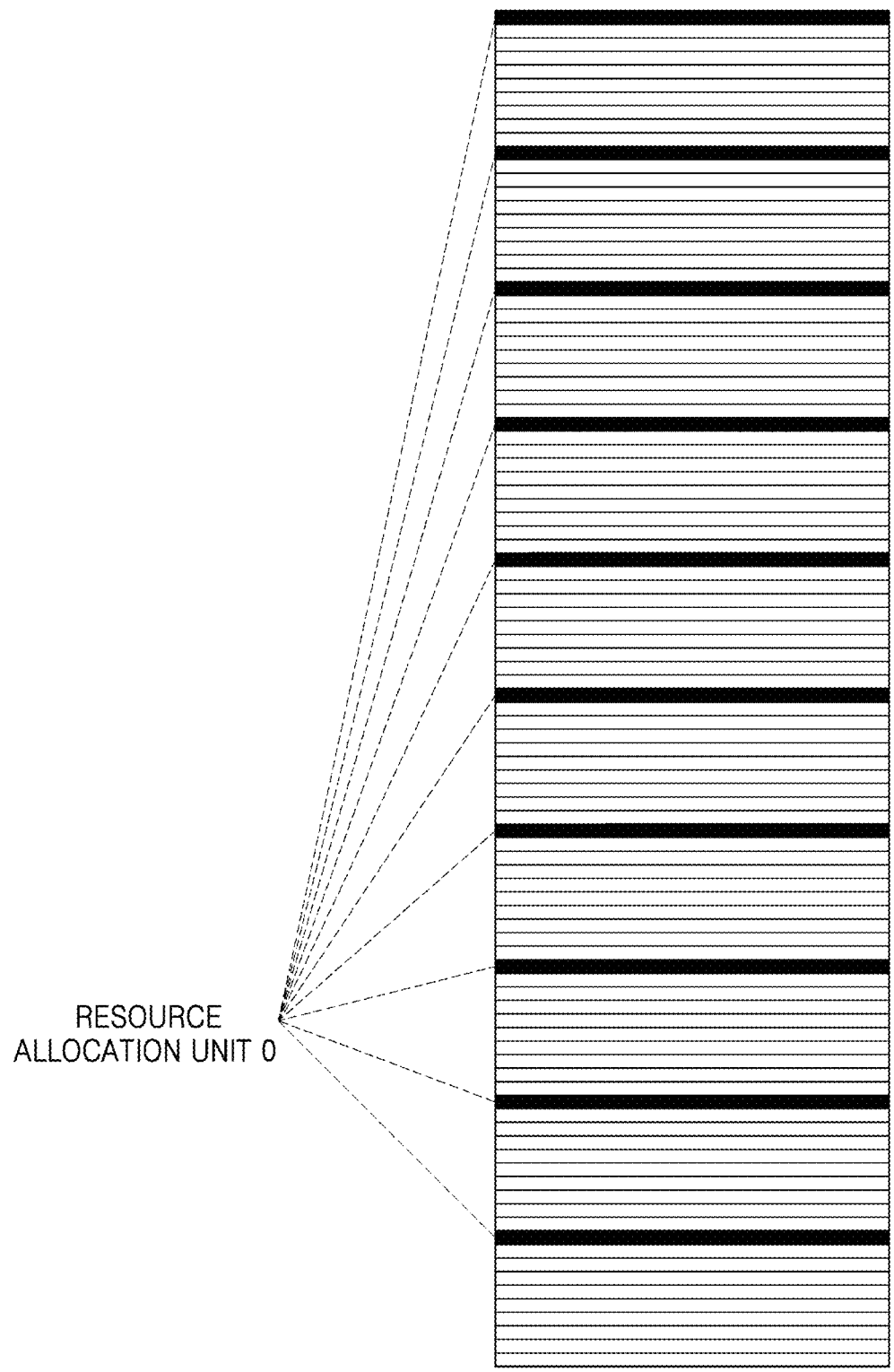
FIG. 3 illustrates a schematic diagram of a resource allocation unit in accordance with an embodiment of the present disclosure.

The method for transmitting uplink information in the present disclosure will be set forth by several embodiments below. In order to reduce the peak-to-average ratio, the allocation manner of uplink frequency domain resources in the present disclosure adopts an interlaced allocation manner, that is, physical resource blocks (PRBs) having the same frequency domain interval in a frequency band are allocated as one resource allocation units. For example, a frequency band includes 100 PRBs, each group of 10 PRBs separated by 10 PRBs from each other is treated as one resource allocation unit, and there are 10 resource allocation units. The resource allocation unit i includes 10 PRBs, and is $10*i$, $10*i+1$, $10*i+2$, $10*i+3$, $10*i+4$, $10*i+5$, $10*i+6$, $10*i+7$, $10*i+8$, $10*i+9$, respectively, where i=0, 1, 2, 3, 4, 5, 6, 7, 8, 9. For example, the resource allocation unit i may include 10 PRBs, which are $(10*i)$th, $(10*i+1)$th, $(10*i+2)$th, $(10*i+3)$th, $(10*i+4)$th, $(10*i+5)$th, $(10*i+6)$th, $(10*i+7)$th, $(10*i+8)$th, $(10*i+9)$th PRBs of a frequency band, respectively, where i=0, 1, 2, 3, 4, 5, 6, 7, 8, 9. Or, the resource allocation unit i may include 10 PRBs, which are $(i)$th, $(10+i)$th, $(20+i)$th, $(30+i)$th, $(40+i)$th, $(50+i)$th, $(60+i)$th, $(70+i)$th, $(80+i)$th, $(90+i)$th PRBs of a frequency band, respectively, where i=0, 1, 2, 3, 4, 5, 6, 7, 8, 9. Each UE may be allocated one or more resource allocation units, as shown in FIG. 3. Here, the uplink transmission waveform may be in the form of DFT-S-OFDM.

This embodiment describes that the UE determines the bandwidth of the frequency band for carrier sensing and the position of the frequency band (for example, the frequency band position may be determined by the starting PRB of the frequency band or the center frequency of the frequency band), and then carrier sensing can be performed. The UE determines whether to transmit uplink data according to the carrier sensing result. The bandwidth of the frequency band for carrier sensing mentioned here may be in units of PRB numbers, for example, 100 PRBs, 50 PRBs, or directly in units of MHz, for example, 5 MHz, 20 MHz. The bandwidth for carrier sensing is the maximum bandwidth that may be used each time by the UE to transmit uplink control information and the data, which is the maximum bandwidth indicated by the frequency domain resource allocation field in the DCI in which the physical uplink shared channel (PUSCH) is scheduled. The following approaches are used for the UE to determine the bandwidth and the position of the frequency band for carrier sensing.

Figure 4:
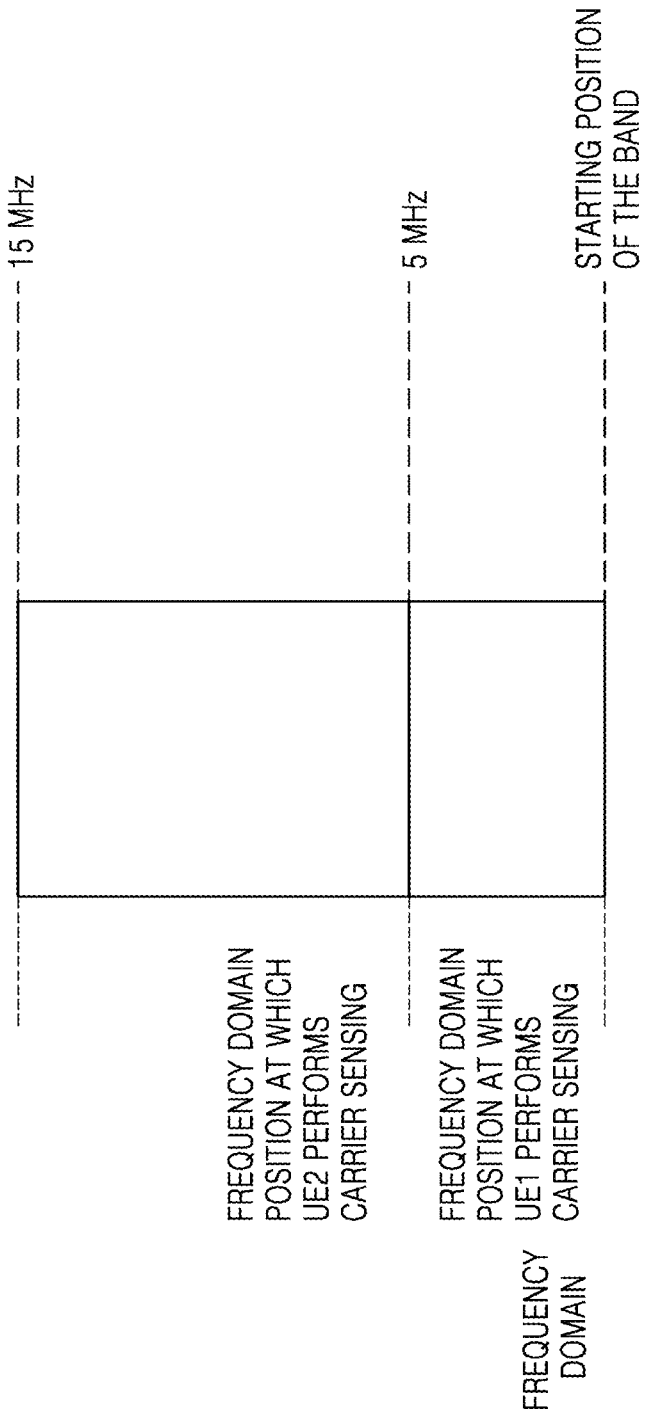
FIG. 4 illustrates a schematic diagram of determining a bandwidth of the frequency band and a frequency band position at which a UE performs carrier sensing according to an embodiment of the present disclosure.

Approach 1:

In this embodiment, the UE determines the bandwidth of the frequency band for carrier sensing and the frequency band position by receiving UE-specific higher layer signaling. For example, for UE 1, it is configured that the bandwidth of the frequency band for carrier sensing is 5 MHz, and the starting position of the 5 MHz bandwidth is the starting position of the entire carrier; and for UE 2, it is configured that the bandwidth of the frequency band for carrier sensing is 10 MHz, and the starting position of the 10 MHz bandwidth is the ending position of the 5 MHz bandwidth, as shown in FIG. 4.

Figure 5:
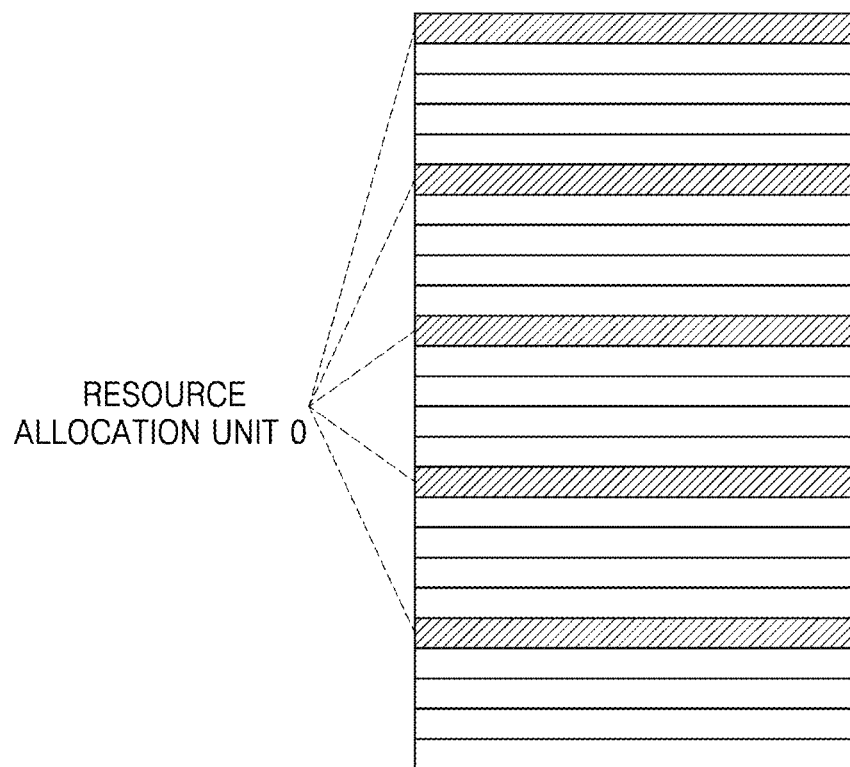
FIG. 5 illustrates a schematic diagram of a resource allocation unit in accordance with an embodiment of the present disclosure.
Figure 6:
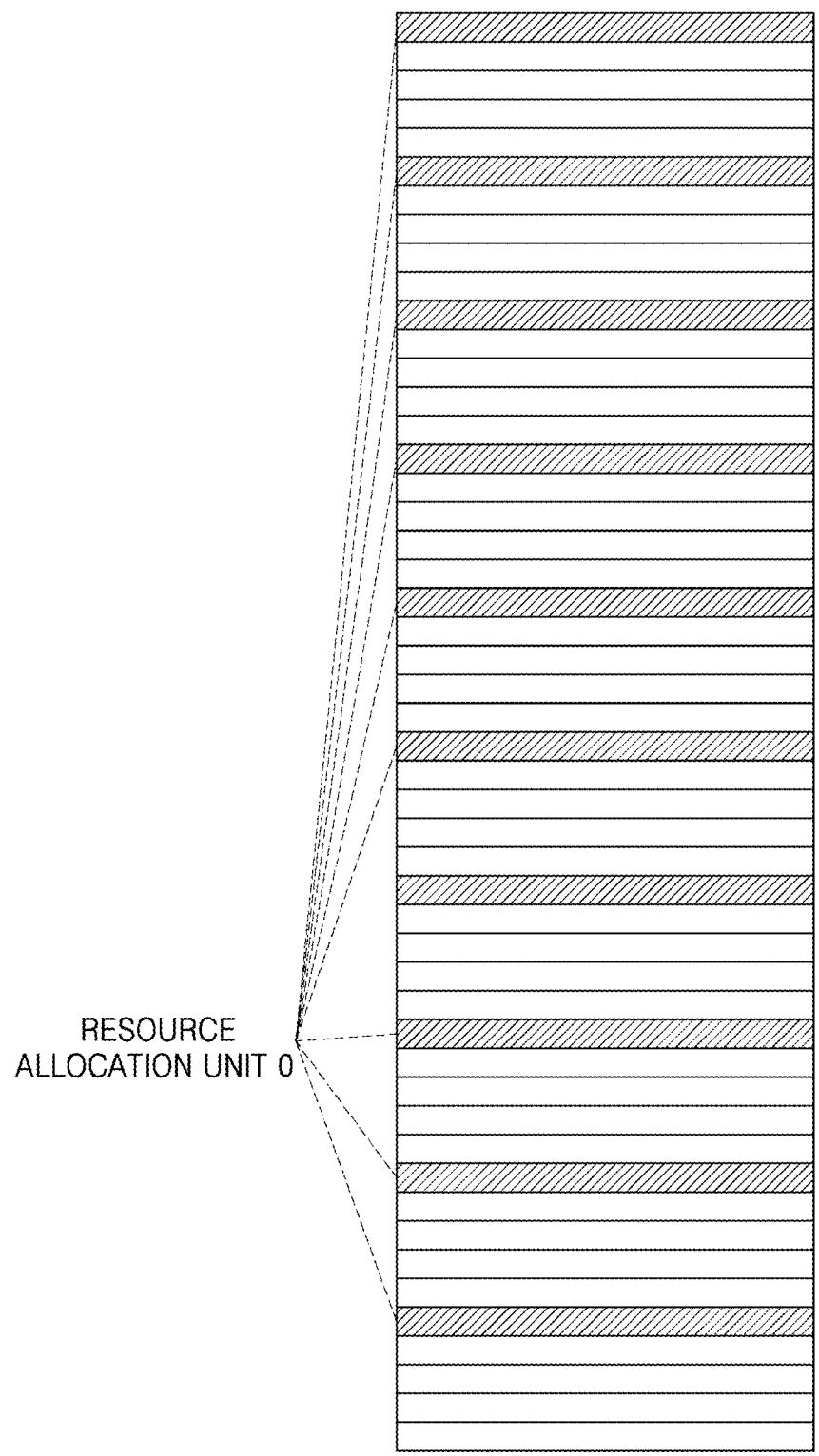
FIG. 6 illustrates a schematic diagram of a resource allocation unit in accordance with an embodiment of the present disclosure.

For a UE with a different bandwidth of the frequency band for carrier sensing, when the PUSCH is scheduled, the allocation manner of the uplink frequency domain resource is different, the number of bits in the frequency domain resource allocation field of the DCI in which the PUSCH is scheduled may be different, and the interpretation of the frequency domain resource allocation field may also be different. For example, for UE 1 with a bandwidth of 5 MHz for carrier sensing, the frequency domain resource is divided into 25 PRBs, and each group of 5 PRBs separated by 5 PRBs from each other is regarded as one frequency domain resource allocation unit. There are 5 frequency domain resource allocation units, and the frequency domain resource allocation unit i includes 5 PRBs, and is 5*i, 5*i+1, 5*i+2, 5*i+3, 5*i+4, respectively, where i=0, 1, 2, 3, 4. For example, the resource allocation unit i includes 5 PRBs, which are (5*i)th, (5*i+1)th, (5*i+2)th, (5*i+3)th, (5*i+4)th PRBs of a frequency band, respectively, where i=0, 1, 2, 3, 4. Or, the resource allocation unit i includes 5 PRBs, which are (i)th, (5+i)th, (10+i)th, (15+i)th, (20+i)th PRBs of a frequency band, respectively, where i=0, 1, 2, 3, 4. Each UE may be allocated one or more frequency domain resource allocation units, as shown in FIG. 5. If bit mapping is used, the number of bits in the frequency domain resource allocation field of the DCI is 5, and the value of each bit represents whether a frequency domain resource allocation unit is allocated. For example, for UE 2 with a bandwidth of 10 MHz for carrier sensing, the frequency domain resource is divided into 50 PRBs, and each group of 10 PRBs separated by 5 PRBs from each other is regarded as one frequency domain resource allocation unit. There are 5 frequency domain resource allocation units, and the frequency domain resource allocation unit i includes 10 PRBs and is 5*i, 5*i+1, 5*i+2, 5*i+3, 5*i+4, respectively, where i=0, 1, 2, 3, 4. For example, the resource allocation unit i may include 10 PRB s, which are (5*i)th, (5*i+1)th, (5*i+2)th, (5*i+3)th, (5*i+4)th PRB s of a frequency band, respectively, where i=0, 1, 2, 3, 4. Or, the resource allocation unit i may include 10 PRBs, which are (i)th, (10+i)th, (20+i)th, (30+i)th, (40+i)th, (50+i)th, (60+i)th, (70+i)th, (80+i)th, (90+i)th PRBs of a frequency band, respectively, where i=0, 1, 2, 3, 4. Each UE may be allocated one or more frequency domain resource allocation units, as shown in FIG. 6. If bit mapping is used, the number of bits in the frequency domain resource allocation field of the DCI is 5, and the value of each bit represents whether a frequency domain resource allocation unit is allocated.

According to an embodiment of the present disclosure, under the condition that the bandwidth capabilities of the UEs are different, the bandwidth of the frequency band for carrier sensing and the frequency band position are determined by, for example, higher layer signaling, so that carrier sensing is performed according to the determined different bandwidths. Therefore, the unlicensed spectrum may be better utilized to provide greater throughput for the UE. In particular, when the bandwidth capability of a UE is relatively low, a fixed frequency band bandwidth is determined for the UE for carrier sensing.

Approach 2:

In this embodiment, the UE determines the bandwidth of the frequency band for carrier sensing by receiving UE-specific higher layer signaling. For example, UE 1 is configured with a bandwidth of 5 MHz for carrier sensing, and UE 2 is configured with a bandwidth of 10 MHz for carrier sensing. The UE determines the frequency band positions at which the UE may perform carrier sensing by receiving UE-specific higher layer signaling or cell common higher layer signaling, and the number of the determined frequency band positions at which carrier sensing may be performed is at least one.

Figure 7:
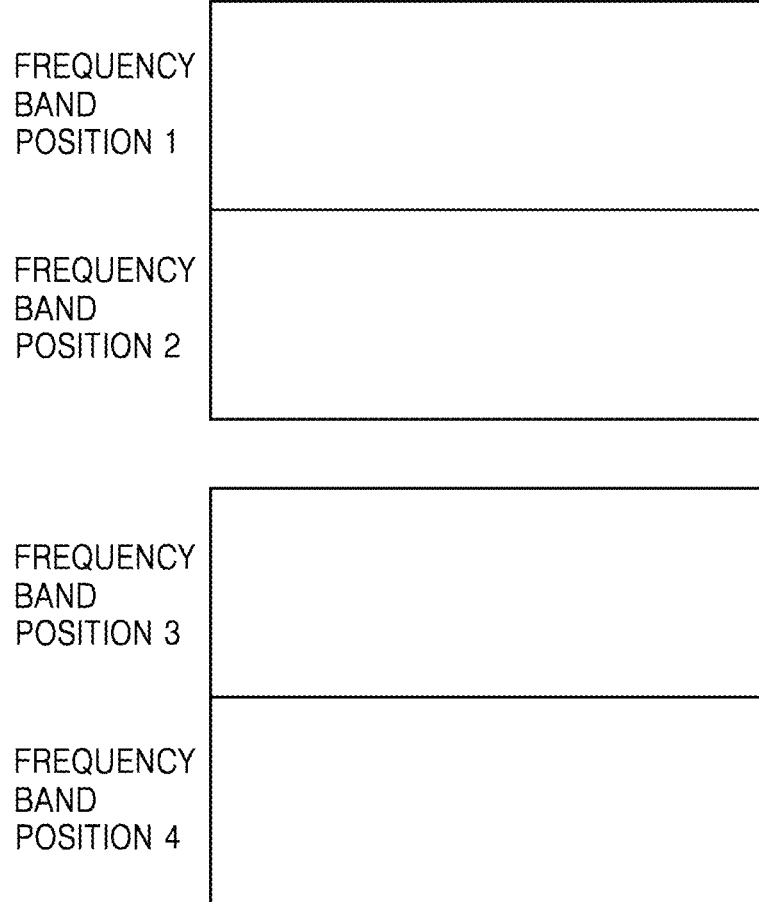
FIG. 7 illustrates a schematic diagram of the frequency band positions at which a UE performs carrier sensing according to an embodiment of the present disclosure.

For example, the number of the frequency band positions at which UE 1 may perform carrier sensing, which is configured by the high-level signaling, is 4, as shown in FIG. 7.

When the number of the determined frequency band positions at which UE may perform carrier sensing is more than one, the UE determines the frequency band position for performing carrier sensing by receiving a physical layer signaling or a medium access layer signaling.

For example, the position of the frequency band at which the UE performs carrier sensing may be indicated by a new field in the DCI in which the PUSCH is scheduled, a redundant field in the DCI or other fields reinterpreted in the DCI, which is called a frequency band indication field. When the number of the configured frequency band positions for carrier sensing is 4, a 2-bit frequency band indication field may be used for indication, and the specific mapping between the frequency band indication field values and the frequency band positions is as shown in Table 1.

TABLE 1

Mapping between frequency band indication field values
and frequency band positions for carrier sensing

| frequency band indication field value | frequency band position for carrier sensing |
|---|---|
| 00 | frequency band position 1 for carrier sensing configured by high-level signaling |
| 01 | frequency band position 2 for carrier sensing configured by high-level signaling |
| 10 | frequency band position 3 for carrier sensing configured by high-level signaling |
| 11 | frequency band position 4 for carrier sensing configured by high-level signaling |

Figure 8:
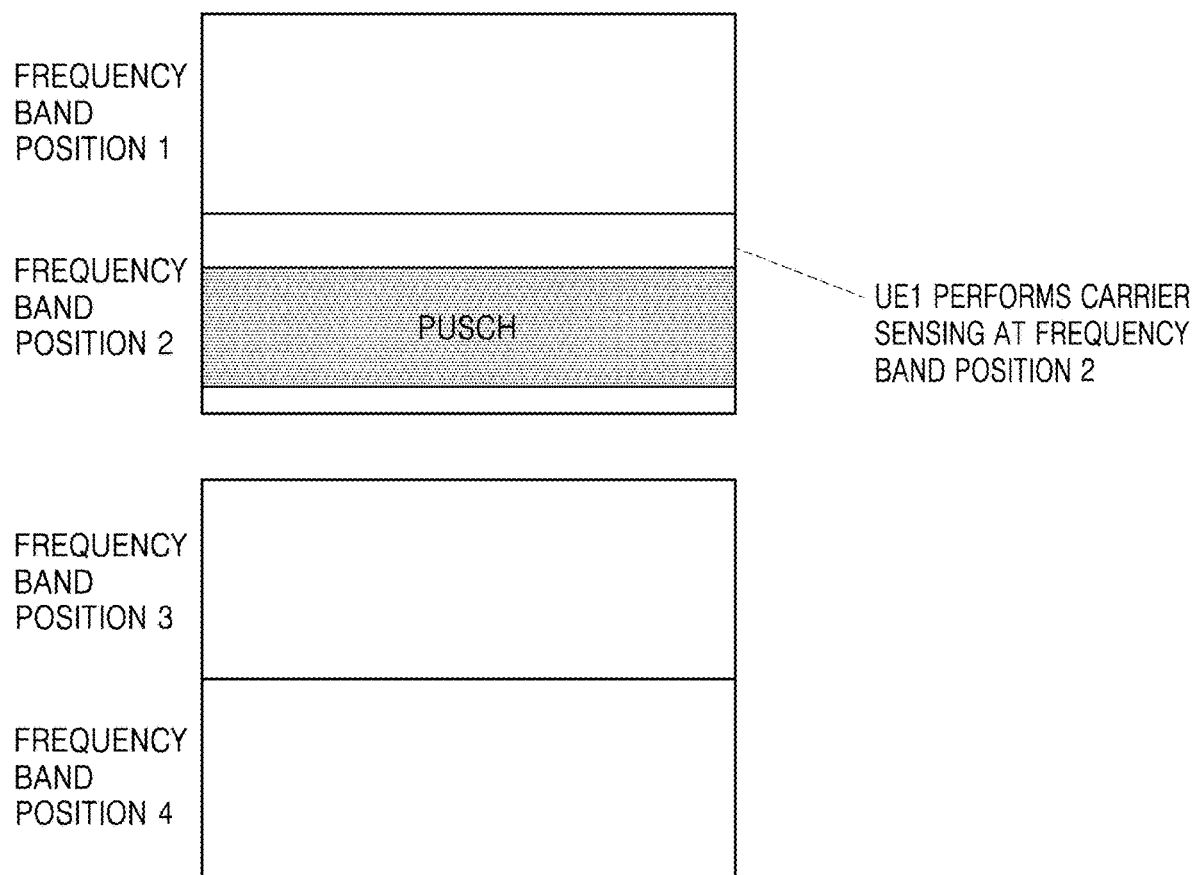
FIG. 8 illustrates a schematic diagram of the frequency band positions at which a UE performs carrier sensing according to an embodiment of the present disclosure.

Alternatively, the frequency domain resources allocated by the frequency resource allocation field in the DCI in which the Physical Uplink Shared Channel (PUSCH) is scheduled may be used to determine the frequency band positions at which the UE performs carrier sensing, if all frequency domain resources allocated to the UE are included in a frequency band configured by a higher layer signaling, and the UE may perform carrier sensing on the determined frequency band. For example, the high-level signaling configures that there are four frequency band positions at which the UE 1 may perform carrier sensing, and in the uplink time slot n, the frequency resources allocated to the UE 1 are included in the frequency band position 2, then the UE 1 performs carrier sensing at the frequency band position 2, as shown in FIG. 8.

According to an embodiment of the present disclosure, under the condition that the bandwidth capabilities of the UEs are different, the bandwidth of the frequency band for carrier sensing is configured by, for example, higher layer signaling, and the frequency band position for carrier sensing is configured by physical layer signaling, thereby implementing relatively flexible carrier sensing and better utilization of unlicensed spectrum, providing greater throughput for the UE. The frequency diversity effect may be achieved by configuring multiple frequency band positions for carrier sensing.

Approach 3:

In this embodiment, the UE determines the bandwidth of the frequency band and the frequency band position at which the UE performs carrier sensing by receiving physical layer signaling. Here, the physical layer signaling may be a field in the DCI in which the PUSCH is scheduled; or may not be a field in the DCI in which the PUSCH is scheduled, that is, a field in the DCI which is specifically used to indicate the bandwidth of the frequency band and the frequency band position at which the UE performs carrier sensing.

Figure 9:
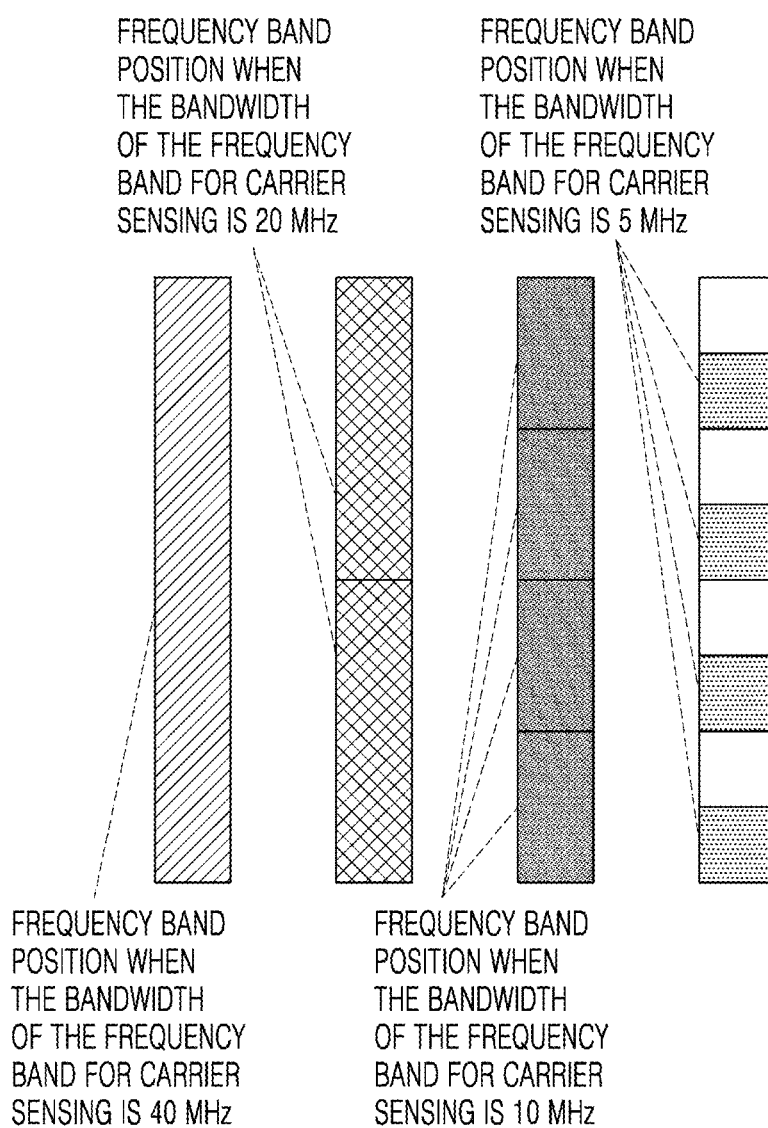
FIG. 9 illustrates a schematic diagram of the frequency band positions for the different bandwidths of frequency bands at which a UE performs carrier sensing according to an embodiment of the present disclosure.
Figure 10:
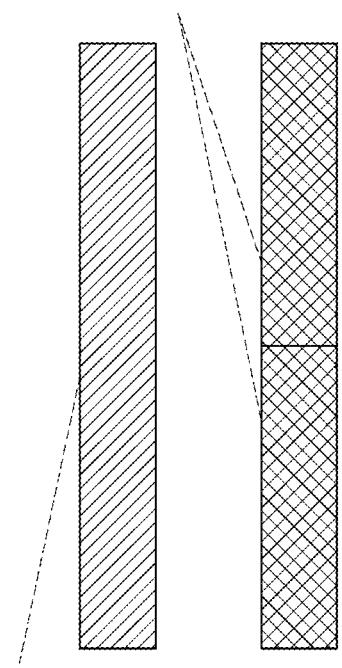
FIG. 10 illustrates a schematic diagram of the frequency band positions for the different bandwidths of frequency bands at which another UE performs carrier sensing according to an embodiment of the present disclosure.

First, the UE determines the bandwidth of at least one frequency band at which the UE may perform carrier sensing within one BWP and at least one possible frequency band position of each bandwidth of frequency band by receiving UE-specific higher layer signaling. For example, by receiving UE-specific higher layer signaling, the UE 1 determines four bandwidths of the frequency bands at which the UE may perform carrier sensing, which are 40 MHz, 20 MHz, 10 MHz, and 5 MHz, respectively, and determines that when the bandwidth of the frequency band for carrier sensing is 40 MHz, there is one possible frequency band position for the bandwidth of the frequency band; when the bandwidth of the frequency band for carrier sensing is 20 MHz, there are two possible frequency band positions for the bandwidth of the frequency band; when the bandwidth of the frequency band for carrier sensing is 10 MHz, there are four possible frequency band positions for the bandwidth of the frequency band; when the bandwidth of the frequency band for carrier sensing is 5 MHz, there are four possible frequency band positions for the bandwidth of the frequency band, as shown in FIG. 9. By receiving UE-specific higher layer signaling, the UE 2 determines two bandwidths of the frequency bands at which the UE may perform carrier sensing, which are 20 MHz and 10 MHz, respectively, and determines that when the bandwidth of the frequency band for carrier sensing is 20 MHz, there is one possible frequency band position for the bandwidth of the frequency band; when the bandwidth of the frequency band for carrier sensing is 10 MHz, there are two possible frequency band positions for the bandwidth of the frequency band, as shown in FIG. 10.

Figure 11:
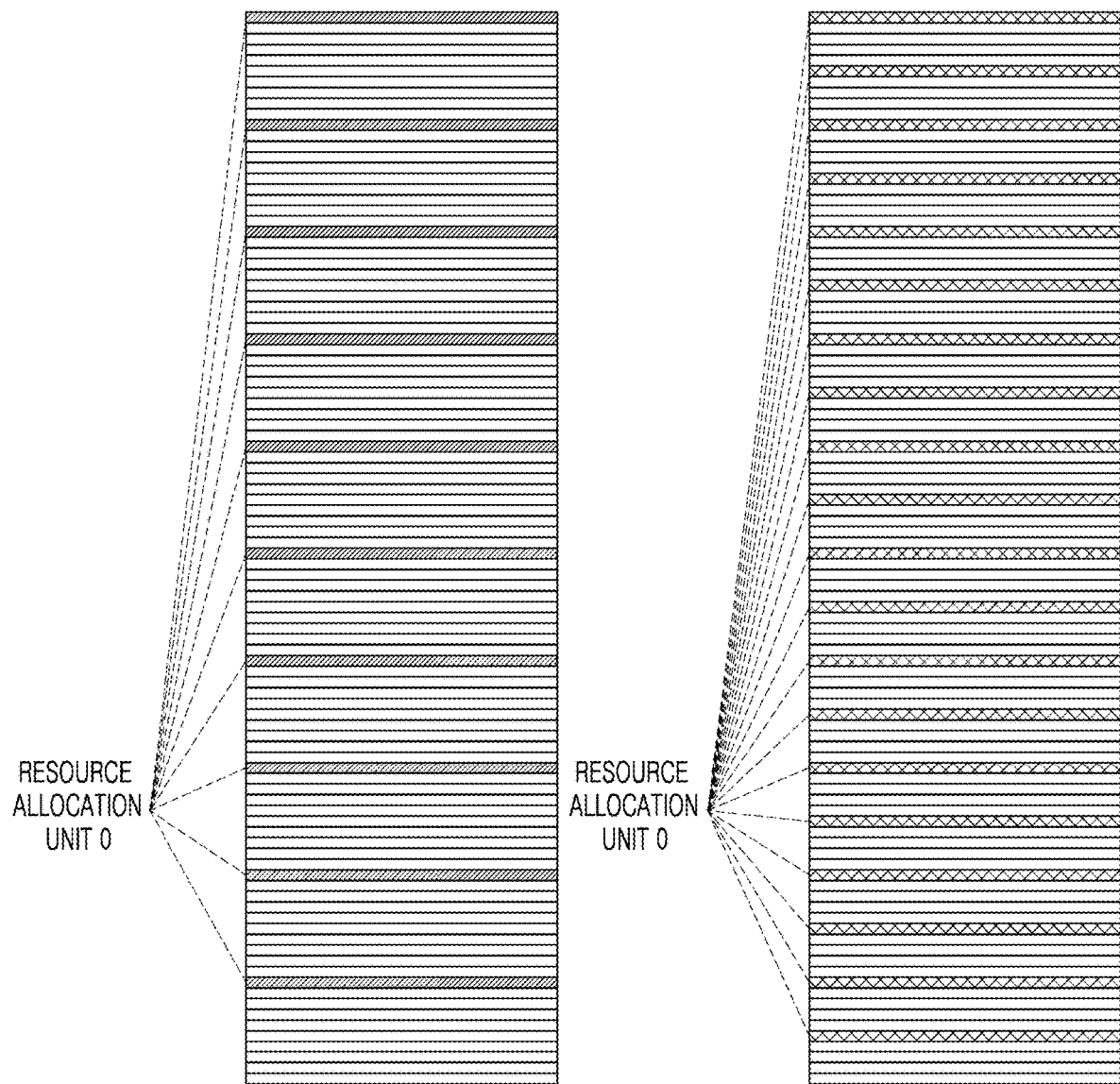
FIG. 11 illustrates a schematic diagram of resource allocation within a frequency band for different frequency band bandwidths in accordance with an embodiment of the present disclosure.

When the bandwidth of the frequency band for carrier sensing is different, the interval for interlacing may be different in resource allocation within the frequency band, and the number of PRBs included in each frequency domain resource allocation unit may also be different. To occupy the entire bandwidth of the frequency band for carrier sensing, the bandwidth of the frequency band is equal to the interval for interlacing in resource allocation multiplied by the bandwidth in each frequency domain resource allocation unit. For example, the bandwidth of the frequency band for carrier sensing is 100 PRBs, and the interval for interlacing in resource allocation within the frequency band is 10 PRBs, then each frequency domain resource allocation unit includes 10 PRBs and there are 10 resource allocation units, as shown in the left portion of FIG. 11. It is also possible that the bandwidth of the frequency band for carrier sensing is 100 PRBs, and the interval for interlacing in resource allocation within the frequency band is 5 PRBs, then each frequency domain resource allocation unit includes 20 PRBs and there are 5 frequency domain resource allocation units, as shown in the right portion of FIG. 11. For example, the bandwidth of the frequency band for carrier sensing is 50 PRBs, and the interval for interlacing in resource allocation within the frequency band is 5 PRBs, then each frequency domain resource allocation unit includes 10 PRBs and there are 5 frequency domain resource allocation units.

For a bandwidth of the frequency band for carrier sensing, the UE may determine the interval for interlacing in resource allocation within the frequency band by predefining via a protocol. For example, when the bandwidth of the frequency band for carrier sensing is 40 MHz, the frequency band includes 200 PRBs, the interval for interlacing in resource allocation within the frequency band is 20 PRBs, and there are 20 resource allocation units; when the bandwidth of the frequency band for carrier sensing is 20 MHz, the frequency band includes 100 PRBs, the interval for interlacing in resource allocation within the frequency band is 10 PRBs, and there are 10 resource allocation units; when the bandwidth of the frequency band for carrier sensing is 10 MHz, the frequency band includes 50 PRBs, the interval for interlacing in resource allocation within the frequency band is 5 PRBs, and there are 5 resource allocation units; when the bandwidth of the frequency band for carrier sensing is 5 MHz, the frequency band includes 25 PRBs, the interval for interlacing in resource allocation within the frequency band is 5 PRBs, and there are 5 resource allocation units, as shown in Table 2.

TABLE 2

Mapping between bandwidths of the frequency bands for carrier sensing and intervals for interlacing

| bandwidth of frequency band for carrier sensing (MHz) | bandwidth of frequency band for carrier sensing (the number of PRBs) | interval for interlacing | the number of PRBs in each resource allocation unit | the number of resource allocation units |
|---|---|---|---|---|
| 40 | 200 | 20 | 10 | 20 |
| 20 | 100 | 10 | 10 | 10 |
| 10 | 50 | 5 | 10 | 5 |
| 5 | 25 | 5 | 5 | 5 |

For a bandwidth of the frequency band for carrier sensing, the UE may also determine the interval for interlacing in resource allocation within the frequency band by receiving a higher layer signaling. For example, when the bandwidth of the frequency band for carrier sensing is 40 MHz, the frequency band includes 200 PRBs, the interval for interlacing in resource allocation within the frequency band is 20 PRBs, and there are 20 resource allocation units; when the bandwidth of the frequency band for carrier sensing is 20 MHz, the frequency band includes 100 PRBs, the interval for interlacing in resource allocation within the frequency band is 10 PRBs, and there are 10 resource allocation units; when the bandwidth of the frequency band for carrier sensing is 10 MHz, the frequency band includes 50 PRBs, the interval for interlacing in resource allocation within the frequency band is 5 PRBs, and there are 5 resource allocation units; when the bandwidth of the frequency band for carrier sensing is 5 MHz, the frequency band includes 25 PRBs, the interval for interlacing in resource allocation within the frequency band is 5 PRBs, and there are 5 resource allocation units, as shown in Table 2.

According to an embodiment of the present disclosure, under the condition that the bandwidth capabilities of the UEs are different, the bandwidth of the frequency band and the frequency band position for carrier sensing are flexibly configured by, for example, a combination of higher layer signaling and physical layer signaling, thereby implementing flexible carrier sensing and better utilization of unlicensed spectrum, providing greater throughput for the UE.

When the UE determines, by receiving UE-specific higher layer signaling, that the UE has more than one bandwidth of frequency band within one BWP for the UE to perform carrier sensing, the UE dynamically selects, by receiving physical layer signaling, one bandwidth of frequency band from the plurality of bandwidths of frequency band configured by the higher layer signaling for the UE to perform carrier sensing, and determines the selected bandwidth of frequency band as the bandwidth of frequency band for the UE to perform carrier sensing. There are several methods to determine it.

Approach 1:

In this embodiment, this physical layer signaling may be an independent field in the DCI in which the PUSCH is scheduled, which is used to indicate the bandwidth of frequency band for carrier sensing and is called the frequency band bandwidth indication field. Alternatively, this physical layer signaling may not be a field in the DCI in which the PUSCH is scheduled, but a field in a dedicated DCI which is used to indicate the bandwidth of frequency band for carrier sensing and is called the frequency band bandwidth indication field. For example, the UE 1 determines, by receiving UE-specific high-level signaling, that there are four bandwidths of frequency band for the UE to perform carrier sensing, which are 40 MHz, 20 MHz, 10 MHz, and 5 MHz, respectively, and the frequency band bandwidth indication field is 2 bits. The 2 bits may be a new field or a redundant field in the DCI, or other fields reinterpreted in the DCI, and the specific mapping between the frequency band bandwidth indication field values and the bandwidths of frequency band is as shown in Table 3. As long as the UE has determined, by receiving physical layer signaling, the bandwidth of the frequency band for carrier sensing, the allocation manner of frequency domain resources is also determined according to the relationship between the bandwidth of the frequency band for carrier sensing and the allocation manner of frequency domain resources, for example, according to the relationship between the bandwidth of the frequency band for carrier sensing and the allocation manner of frequency domain resources as shown in Table 2. The allocation manner of frequency domain resources includes interval for interlacing, the number of PRBs in each resource allocation unit, and the number of resource allocation units.

TABLE 3 mapping between frequency band bandwidth indication field values and bandwidths of frequency band

| frequency band bandwidth indication field value | bandwidth of frequency band (MHz) |
|---|---|
| 00 | 40 |
| 01 | 20 |
| 10 | 10 |
| 11 | 5 |

With this approach, carrier sensing can be performed according to the bandwidth required by the data, and the opportunity for the UE to utilize the unlicensed spectrum can be improved.

Approach 2:

In this embodiment, this physical layer signaling may be a joint coding field formed of a field indicating the bandwidth of frequency band for carrier sensing and other fields in the DCI in which the PUSCH is scheduled. For example, it may be a joint coding field indicating the bandwidth of frequency band for carrier sensing and the allocation of frequency domain resources, which is used to indicate the bandwidth of frequency band for carrier sensing and the allocation of frequency domain resources and is called the frequency band bandwidth indication and frequency domain resources allocation field. The different ranges of the field values represent different bandwidths of frequency band for carrier sensing.

For example, by receiving UE-specific higher layer signaling, the UE 1 determines four bandwidths of the frequency bands at which the UE may perform carrier sensing, which are 40 MHz, 20 MHz, 10 MHz, and 5 MHz, respectively. The frequency band bandwidth indication and frequency domain resources allocation field is N bits and is denoted as L. The specific mapping between the frequency band bandwidth indication and frequency domain resources allocation field values and the bandwidths of frequency band is as shown in Table 4. If the UE determines, by receiving physical layer signaling, the bandwidth of the frequency band for carrier sensing, the allocation manner of frequency domain resources is also determined according to the relationship between the bandwidth of the frequency band for the UE to perform carrier sensing and the allocation manner of frequency domain resources, for example, according to the relationship between the bandwidth of the frequency band for carrier sensing and the allocation manner of frequency domain resources as shown in Table 2. The allocation manner of frequency domain resources includes interval for interlacing, the number of PRBs in each resource allocation unit, and the number of resource allocation units.

TABLE 4 mapping between the frequency band bandwidth and frequency domain resources allocation indication field values and the bandwidths of frequency band

| frequency band bandwidth indication and frequency domain resources allocation field value | bandwidth of frequency band (MHz) |
| --- | --- |
| A > L >= 0 | 5 |
| B > L >= A | 10 |
| C > L >= B | 20 |
| D > L >= C | 40 |

Where D>C>B>A, where A, B, C, and D represent different values, indicating the different ranges of the frequency band bandwidth indication and frequency domain resources allocation field values.

With this approach, carrier sensing can be performed according to the bandwidth required by the data, and the opportunity for the UE to utilize the unlicensed spectrum can be improved.

In the case where there are a plurality of possible frequency band positions for the bandwidth of frequency band for carrier sensing, e.g., when the UE determines, by receiving UE-specific higher layer signaling, that the UE has more than one frequency band position within one BWP for carrier sensing, the UE dynamically selects, by receiving physical layer signaling, one frequency band position from the plurality of frequency band positions configured by the higher layer signaling for carrier sensing, and determines the selected frequency band position as the frequency band position for carrier sensing. There are several approaches to do this.

Figure 12:
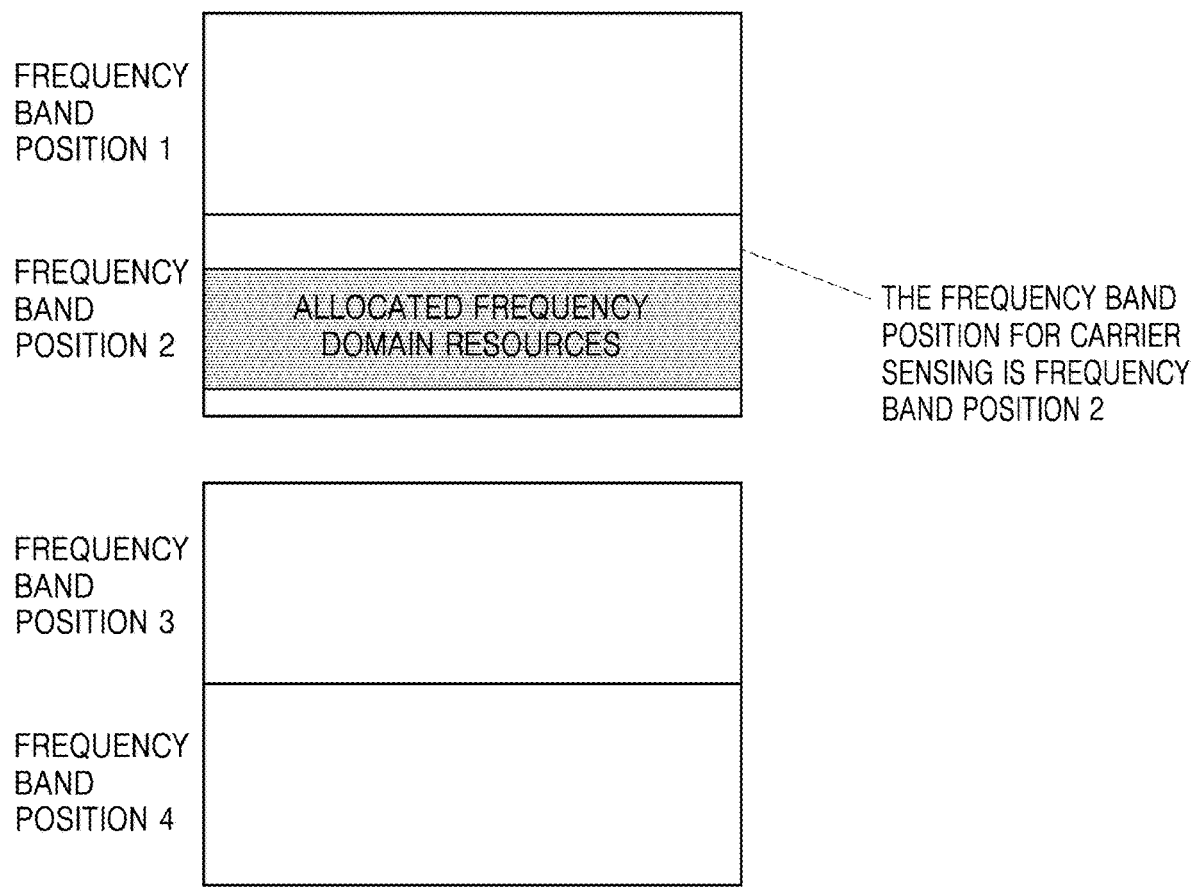
FIG. 12 illustrates a schematic diagram of determining the frequency band positions at which a UE performs carrier sensing according to an embodiment of the present disclosure.

Approach 1:

In this embodiment, this physical layer signaling may be an independent field in the DCI in which the PUSCH is scheduled, which is used to indicate the frequency band position for the UE to perform carrier sensing and is called the frequency band position indication field. Alternatively, this physical layer signaling may not be a field in the DCI in which the PUSCH is scheduled, but a field in a dedicated DCI which is used to indicate the frequency band position for carrier sensing and is called the frequency band position indication field. For example, the UE 1 determines, by receiving UE-specific high-level signaling, that when the bandwidth of frequency band for carrier sensing is 5 MHz, there are four possible frequency band positions at which the UE may perform carrier sensing, which are frequency band position 1, frequency band position 2, frequency band position 3, and frequency band position 4, respectively. The frequency band position indication field is 2 bits. The 2 bits may be new bits in the DCI, redundant bits in the DCI, or other fields reinterpreted in the DCI, and the specific mapping between the frequency band position indication field values and the frequency band positions is as shown in Table 5. If the UE has determined, by receiving physical layer signaling, the frequency band position for carrier sensing, the frequency domain resources in the frequency domain resource allocation are also determined according to the frequency band position for carrier sensing. The allocated frequency domain resources are included in the frequency band indicated by the frequency band position. As is shown in FIG. 12, the frequency band position for the UE to perform carrier sensing is frequency band position 2, and the allocated frequency domain resources are included in the frequency band indicated by the frequency band position 2.

TABLE 5 mapping between frequency band position indication field values and frequency band positions

| frequency band position indication field value | frequency band position |
| --- | --- |
| 00 | frequency band position 1 |
| 01 | frequency band position 2 |
| 10 | frequency band position 3 |
| 11 | frequency band position 4 |

The UE 1 determines, by receiving UE-specific high-level signaling, that when the bandwidth of frequency band for carrier sensing is 20 MHz, there are two possible frequency band positions at which the UE may perform carrier sensing, which are frequency band position 1 and frequency band position 2. The frequency band position indication field is 1 bit. The 1 bit may be a new bit in the DCI, a redundant bit in the DCI, or other fields reinterpreted in the DCI, and the specific mapping between the frequency band position indication field values and the frequency band positions is as shown in Table 6. If the UE has determined, by receiving physical layer signaling, the frequency band position for carrier sensing, the position of frequency domain resource allocation is also determined according to the frequency band position for the UE to perform carrier sensing. The positions of the frequency domain resources are included in the frequency band positions.

With this approach, a plurality of frequency band positions for carrier sensing are configured, and the effect of frequency diversity can be achieved.

TABLE 6 mapping between frequency band position indication field values and frequency band positions

| frequency band position indication field value | frequency band position |
| --- | --- |
| 0 | frequency band position 1 |
| 1 | frequenev band position 2 |

Approach 2:

In this embodiment, this physical layer signaling may be a joint coding field formed of a field indicating the frequency band position for carrier sensing and other fields in the DCI in which the PUSCH is scheduled. For example, it may be a joint coding field for indicating the frequency band position for carrier sensing and allocation of frequency domain resources, which is used to indicate the frequency band position for carrier sensing and the allocation of frequency domain resources and is called the frequency band position indication and frequency domain resources allocation field.

With this approach, a plurality of frequency band positions for carrier sensing are configured, and the effect of frequency diversity can be achieved.

Since the bandwidth of the frequency band at which the UE performs carrier sensing is dynamically obtained by the UE by receiving the indication in the DCI in which the PUSCH is scheduled, the number of bits of the DCI for scheduling the different bandwidth of the frequency band should be consistent, so that the DCI in which the PUSCH is scheduled can be blindly detected according to the determined number of bits of the DCI, and the number of blind detections can be reduced. Assuming that the frequency band bandwidth indication field in the DCI is an independent field, the UE obtains the bandwidth by receiving the frequency band bandwidth indication field in the DCI, and then, under the obtained bandwidth condition, obtains the frequency band position for carrier sensing and frequency domain resource allocation according to the format of the joint coding field indicating the frequency band position for carrier sensing and the allocation of frequency domain resources. However, under different bandwidth conditions, the number of bits required for the joint coding field indicating the frequency band position for carrier sensing and the allocation of frequency domain resources may be different, so padding bits are needed, so that when the bandwidth of the frequency band for carrier sensing is different, the number of bits of the DCI in which the PUSCH is scheduled is the same.

Figure 13:
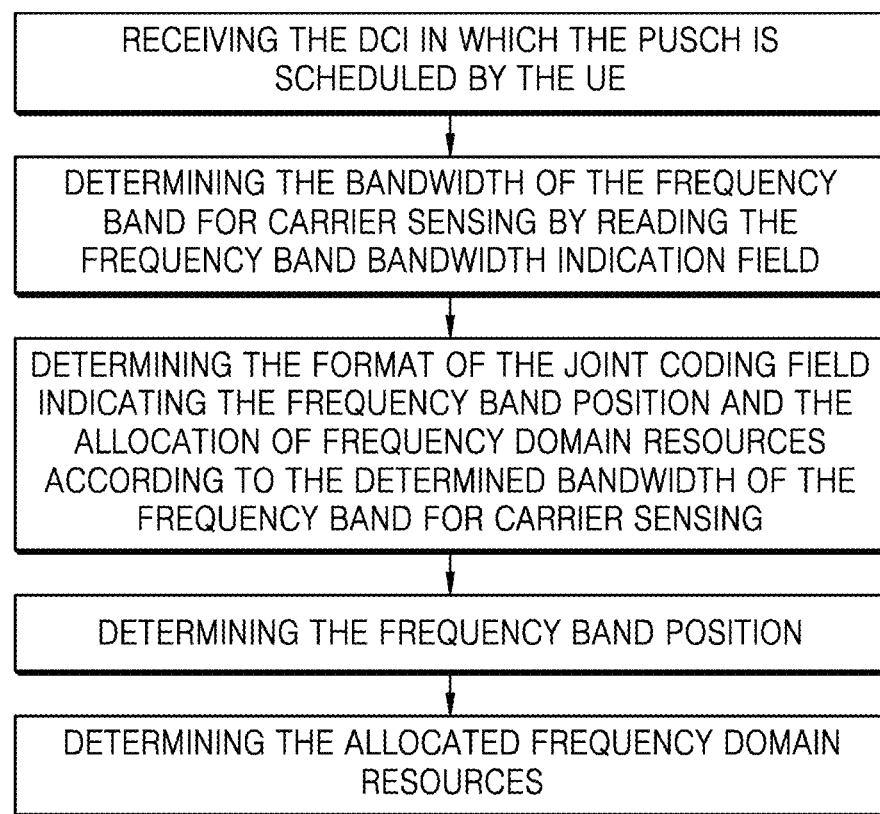
FIG. 13 illustrates a flowchart of a method for determining different bandwidth of frequency band at which UE performs carrier sensing by reading the DCI in which the PUSCH is scheduled according to an embodiment of the present disclosure.

A specific schematic flow chart is shown in FIG. 13. The UE first receives the DCI in which the PUSCH is scheduled; then determines the bandwidth of the frequency band for carrier sensing by reading the frequency band bandwidth indication field; and determines the format of the joint coding field indicating the frequency band position and the allocation of frequency domain resources according to the determined bandwidth of the frequency band for carrier sensing; determines the frequency band position according to the format; and determines the allocated frequency domain resources.

For example, by receiving UE-specific higher layer signaling, the UE 1 determines four bandwidths of the frequency bands at which the UE may perform carrier sensing, which are 40 MHz, 20 MHz, 10 MHz, and 5 MHz, respectively, and the frequency band bandwidth indication requires 2 bits.

When the bandwidth of the frequency band for carrier sensing is 40 MHz, the frequency band includes 200 PRBs, the interval for interlacing in resource allocation within the frequency band is 20 PRBs, and there are 20 resource allocation units. Frequency resource allocation needs: roundup (log $2(20*(20+1)/2))=8$ bits. There is one frequency band position for the UE to perform carrier sensing, so the frequency band position indication for carrier sensing is not required, and the number of bits of the joint coding field indicating the frequency band position for carrier sensing and the allocation of frequency domain resources is 8 bits.

When the bandwidth of the frequency band for carrier sensing is 20 MHz, the frequency band includes 100 PRBs, the interval for interlacing in resource allocation within the frequency band is 10 PRBs, and there are 10 resource allocation units. Frequency resource allocation needs: roundup (log $2(10*(10+1)/2))=6$ bits. There are two frequency band positions for the UE to perform carrier sensing, so a 1-bit frequency band position indication for carrier sensing is required, and the number of bits of the joint coding field indicating the frequency band position for carrier sensing and the allocation of frequency domain resources is 6+1=7 bits.

When the bandwidth of the frequency band for carrier sensing is 10 MHz, the frequency band includes 50 PRBs, the interval for interlacing in resource allocation within the frequency band is 5 PRBs, and there are 5 resource allocation units. Frequency resource allocation needs: roundup (log $2(5*(5+1)/2))=4$ bits. There are four frequency band positions for the UE to perform carrier sensing, so a 2-bit frequency band position indication for carrier sensing is required, and the number of bits of the joint coding field indicating the frequency band position for carrier sensing and the allocation of frequency domain resources is 4+2=6 bits.

When the bandwidth of the frequency band for carrier sensing is 5 MHz, the frequency band includes 25 PRBs, the interval for interlacing in resource allocation within the frequency band is 5 PRBs, and there are 5 resource allocation units. Frequency resource allocation needs: roundup (log $2(5*(5+1)/2))=4$ bits. There are four frequency band positions for the UE to perform carrier sensing, so a 2-bit frequency band position indication for carrier sensing is required, and the number of bits of the joint coding field indicating the frequency band position for carrier sensing and the allocation of frequency domain resources is 4+2=6 bits.

In order to ensure that the number of bits of the DCI in which the PUSCH is scheduled is the same when the bandwidth of the frequency band for carrier sensing is different, when the bandwidth of the frequency band for carrier sensing is 40 MHz, the number of bits of the joint coding field indicating the frequency band position for carrier sensing and the allocation of frequency domain resources is 8 bits; when the bandwidth of the frequency band for carrier sensing is 20 MHz, the number of bits of the joint coding field indicating the frequency band position for carrier sensing and the allocation of frequency domain resources is 7 bits, and 1 bit is added as padding bit to obtain a total of 8 bits; when the bandwidth of the frequency band for carrier sensing is 10 MHz, the number of bits of the joint coding field indicating the frequency band position for carrier sensing and the allocation of frequency domain resources is 6 bits, and 2 bits are added as padding bits to obtain a total of 8 bits; when the bandwidth of the frequency band for carrier sensing is 5 MHz, the number of bits of the joint coding field indicating the frequency band position for carrier sensing and the allocation of frequency domain resources is 6 bits, and 2 bits are added as padding bits to obtain a total of 8 bits. Thus, regardless of the bandwidth of the frequency band for carrier sensing, the total number of bits of the DCI does not change, and thus the number of blind detections of the DCI can be reduced.

Figure 14:
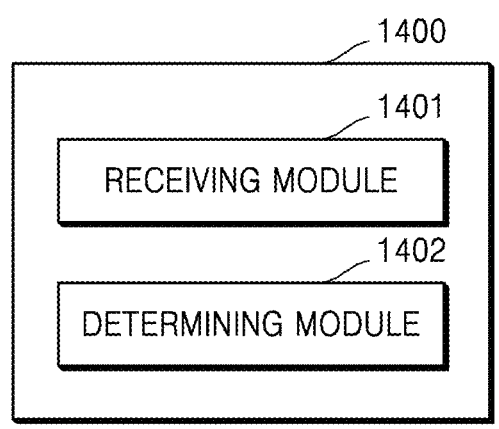
FIG. 14 illustrates a schematic block diagram of a user equipment for transmitting uplink information according to an embodiment of the present disclosure.

FIG. 14 illustrates a schematic block diagram of a user equipment for transmitting uplink information according to an embodiment of the present disclosure. The user equipment 1400 includes a receiving module 1401 and a determining module 1402.

Figure 45:
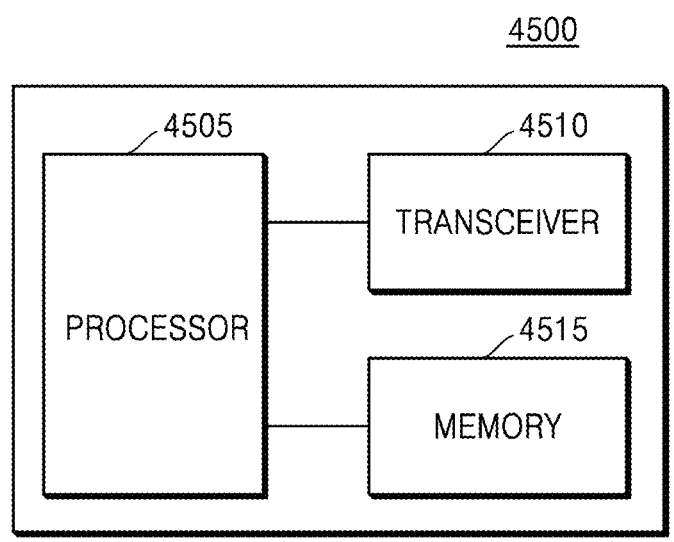
FIG. 45 is a diagram showing a UE according to an embodiment of the present disclosure.

The user equipment 1400 may correspond to the UE 4500 illustrated in FIG. 45. The transceiver 4510/processor 4505 of the UE 4500 may comprise the receiving module 1401/determining module 1402 of the user equipment 1400, or perform the operations performed by the receiving module 1401/determining module 1402 described herein, respectively.

The receiving module 1401 is configured to receive signalings from a base station.

The determining module 1402 is configured to determine a frequency band for carrier sensing and an allocation manner of uplink frequency domain resources based on a received signaling or by predefining via a protocol, and to transmit uplink information in uplink frequency domain resources determined according to the allocation manner of uplink frequency domain resources when a carrier is idle.

In an embodiment, the received signaling may comprise a user equipment (UE)-specific higher layer signaling, and a physical layer signaling, or a combination of a higher layer signaling and a physical layer signaling, or system information. The physical layer signaling may comprise information in Downlink Control Information (DCI).

In an embodiment, the determining the frequency band for carrier sensing and the allocation manner of uplink frequency domain resources by receiving the signaling by the user equipment 1400 may comprise: determining a bandwidth of the frequency band and a frequency band position at which the UE performs carrier sensing by the user equipment receiving a UE-specific higher layer signaling, and then obtaining the allocation manner of uplink frequency domain resources.

In an embodiment, the determining the frequency band for carrier sensing by receiving the signaling by the user equipment 1400 may comprise: determining a bandwidth of the frequency band and a plurality of frequency band positions at which UE performs carrier sensing by the UE receiving a UE-specific higher layer signaling; and determining a frequency band position at which UE performs carrier sensing among the plurality of frequency band positions by receiving a physical layer signaling or a medium access layer signaling.

In an embodiment, the determining the frequency band position at which UE performs carrier sensing among the plurality of frequency band positions by receiving the physical layer signaling or the medium access layer signaling by the user equipment 1400 may comprise: indicating the frequency band position at which UE performs carrier sensing by a new field in a DCI in which a Physical Uplink Shared Channel (PUSCH) is scheduled, a redundant field in the DCI, or other fields reinterpreted in the DCI; or determining the frequency band position at which UE performs carrier sensing by frequency domain resources allocated by a frequency resource allocation field in the DCI in which the PUSCH is scheduled.

In an embodiment, the determining the frequency band for carrier sensing by receiving the signaling by the user equipment 1400 may comprise: configuring a plurality of bandwidths of the frequency bands and a plurality of frequency band positions at which UE performs carrier sensing by UE receiving a UE-specific higher layer signaling; and determining a bandwidth of the frequency band and a frequency band position at which UE performs carrier sensing among the plurality of bandwidths of the frequency bands and the plurality of frequency band positions by UE receiving a physical layer signaling.

In an embodiment, for a bandwidth of the frequency band for carrier sensing, the user equipment 1400 may determine an interval for interlacing in resource allocation within the frequency band by predefining via a protocol or by receiving a higher layer signaling.

In an embodiment, the determining the bandwidth of the frequency band at which UE performs carrier sensing among the plurality of bandwidths of the frequency bands and the plurality of frequency band positions by receiving the physical layer signaling by the user equipment 1400 may comprise: determining the bandwidth of the frequency band for carrier sensing by using a field in a Downlink Control Information (DCI) in which a Physical Uplink Shared Channel (PUSCH) is scheduled, or a field in a dedicated DCI which is used to indicate the bandwidth of the frequency band for carrier sensing; or determining the bandwidth of the frequency band for carrier sensing by using a joint coding field formed of a field indicating the bandwidth of the frequency band for carrier sensing and other fields in a Downlink Control Information (DCI) in which a Physical Uplink Shared Channel (PUSCH) is scheduled.

In an embodiment, the determining the bandwidth of the frequency band for carrier sensing by using the field in the DCI in which the PUSCH is scheduled, or the field in the dedicated DCI which is used to indicate the bandwidth of the frequency band for carrier sensing by the user equipment 1400 may comprise: determining the bandwidth of the frequency band for carrier sensing by using a new field or a redundant field in the DCI, or other fields reinterpreted in the DCI as a frequency band bandwidth indication field.

In an embodiment, the joint coding field formed of a field indicating the bandwidth of the frequency band for carrier sensing and other fields comprises a frequency band bandwidth indication and frequency domain resources allocation field which is used to indicate the bandwidth of the frequency band for carrier sensing and allocation of frequency domain resources.

In an embodiment, the determining the frequency band position at which UE performs carrier sensing among the plurality of bandwidths of the frequency bands and the plurality of frequency band positions by receiving the physical layer signaling by the user equipment 1400 may comprise: determining the frequency band position for carrier sensing by using a field in a Downlink Control Information (DCI) in which a Physical Uplink Shared Channel (PUSCH) is scheduled, or a field in a dedicated DCI which is used to indicate the frequency band position for carrier sensing; or determining the frequency band position for carrier sensing by using a joint coding field formed of a field indicating the frequency band position for carrier sensing and other fields in a Downlink Control Information (DCI) in which a Physical Uplink Shared Channel (PUSCH) is scheduled.

In an embodiment, the determining the frequency band position for carrier sensing by using the field in the DCI in which the PUSCH is scheduled, or the field in the dedicated DCI which is used to indicate the bandwidth of the frequency band for carrier sensing by the user equipment 1400 may comprise: determining the frequency band position for carrier sensing by using a new field or a redundant field in the DCI, or other fields reinterpreted in the DCI as a frequency band position indication field.

In an embodiment, the joint coding field formed of a field indicating the frequency band position for carrier sensing and other fields may comprise a frequency band position indication and frequency domain resources allocation field which is used to indicate the frequency band position for carrier sensing and allocation of frequency domain resources.

In an embodiment, for different bandwidths of the frequency bands for carrier sensing, the user equipment 1400 may perform bit populating on the joint coding field formed of a field indicating the frequency band position for carrier sensing and other fields, so that the number of bits of the DCI in which the PUSCH is scheduled is the same.

With the user equipment (UE) of the embodiments of the present disclosure, under the condition that the bandwidth capabilities of the UEs are different, by dynamically changing the bandwidth of the CCA, the unlicensed spectrum can be better utilized to provide greater throughput for the UE.

This embodiment describes a method for determining a downlink receiving state at the time of BWP switching.

The downlink receiving state includes a wake-up signal (WUS) detection state, a PDCCH detection state, and a stop detection state, where the PDCCH detection state includes a PDCCH detection state of type A and a PDCCH detection state of type B, which will be described later. The stop detection state refers to a state in which neither the WUS nor the PDCCH is detected.

WUS is a reference signal which is set to reduce the implementation complexity of the UE and save the power consumption of the UE. In an exemplary embodiment, the UE starts detecting the PDCCH only after detecting the WUS, so that unnecessary PDCCH detection can be reduced. The detection of the WUS saves power compared to the detection of the PDCCH, therefore, the use of the WUS can achieve the purpose of reducing the implementation complexity of the UE and saving power consumption of the UE.

Since the time when the carrier sensing result is idle is random, this time may not be at the beginning of the time slot. In order to make full use of the downlink resources, immediately after the UE receives the WUS, the UE should detect the PDCCH in a smaller time period (called the PDCCH detection of the type B, for example, detecting the PDCCH with a period of 2 OFDM symbols). In this way, the interval between the time when the carrier sense result is idle and the time when the UE receives the PDCCH may be reduced, so that the data may be received by using the resource as soon as possible. After a certain period of time, the UE should detect the PDCCH in a larger time period (called the PDCCH detection of type A, for example, detecting the PDCCH with a period of one slot), because there is no need for low-latency traffic transmission in the unlicensed frequency band. This can save power consumption of the UE and save resources occupied by the PDCCH.

If the UE is configured with the WUS detection state, the PDCCH detection state of type B, the PDCCH detection state of type A, and the stop detection state, the UE may be in one of the four downlink receiving states: the WUS detection state, the PDCCH detection state of type B, the PDCCH detection state of type A, and the stop detection state. If the UE is configured with the WUS detection state and the PDCCH detection state, the UE may be in one of the two downlink receiving states: the WUS detection state and the PDCCH detection state. If the UE is configured with the PDCCH detection state of type B and the PDCCH detection state of type A, the UE may be in one of the two downlink receiving states: the PDCCH detection state of type B and the PDCCH detection state of type A.

Figure 15:
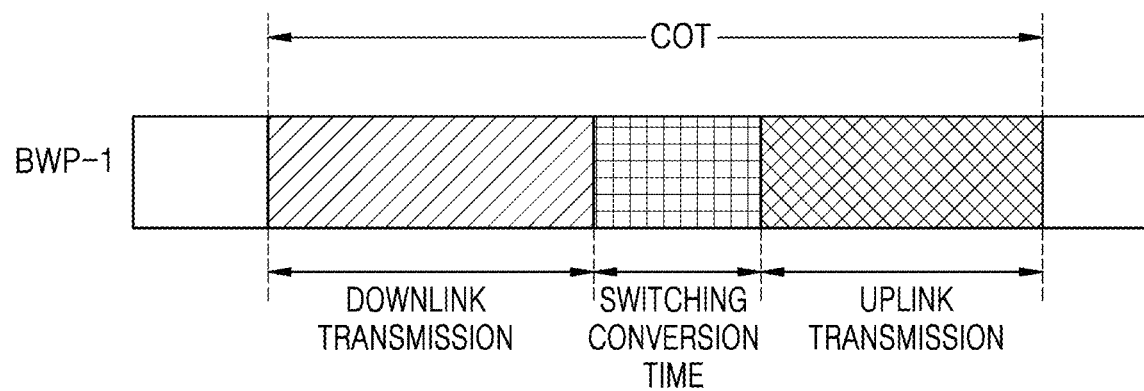
FIG. 15 illustrates an exemplary COT diagram including an uplink transmission, a downlink transmission, and a switching point, in accordance with an embodiment of the present disclosure.
Figure 16:
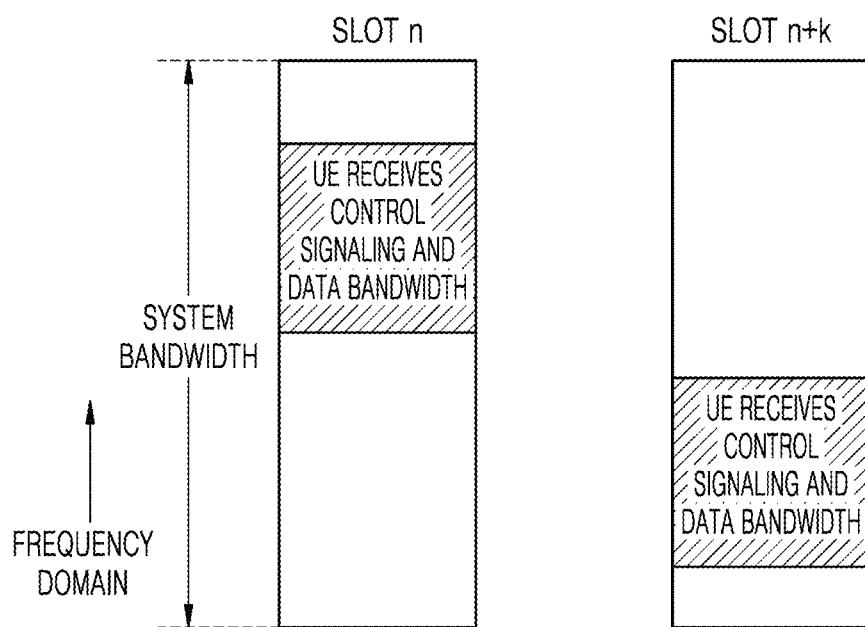
FIG. 16 is a schematic diagram of a UE operating in a limited frequency band in the background art.
Figure 17:
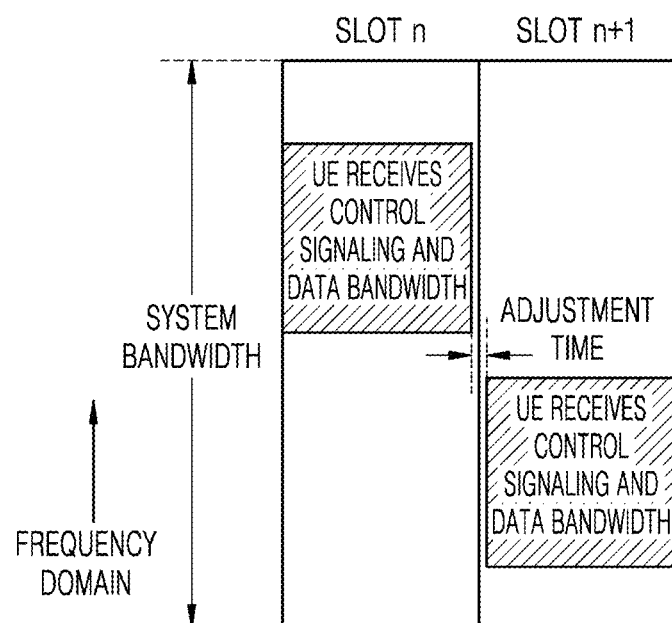
FIG. 17 is a schematic diagram of an adjustment time when a UE converts BWPs in the background art.

In the transmission in the unlicensed band, in order to reduce the interference to the WIFI system, the device cannot occupy the channel all the time. It is necessary to define a maximum channel occupation time, which is called Channel Occupancy Time (COT). The unpaired spectrum means that in one spectrum, there may be both uplink transmission (the UE transmits data, and the base station receives data) and downlink transmission (the base station transmits data, and the UE receives data). As shown in FIG. 15, in a COT, there may be both downlink transmission and uplink transmission, and downlink transmission is followed by uplink transmission, and between the downlink transmission and the uplink transmission, there is a switching point. There may be only one switching point in one COT.

When the UE is configured with multiple downlink BWPs, the activated downlink BWP of the UE dynamically switches from one downlink BWP to another downlink BWP. A switching mode of activated downlink BWP is to determine the switching by means of a timer. After the timer expires, the activated downlink BWP of the UE is switched from the current activated downlink BWP to another downlink BWP (for example, the default downlink BWP). This timer is denoted as bwp-switchTimer. The downlink receiving state of the currently activated downlink BWP of the UE determines the value of the bwp-switchTimer; that is, the different downlink receiving state of the currently activated downlink BWP of the UE adopts different value of the bwp-switchTimer. For example, when the downlink receiving state of the currently activated downlink BWP of the UE is the WUS detection state, the value of the bwp-switchTimer is bwp-switchTimer-1; that is, after the timer bwp-switchTimer-1 expires, the UE is switched from the currently activated downlink BWP to another downlink BWP. When the downlink receiving state of the currently activated downlink BWP of the UE is the PDCCH detection state, the value of the bwp-switchTimer is bwp-switchTimer-2; that is, after the timer bwp-switchTimer-2 expires, the UE is switched from the currently activated downlink BWP to another downlink BWP. Alternatively, after the COT of the currently activated downlink BWP ends, the UE switches from the currently activated downlink BWP to another downlink BWP; or, after the COT of the currently activated downlink BWP ends and the timer bwp-switchTimer-2 expires, the UE switches from the currently activated downlink BWP to another downlink BWP. When the downlink receiving state of the currently activated downlink BWP of the UE is the WUS detection state, this indicates that the base station performs carrier sensing on the downlink BWP. When the carrier sensing result of the base station is idle, the base station sends a WUS. If the UE does not receive the WUS, it may be because the interference suffered by this BWP is relatively serious. Therefore, the UE needs to switch to another downlink BWP that may not be seriously interfered with in order to receive the WUS, which improves the UE's work opportunity. When the downlink receiving state of the currently activated downlink BWP of the UE is the PDCCH detection state, this indicates that the carrier sensing result on the downlink BWP by the base station is already idle. If the UE does not receive the PDCCH for a long time, this may be because the base station has indicated the UE to switch to another downlink BWP but the UE did not receive the indication, and the UE and the base station have different understandings of the activated downlink BWP. Therefore, in order to make the UE and the base station have the same understanding of the activated downlink BWP, the UE needs to switch to a default downlink BWP to detect the PDCCH. Therefore, it is advantageous to determine an independent value of bwp-InactivityTimer according to the downlink receiving state of the currently activated downlink BWP of the UE.

According to an embodiment of the present disclosure, there is also provided a user equipment for transmitting uplink information, comprising a memory and a processor, the memory storing computer executable instructions, the instructions causing the processor to perform the method for transmitting uplink information in accordance with embodiments of the present disclosure when executed by the processor.

"User Equipment" or "UE" herein may refer to any terminal having wireless communication capabilities including but not limited to a mobile phone, a cellular phone, a smart phone or a personal digital assistant (PDA), a portable computer, an image capture device such as a digital camera, gaming equipment, music storage and playback equipment, and any portable unit or terminal with wireless communication capabilities, or Internet facilities that allow wireless Internet access and browsing.

The term "base station" (BS) used herein may refer to eNB, eNodeB, NodeB, or base station transceiver (BTS), or gNB, etc., depending on the technology and terminology used.

According to an embodiment of the present disclosure, there is also provided a computer readable medium having stored thereon computer executable instructions, the instructions causing a processor to perform the method for transmitting uplink information as described in the foregoing embodiments of the present disclosure when executed by the processor.

The method for determining the activation state of bandwidth part (BWP) of the present disclosure may be applied to a wireless communication system where UE has a limited bandwidth capacity, and may also be applied to another situation in which the UE cannot receive both data and control signaling within all configured BWPs for other reasons at the same time. Or, the method may be applied to the situation in which when the amount of data is not large, for saving power, the UE only receives data and control signaling within a part of the configured BWP, that is, the UE has at least one active DL BWP, and it may also be applied to the situation in which when the amount of data is large, if the UE bandwidth capacity is large enough, the UE can receive data and control signaling within all configured BWPs.

Figure 18:
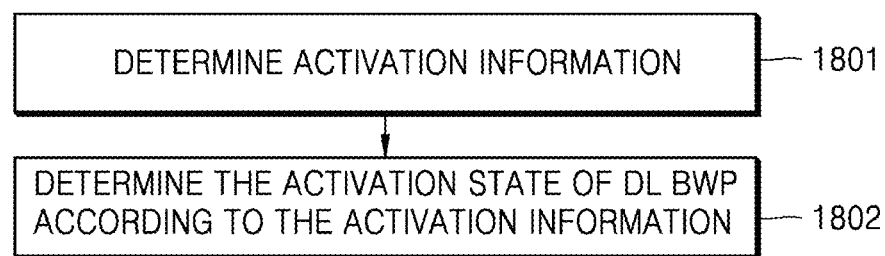
FIG. 18 is a flowchart of a method for determining an activation state of bandwidth part according to the present disclosure.

Referring to FIG. 18, the method for determining the activation state of bandwidth part (BWP) disclosed in the disclosure includes the following steps:

Step 1801: determining activation information;
Step 1802: determining an activation state of BWP according to the activation information.

The method for determining the activation state of BWP of the present disclosure is clarified by several embodiments below, and the activation information may be any form of information having a function indicating the determination of the activation state of BWP, for example, an indication information in the DCI received by the UE, or a PDSCH signal received by the UE, etc., wherein the activation state of BWP refers to whether the BWP is an active BWP or an inactive BWP.

Embodiment 1

This embodiment describes that when the UE is configured with more than one downlink (DL) BWP, the bandwidth range of all DL BWPs configured to the UE exceeds the bandwidth capacity of the UE due to the limited bandwidth capacity of the UE, then the UE cannot receive PDCCH and the PDSCH in all BWPs at the same time; or for other reasons, the UE determines, by receiving the configuration information of the base station, that the UE cannot receive the PDCCH and the PDSCH in all the BWPs at the same time; or in order to save power for the UE when the amount of data is small, the UE only receives data and control signaling in a part of configured BWPs, that is, the UE has at least one active DL BWP; and when the amount of data is large, if the bandwidth capacity of the UE is large enough, the UE can receive data and control signaling in all the configured BWPs, and the UE receives the PDCCH and the PDSCH only on the active DL BWP, while the UE does not receive the PDCCH and the PDSCH on the inactive DL BWP.

The UE determines one or more active DL BWPs by receiving UE-specific high layer signaling configuration or reconfiguration, where all bandwidths of one or more active DL BWPs are within the bandwidth capacity of the UE (configuring multiple active DL BWPs are adjacent in the frequency domain, or are close to each other in frequency domain simultaneously), that is, the UE can simultaneously receive both the PDCCH and the PDSCH on one or more active DL BWPs determined by the high layer signaling configuration or reconfiguration, without beyond the bandwidth capacity of the UE. For example, the UE configures or reconfigures four DL BWPs by receiving UE-specific high layer signaling, and configures or reconfigures two active DL BWPs by receiving UE-specific high layer signaling. In this case, the UE can receive both the PDCCH and PDSCH on two active DL BWPs at the same time.

Then, the UE dynamically changes the activation state of DL BWP by receiving physical layer signaling, where the DL BWP state includes an active state and an inactive state, that is, the UE may receive the PDCCH and the PDSCH on the DL BWP in the active state, and the UE cannot receive the PDCCH and the PDSCH on the DL BWP in the inactive state. The DL BWP may be changed from the active state to the inactive state, or may be changed from the inactive state to the active state, and the UE dynamically changes the state of DL BWP by the physical layer signaling by the following methods:

The First Method

The UE indicates the active DL BWP by receiving the bits in the DCI in the PDCCH for scheduling the PDSCH. These bits are referred to as BWP indicator (BWPI) field, and if the DL BWP indicated by the BWPI field is the DL BWP receiving the DCI, the active DL BWP remains unchanged. If the DL BWP indicated by the BWPI field is not the DL BWP receiving the DCI, the BWPI field indicates the newly-added active DL BWP, that is, the active DL BWP may remain unchanged or may be changed. For example, the UE configures or reconfigures four DL BWPs, which are BWP-1, BWP-2, BWP-3, and BWP-4, respectively, by receiving UE-specific high layer signaling, and the BWPI is 2 bits. The mapping relation between the BWPI and the active DL BWP is shown in Table 7.

TABLE 7 a mapping relation between BWPI and active DL BWP

| BWPI value | Active DL BWP |
|---|---|
| 00 | BWP-1 |
| 01 | BWP-2 |
| 10 | BWP-3 |
| 11 | BWP-4 |

If the newly-added active DL BWP and all existing active DL BWPs are contained in the bandwidth capacity of the UE, the newly-added active DL BWP and all existing active DL BWPs become active DL BWPs; if the newly-added active DL BWP and all existing active DL BWPs are not completely contained in the bandwidth capacity of the UE, the newly-added active DL BWP and the DL BWP of existing active DL BWPs, which together with the newly-added active DL BWP is within the bandwidth capacity of the UE, become active DL BWPs, and the BWP of the existing active DL BWPs, which together with the newly-added active DL BWP is not within the bandwidth capacity of the UE, becomes active DL BWPs.

Figure 19:
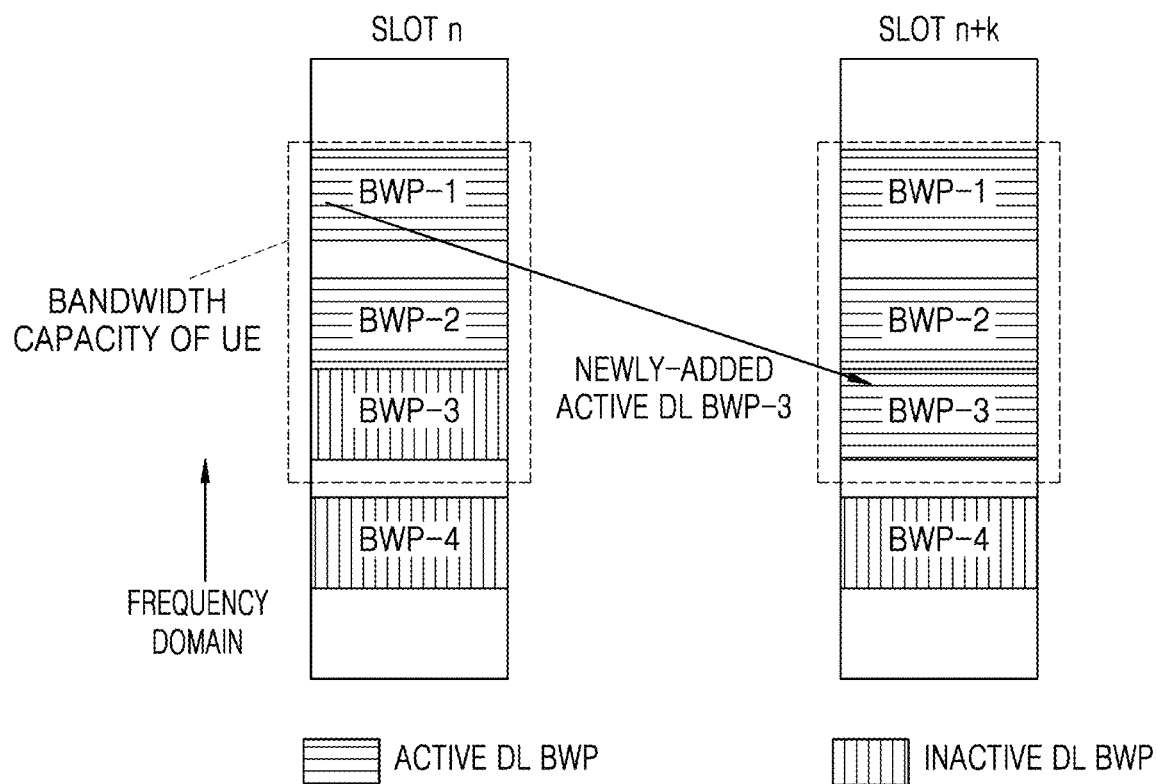
FIG. 19 is a schematic diagram of a newly-added active BWP and an existing active BWP within a bandwidth capacity range according to Embodiment 1 of the present disclosure.
Figure 20:
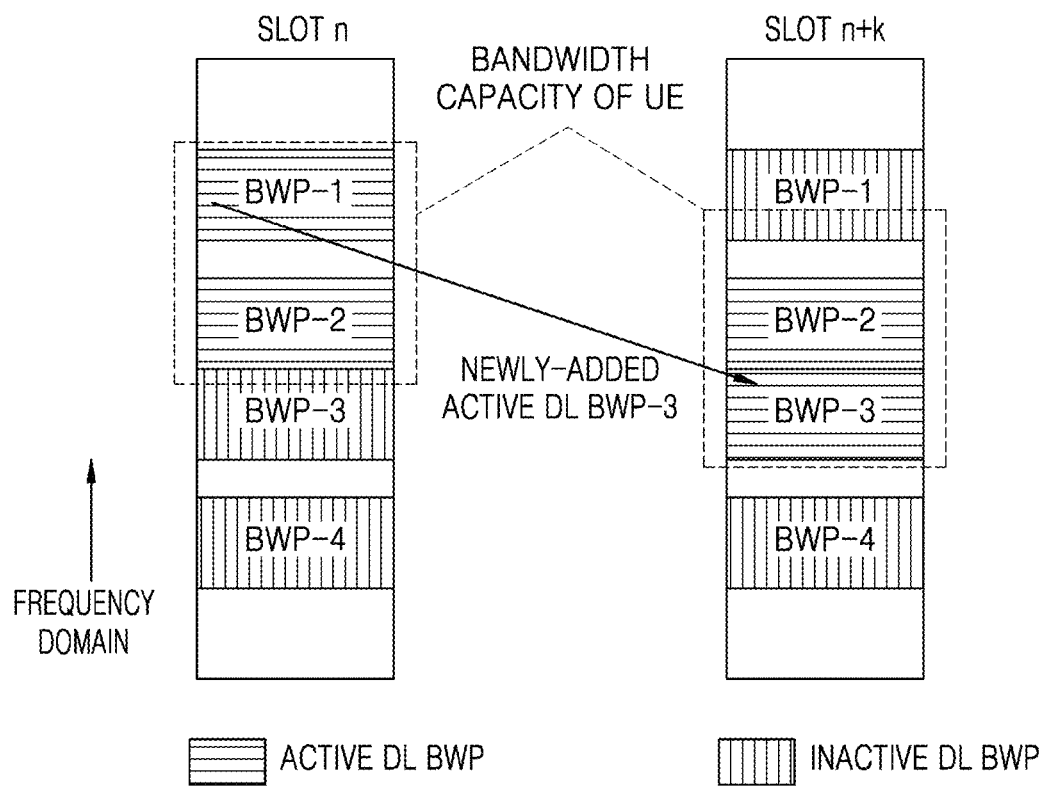
FIG. 20 is a schematic diagram of a newly-added active BWP and an existing active BWP without a bandwidth capacity range according to Embodiment 1 of the present disclosure.

For example, the UE configures or reconfigures four DL BWPs which are BWP-1, BWP-2, BWP-3, and BWP-4, respectively, by receiving UE-specific high layer signaling, and configures or reconfigures two active DL BWPs which are BWP-1 and BWP-2, respectively, by receiving the UE-specific high layer signaling. When the UE receives the DCI in the PDCCH for scheduling PDSCH on BWP-1, the BWPI in the DCI indicates BWP-3, that is, one active DL BWP is newly added which is BWP-3. If BWP-1, BWP-2 and BWP-3 are all contained within the bandwidth capacity of the UE, then they become three active DL BWPs, which are BWP-1, BWP-2 and BWP-3, respectively, as shown in FIG. 19; if the newly-added active BWP-3 and the existing active BWP-2 are contained within the bandwidth capacity of the UE, the newly-added active BWP-3 and the existing active BWP-1 are not contained within the bandwidth capacity of the UE, then, they becomes two active DL BWPs, which are BWP-2 and BWP-3 respectively, and BWP-1 becomes an inactive DL BWP, as shown in FIG. 20.

The Second Method

For one active DL BWP, a timer can be used to determine whether the active DL BWP is still an active DL BWP, that is, a timer timing value may be configured. If the UE receives the DCI or the PDSCH on the active DL BWP, the timer is set to 0. If the DCI or PDSCH is not received, the timer accumulates 1. When the timer accumulates and reaches the timer timing value, the active DL BWP becomes the inactive DL BWP, such that the unused active DL BWP becomes the inactive DL BWP, thus the power is saved. For example, the configured timer timing value is 10. If the UE receives the DCI or PDSCH on the active DL BWP-1 in the slot n, the timer is set to 0; if the UE does not receive the DCI or PDSCH on the active DL BWP-1 in the slot n+1, the timer becomes 1; and if the UE does not receive the DCI or PDSCH on the active DL BWP-1 in the slot n+2 to the slot n+10, the timer becomes 10, and the active DL BWP-1 becomes the inactive DL BWP. Such that the unused active DL BWP becomes the inactive DL BWP, thus the power is saved.

The Third Method

For one active DL BWP, a timer can be used to determine whether the active DL BWP is still an active DL BWP, that is, a timer timing value may be configured. If the UE receives the DCI or the PDSCH on the active DL BWP, the timer is set to 0; if the DCI or PDSCH is not received, the timer accumulates 1; if the timer accumulates and reaches the timer timing value, the active DL BWP becomes the inactive DL BWP, such that the unused active DL BWP becomes the inactive DL BWP, thus the power is saved. If all the DL BWPs configured by the UE become inactive DL BWPs, the default DL BWP becomes the active DL BWP. The default DL BWP can be configured by high layer signaling or the default DL BWP is the DL BWP for initial access. For example, the UE configures or reconfigures four DL BWPs which are BWP-1, BWP-2, BWP-3, and BWP-4, respectively, by receiving UE-specific high layer signaling, and configures or reconfigures two active DL BWPs which are BWP-1 and BWP-2, respectively, by receiving UE-specific high layer signaling, the UE configures BWP-1 as the default DL BWP by receiving UE-specific high layer signaling; if the UE has not received the DCI or the PDSCH on all the DL BWPs for a long time, all the DL BWPs become the inactive DL BWPs. In this case, the BWP-1 served as the default DL BWP becomes the active downlink BWP.

Or the default DL BWP is at least one DL BWP. If all the DL BWPs configured by the UE become inactive DL BWPs, the one or more default DL BWPs become active DL BWPs. The default DL BWP may be configured by high layer signaling, or the default DL BWPs are a combination of the DL BWPs for initial access and the DL BWPs configured by the high layer signaling. If the amount of the default DL BWPs of the UE is greater than one, multiple default DL BWPs are all contained within the bandwidth capacity of the UE. For example, the UE configures or reconfigures four DL BWPs, which are BWP-1, BWP-2, BWP-3, and BWP-4 respectively, by receiving UE-specific high layer signaling, and configures or reconfigures two active DL BWPs, which are BWP-1 and BWP-2 respectively, by receiving UE-specific high layer signaling. The UE configures BWP-2 and BWP-3 as default DL BWPs by receiving UE-specific high layer signaling; if the UE has not received the DCI or the PDSCH on all the DL BWPs for a long time, all the DL BWPs become inactive DL BWPs, and the BWP-2 and BWP-3 served as the default DL BWP become active DL BWPs.

The Fourth Method

The UE indicates the active DL BWP by receiving bits in the DCI in the PDCCH for scheduling the PDSCH. These bits are referred as to the BWPI field, and the BWPI field indicates the active DL BWP. If the DL BWP receiving the PDCCH for scheduling the PDSCH is different from the active DL BWP indicated by the BWPI field in the DCI of the PDCCH for scheduling PDSCH, the BWP indicated by the BWPI field becomes the active DL BWP, and the DL BWP receiving the PDCCH for scheduling the PDSCH becomes the inactive DL BWP. For example, the UE configures or reconfigures four DL BWPs, which are BWP-1, BWP-2, BWP-3, and BWP-4, respectively, by receiving UE-specific high layer signaling, and configures or reconfigures two active DL BWPs, which are BWP-1 and BWP-2, respectively, by receiving UE-specific high layer signaling; if the UE receives the DCI in the PDCCH for scheduling PDSCH on the BWP-1, and the BWPI in the DCI indicates the BWP-3, one active DL BWP is newly added which is the BWP-3, at the same time the BWP-1 becomes the inactive DL BWP. If the DL BWP receiving the PDCCH for scheduling the PDSCH is the same as the active DL BWP indicated by the BWPI field in the DCI in the PDCCH for scheduling the PDSCH, the DL BWP indicated by the BWPI field is the DL BWP receiving the PDCCH for scheduling the PDSCH The Fifth Method The UE includes a BWPI field by receiving bits in the DCI in the PDCCH for scheduling the PDSCH, wherein the field includes two parts, where the first part is referred to as a first part of the BWPI field which indicates a newly-added active DL BWP. The second part is referred to as a second part of the BWPI field which indicates the state of the current-active DL BWP (that is, the state of the DL BWP where the UE receives the DCI in the PDCCH). For example, the UE configures or reconfigures four DL BWPs which are BWP-1, BWP-2, BWP-3, and BWP-4, respectively, by receiving UE-specific high layer signaling, and the first part of the BWPI is 2 bits, and a mapping relation between the first part of the BWPI and the newly-added active DL BWP is shown in Table 8.

TABLE 8 a mapping relation between the first part of
the BWPI and the newly-added active DL BWP

| BWPI value | Newly-added active DL BWP |
| --- | --- |
| 00 | BWP-1 |
| 01 | BWP-2 |
| 10 | BWP-3 |
| 11 | BWP-4 |

At the same time, the UE indicates whether the current-active DL BWP (that is, the DL BWP where the UE receives the DCI in the PDCCH) becomes an inactive DL BWP by receiving bits in the DCI in the PDCCH for scheduling PDSCH. These bits are referred as to a second part of the BWPI field which indicates whether the current-active DL BWP (that is, the DL BWP where the UE receives the DCI in the PDCCH) is still the active DL BWP or becomes the inactive DL BWP. For example, the second part of the BWPI is 1 bit, if the value of the second part of the BWPI is "0", the current-active DL BWP (that is, the DL BWP where the UE receives the DCI in the PDCCH) becomes the inactive DL BWP, if the value of the second part of the BWPI is "1", the current-active DL BWP (that is, the DL BWP where the UE receives the DCI in the PDCCH) is still the active DL BWP. A mapping relation between the value of the second part of the BWPI and the state of the current-active DL BWP (that is, the DL BWP where the UE receives the DCI in the PDCCH) is shown in Table 9.

TABLE 9 a mapping relation between the second
part of the BWPI and the active DL BWP

| BWPI value | Current-active DL BWP (i.e. the DL BWP where the UE receives the DCI in the PDCCH) |
| --- | --- |
| 0 | Active |
| 1 | Inactive |

For example, the UE configures or reconfigures four DL BWPs which are BWP-1, BWP-2, BWP-3, and BWP-4, respectively, by receiving UE-specific high layer signaling, and configures or reconfigures two active DL BWPs, which are BWP-1 and BWP-2, respectively, by receiving UE-specific high layer signaling, if the UE receives the DCI in the PDCCH for scheduling the PDSCH on the BWP-1, and the first part of the BWPI in the DCI indicates the BWP-3, one active DL BWP is newly-added which is the BWP-3. If the value of the second part of the BWPI in the DCI is "0", the current-active DL BWP becomes the inactive DL BWP, that is the BWP-1 becomes the inactive DL BWP; if the value of the second part of the BWPI in the DCI is "1", the current-active DL BWP is still the active DL BWP, that is, the BWP-1 is still the active DL BWP. In addition, if the UE configures or reconfigures four DL BWPs which are BWP-1, BWP-2, BWP-3, and BWP-4, respectively, by receiving UE-specific high layer signaling, and configures or reconfigures two active DL BWPs, which are BWP-1 and BWP-2, respectively, by receiving UE-specific high layer signaling. If the UE receives the DCI in the PDCCH for scheduling the PDSCH on the BWP-1, and the first part of the BWPI in the DCI indicates the BWP-1, no new DL active BWP is newly-added. If the value of the second part of the BWPI in the DCI is "0", the current-active DL BWP becomes the inactive DL BWP, that is, the BWP-1 becomes the inactive DL BWP; if the value of the second part of the BWPI in the DCI is "1", the current-active DL BWP is still the active DL BWP, that is, the BWP-1 is still the active DL BWP.

Embodiment 2

This embodiment describes that when the UE is configured with more than one DL BWP, the bandwidth range of all DL BWPs configured to the UE exceeds the bandwidth capacity of the UE due to the limited bandwidth capacity of the UE. The UE cannot receive PDCCH and PDSCH in all the BWPs at the same time; or for other reasons, the UE determines by receiving the configuration information of the base station that the UE cannot receive the PDCCH and the PDSCH in all the BWPs at the same time; or when the amount of the data is not large, for saving power, the UE only receives data and control signaling in a part of configured BWPs, that is, the UE has at least one active DL BWP; or when the amount of the data is large, if the bandwidth capacity of the UE is large enough, the UE may receive data and control signaling in all the configured BWPs. The UE receives PDCCH and PDSCH only on the active DL BWPs, while the UE does not receive the PDCCH and PDSCH on the inactive DL BWP.

The UE divides the DL BWPs configured to the UE into groups by receiving the UE-specific high layer signaling configuration or reconfiguration, and each group contains one or more DL BWPs, and all bandwidths of the one or more DL BWPs in each group are within the bandwidth capacity of the UE. The switching of the active DL BWP is in unit of groups, that is, the DL BWPs in one group simultaneously become the active DL BWPs, or the DL BWPs in one group simultaneously become the inactive DL BWPs.

Figure 21:
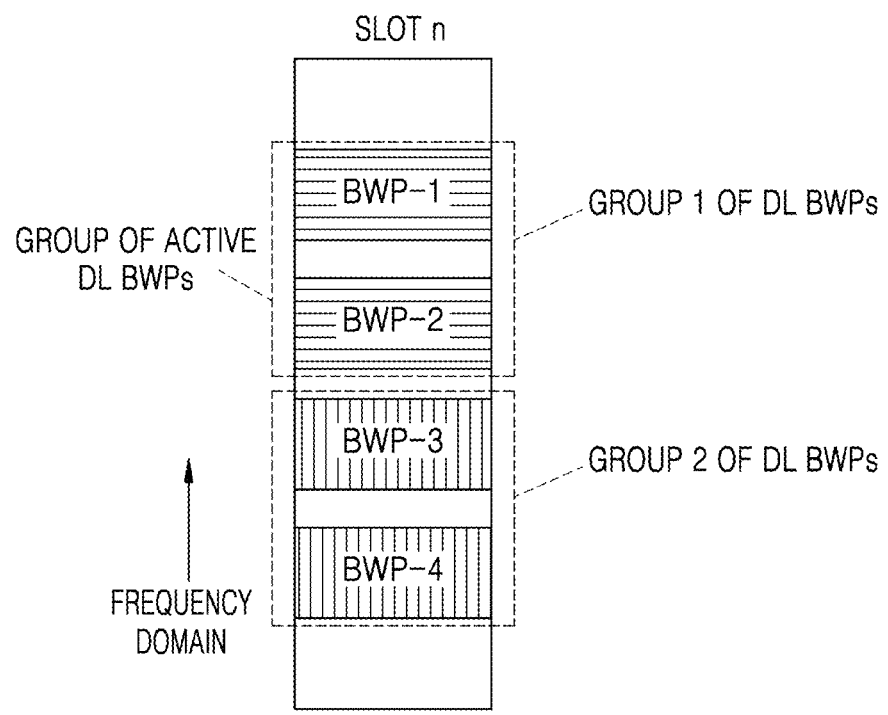
FIG. 21 is a schematic diagram of a configuration of groups of DL BWPs according to Embodiment 2 of the present disclosure.

For example, the UE configures or reconfigures four DL BWPs which are BWP-1, BWP-2, BWP-3, and BWP-4, respectively, by receiving UE-specific high layer signaling, and configures or reconfigures two groups of DL BWPs by receiving UE-specific high layer signaling, wherein the BWP-1 and BWP-2 belong to the first group of DL BWPs, and the BWP-3 and BWP-4 belong to the second group of DL BWPs. The UE determines that the DL BWPs in the first group of DL BWPs is the active DL BWPs by receiving UE-specific high layer signaling configuration or reconfiguration. At this time, the UE can receive the PDCCH and the PDSCH on the two active DL BWPs, as shown in FIG. 21.

Then, the UE dynamically changes the group of active DL BWP by receiving the physical layer signaling. There are several methods by which the UE dynamically changes the group of active DL BWP by using the physical layer signaling. The physical layer signaling here is the field in the DCI in the PDCCH for scheduling the PDSCH.

The First Method

The UE indicates the active DL BWP by receiving bits in the DCI in the PDCCH scheduling for the PDSCH, and these bits are referred to as BWPI fields. If the DL BWP indicated by the BWPI field is the BWP in another group of DL BWPs, instead of the DL BWP in the group of current-active DL BWPs, the group of the active DL BWPs becomes the group of the DL BWPs to which the DL BWP indicated by the BWPI belongs.

For example, the UE configures or reconfigures four DL BWPs which are BWP-1, BWP-2, BWP-3, and BWP-4, respectively, by receiving UE-specific high layer signaling, wherein the BWPI is two bits, the mapping relation between the BWPI and the active DL BWP is shown in Table 10, wherein BWP-1 and BWP-2 belong to the first group of DL BWPs, BWP-3 and BWP-4 belong to the second group of DL BWPs, and the UE determines that the DL BWPs in the first group of DL BWPs are the active DL BWPs by receiving UE-specific high layer signaling configuration or reconfiguration. When the UE receives the DCI in the PDCCH for scheduling the PDSCH on the BWP-1, and the BWPI in the DCI indicates the BWP-3, the second group of the DL BWPs to which the BWP-3 belongs becomes the group of active DL BWPs, and the BWP-3 and BWP-4 in the second group of DL BWPs become active DL BWPs; the first group of DL BWPs becomes the group of the inactive DL BWPs, and BWP-1 and BWP-2 in the first group of DL BWPs become the inactive DL BWPs.

TABLE 10 a mapping relation between BWPI and active DL BWP

| BWPI value | Active DL BWP |
|---|---|
| 00 | BWP-1 |
| 01 | BWP-2 |
| 10 | BWP-3 |
| 11 | BWP-4 |

The Second Method

The UE indicates the group of active DL BWPs by receiving bits in the DCI in the PDCCH for scheduling the PDSCH, and these bits are referred to as BWPI fields. If the group of the DL BWPs indicated by the BWPI field is another group of DL BWPs, instead of the group of current-active DL BWPs (the group of BWPs receiving the DCI in the PDCCH for scheduling PDSCH is the group of current-active DL BWPs), the group of the active DL BWPs becomes the group of DL BWPs indicated by the BWPI, and the group of BWPs receiving the DCI in the PDCCH for scheduling PDSCH becomes the group of inactive DL BWPs. If the group of DL BWPs indicated by the BWPI is the group of the current-active DL BWPs (the group of BWPs receiving the DCI in the PDCCH for scheduling PDSCH is the group of current-active DL BWPs), the group of the active DL BWPs remains unchanged.

For example, the UE configures or reconfigures four DL BWPs by receiving UE-specific high layer signaling, which are BWP-1, BWP-2, BWP-3, and BWP-4, respectively, wherein the BWPI is one bit. The mapping relation between the BWPI and the group of the active DL BWPs is shown in Table 11, wherein BWP-1 and BWP-2 belong to the first group of DL BWPs, and BWP-3 and BWP-4 belong to the second group of DL BWPs, and the UE determines that the DL BWPs in the first group of DL BWPs are the active DL BWPs. When the UE receives the DCI in the PDCCH for scheduling PDSCH on the BWP-1, the BWPI in the DCI indicates the second group of DL BWPs, then the second group of DL BWPs becomes the group of active DL BWPs, the BWP-3 and BWP-4 in the second group of DL BWPs become the active DL BWPs; the first group of DL BWPs becomes the group of inactive DL BWPs, and the BWP-1 and BWP-2 in the first group of DL BWPs become the inactive DL BWPs.

TABLE 11 a mapping relation between BWPI and active DL BWP

| BWPI value | Group of active DL BWPs |
|---|---|
| 0 | First group of DL BWPs |
| 1 | Second group of DL BWPs |

The Third Method

For one group of active DL BWPs, a timer can be used to determine whether the group of active DL BWPs is still a group of active DL BWPs, that is, a timer time value is configured. If the UE receives the DCI or the PDSCH on any one of DL BWP in this group of active DL BWPs, the timer is set to 0; if the DCI or the PDSCH is not received on all the DL BWPs in this group of active DL BWPs, the timer accumulates 1; when the timer accumulates and reaches the timer time value, the default group of DL BWPs becomes the group of active DL BWPs, and all the BWPs in the default group of DL BWPs becomes the active DL BWPs. The default group of DL BWPs may be configured by the high layer signaling, or the default group of DL BWPs is the group of DL BWPs to which the DL BWP for initial access belongs, or the default group of DL BWPs is composed of the DL BWP for initial access and the group of DL BWPs configured by the high layer signaling. If the amount of the DL BWPs in the default group of the DL BWPs of the UE is greater than one, multiple default DL BWPs are contained within the bandwidth capacity of the UE. For example, the UE configures or reconfigures four DL BWPs which are BWP-1, BWP-2, BWP-3, and BWP-4, respectively, by receiving UE-specific high layer signaling, wherein the BWP-1 and BWP-2 belong to the first group of DL BWPs, the BWP-3 and the BWP-4 belong to the second group of DL BWPs, and the UE determines that the DL BWPs in the first group of DL BWPs are the active DL BWPs by receiving UE-specific high layer signaling configuration or reconfiguration. The UE determines that the second group of DL BWPs is the default group of DL BWPs by receiving UE-specific high layer signaling configuration or reconfiguration. It is assumed herein that the UE has only one group of active DL BWPs at the same time. It is assumed in the method that the UE has only one group of active DL BWPs at the same time.

Embodiment 3

This embodiment describes that when the UE is configured with more than one DL BWP, the bandwidth range of all DL BWPs configured to the UE exceeds the bandwidth capacity of the UE due to the limited bandwidth capacity of the UE. The UE cannot receive the PDCCH and PDSCH within all the BWPs at the same time; or for other reasons, the UE determines, by receiving the configuration information of the base station, that the UE cannot receive the PDCCH and the PDSCH within all the BWPs at the same time; or when the amount of data is not large, in order to save power for the UE, the UE only receives the data and control signaling in a part of configured BWPs, that is, the UE has at least one active DL BWP; and when the amount of data is large, if the bandwidth capacity of the UE is large enough, the UE can receive data and control signaling within all the configured BWPs. Therefore, the UE receives the PDCCH and the PDSCH only on the active DL BWP, while the UE does not receive the PDCCH and PDSCH on the inactive DL BWP.

The UE determines one or more active DL BWPs by receiving UE-specific high layer signaling configuration or reconfiguration, wherein all bandwidths of one or more active DL BWPs are within the bandwidth capacity of the UE, that is, the UE can receive both the PDCCH and the PDSCH on one or more active DL BWPs determined by the high layer signaling configuration or reconfiguration. For example, the UE configures or reconfigures four DL BWPs by receiving UE-specific high layer signaling, and configures or reconfigures two active DL BWPs by receiving UE-specific high layer signaling. In this case, the UE can receive both the PDCCH and the PDSCH on the two active DL BWPs.

Then, the UE dynamically changes the active DL BWP by receiving the physical layer signaling, and there are following several methods by which the UE dynamically changes the active DL BWP by using physical layer signaling. The physical layer signaling here may be a filed in the DCI in the PDCCH scheduling the PDSCH, and may also be a field specifically used to indicate switching of the active DL BWP in the DCI the PDCCH. The PDCCH may be a UE-specific PDCCH or a UE-Group common PDCCH.

The First Method

The UE indicates the active DL BWP and the inactive DL BWP by receiving a field in the DCI in the PDCCH, wherein the field is specifically used to indicate the switching of the active DL BWPs. These bits are referred to as a BWPI field. The number of bits in the field is the same as the number of the DL BWPs configured by the UE. The method of bitmap may be employed to indicate the mapping relation therebetween, wherein each bit in the BWPI field indicates whether one DL BWP is an active DL BWP or an inactive DL BWP. For example, the bit "1" indicates that this DL BWP is an active DL BWP, the bit "0" indicates that this DL BWP is an inactive DL BWP.

Figure 22:
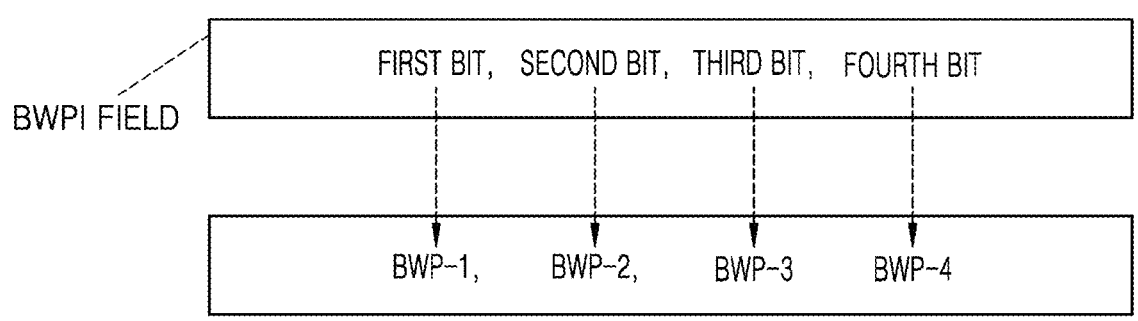
FIG. 22 is a schematic diagram of determining an activation state of DL BWP by using a bit mapping indication according to Embodiment 3 of the present disclosure.

For example, the UE configures or reconfigures four DL BWPs which are BWP-1, BWP-2, BWP-3, and BWP-4, respectively, by receiving UE-specific high layer signaling, and a mapping relation between the BWPI and the DL BWP is shown in FIG. 22, wherein, a first bit in the BWPI field indicates the activation state of the BWP-1, a second bit in the BWPI field indicates the activation state of the BWP-2, a third bit in the BWPI field indicates the activation state of the BWP-3, and a fourth bit in the BWPI field indicates the activation state of the BWP-4.

The Second Method

The UE includes a BWPI field by receiving bits in the DCI in the PDCCH for scheduling the PDSCH, wherein the field includes two parts, a first part is referred to as a first part of a BWPI field which indicates the state of a DL BWP. A second part is referred to as a second part of the BWPI field which indicates the DL BWP where the scheduled PDSCH is.

The first part of the BWPI field is used to indicate the active DL BWP and the inactive DL BWP. These bits are referred to as the BWPI field. The number of bits of the field is the same as the number of DL BWPs configured by the UE. The method of bitmap may be employed to indicate the mapping relation, and each bit in the BWPI field indicates whether one DL BWP is an active DL BWP or an inactive DL BWP. For example, a bit "1" indicates that the DL BWP is an active DL BWP, and a bit "0" indicates that the DL BWP is an inactive DL BWP. For example, the UE configures or reconfigures four DL BWPs which are BWP-1, BWP-2, BWP-3, and BWP-4, respectively, by receiving UE-specific high layer signaling, wherein the BWPI has four bits, and a mapping relation between the BWPI and the DL BWP is shown in FIG. 22, wherein, a first bit in the BWPI field indicates the activation state of the BWP-1, a second bit in the BWPI field indicates the activation state of the BWP-2, a third bit in the BWPI field indicates the activation state of the BWP-3, and a fourth bit in the BWPI field indicates the activation state of the BWP-4.

The second part of the BWPI field is used to indicate the DL BWP where the PDSCH scheduled by the received DCI in the PDCCH is.

The Third Method

The UE includes a BWPI field by receiving bits in the DCI in the PDCCH for scheduling the PDSCH, which is referred to as a BWPI field, and the BWPI field indicates the state of a DL BWP.

The BWPI field is used to indicate the active DL BWP and the inactive DL BWP. These bits are referred to as a BWPI field. The number of bits of the field is the same as the number of DL BWPs configured by the UE. The method of bitmap may be used to indicate the mapping relation therebetween, and each bit in the BWPI field indicates whether one DL BWP is an active DL BWP or an inactive DL BWP. For example, a bit "1" indicates that the DL BWP is an active DL BWP, and a bit "0" indicates that the DL BWP is an inactive DL BWP. For example, the UE configures or reconfigures four DL BWPs which are BWP-1, BWP-2, BWP-3, and BWP-4, respectively, by receiving UE-specific high layer signaling, wherein the BWPI has four bits. The mapping relation between the BWPI and DL BWP is shown in FIG. 22, wherein, a first bit in the BWPI field indicates the activation state of the BWP-1, a second bit in the BWPI field indicates the activation state of the BWP-2, a third bit in the BWPI field indicates the activation state of the BWP-3, and a fourth bit in the BWPI field indicates the activation state of the BWP-4.

The DL BWP of the PDSCH which is scheduled by the DCI in the PDCCH is the same as the DL BWP where the DCI in the PDCCH scheduling the PDSCH is.

The Fourth Method

A timer timing value is configured. If the UE receives the DCI or PDSCH on any one active DL BWP, the timer is set to 0. If the UE does not receive the DCI or PDSCH in all DL BWPs, the timer accumulates 1. If the timer accumulates and reaches the timer timing value, the default DL BWP becomes the active DL BWP, and the default DL BWP includes at least one DL BWP. The default DL BWP may be configured by high layer signaling, or the default DL BWP is the DL BWP for initial access, or the default DL BWP is a combination of the DL BWP for initial access and the BWP configured by high layer signaling. If the number of the default DL BWPs of the UE is greater than one, multiple default DL BWPs are contained within the bandwidth capacity of the UE. For example, the UE configures or reconfigures four DL BWPs, which are BWP-1, BWP-2, BWP-3, and BWP-4 respectively, by receiving UE-specific high layer signaling, and the UE determines that the BWP-3 and BWP-4 are the default DL BWPs by receiving the UE-specific high layer signaling configuration or reconfiguration.

Embodiment 4

This embodiment describes how to determine the time at which each active DL BWP changes when one BWPI field indicates to active more than two DL BWPs at the same time. For example, the UE configures or reconfigures four DL BWPs which are BWP-1, BWP-2, BWP-3, and BWP-4, respectively, by receiving UE-specific high layer signaling, and the slot length of the BWP-1 is 1 millisecond, the slot length of the BWP-2 is 0.5 milliseconds, the slot length of the BWP-3 is 0.25 milliseconds, and the slot length of BWP-4 is 0.5 milliseconds.

Figure 23:
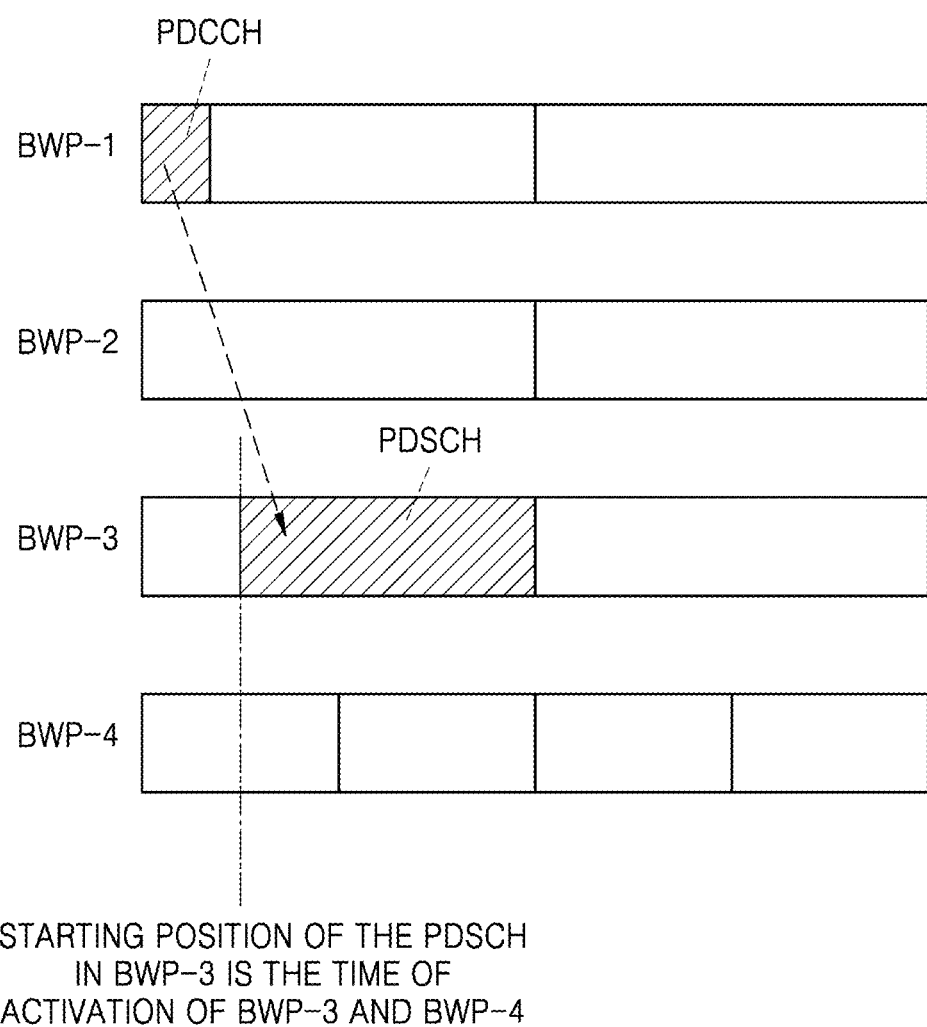
FIG. 23 is a schematic diagram of a DL BWP switching time when scheduling a PDSCH according to Embodiment 4 of the present disclosure.

When the UE indicates the DL active BWP by receiving the bit (which including the BWPI) in the DCI of the PDCCH scheduling PDSCH, the UE may change all the new DL BWPs to be active at the time when the PDSCH scheduled by the DCI in the PDCCH indicating the DL active BWP switching starts. For example, the UE configures or reconfigures four DL BWPs which are BWP-1, BWP-2, BWP-3, and BWP-4 respectively, by receiving UE-specific high layer signaling, and the slot length of the BWP-1 is 0.5 milliseconds, the slot length of BWP-2 is 0.5 milliseconds, the slot length of the BWP-3 is 0.5 milliseconds, and the slot length of BWP-4 is 0.25 milliseconds. The UE determines that the BWP-1 and BWP-2 are active DL BWPs by receiving UE-specific high layer signaling configuration or reconfiguration. In the slot n, the UE receives the PDCCH scheduling the PDSCH on the DL BWP-3, on the active DL BWP-1, and the BWPI field of the DCI in the PDCCH indicates the BWP-3 and the BWP-4 are activated, the BWP-3 and BWP-4 are activated at the start time of the PDSCH of the BWP-3, as shown in FIG. 23.

When the UE indicates the active DL BWP by receiving the BWPI field in the DCI in the PDCCH that does not schedule the PDSCH, since there is no scheduled PDSCH, the indicated active DL BWP may be activated after an interval after the end of the PDCCH including the BWPI field. An interval may be a time interval determined in units of a reference time length. For example, the reference time length may be the length of one OFDM symbol determined with a subcarrier space of 15 kHz, and the time interval may be N (wherein, N is a non-negative integer) OFDM symbols, N can be predefined by a protocol, or can be configured by high layer signaling.

Figure 24:
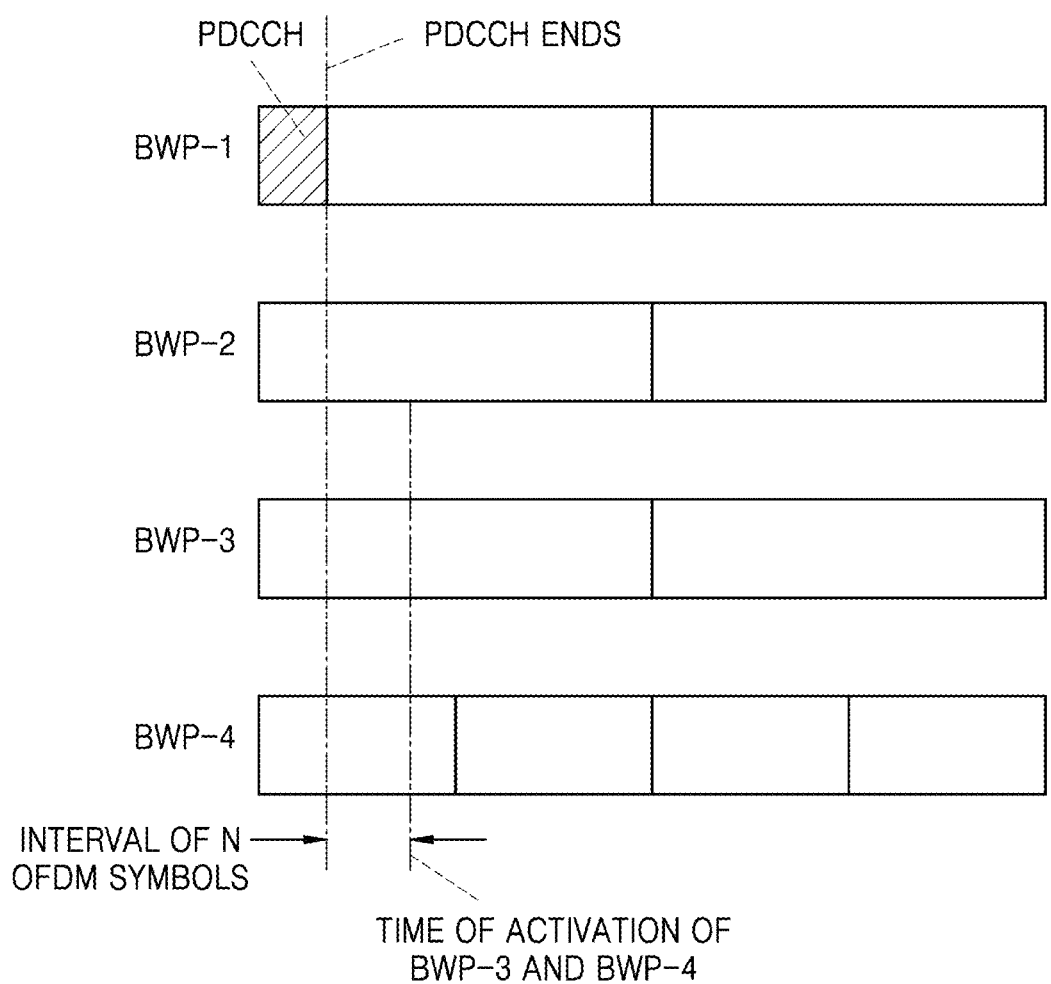
FIG. 24 is a schematic diagram of a DL BWP switching time when the PDSCH is not scheduled according to Embodiment 4 of the present disclosure.

For example, the UE configures or reconfigures four DL BWPs which are BWP-1, BWP-2, BWP-3, and BWP-4, respectively, by receiving UE-specific high layer signaling, wherein the slot length of the BWP-1 is 1 millisecond, the slot length of the BWP-2 is 0.5 milliseconds, the slot length of the BWP-3 is 0.25 milliseconds, and the slot length of the BWP-4 is 0.5 milliseconds. In the slot n, the UE receives a PDCCH indicating the active BWP on the first and second OFDM symbols of the active DL BWP-1, and the BWPI field of the DCI in the PDCCH indicates activation of the BWP-3 and BWP-4, then BWP-3 and BWP-4 are activated after N OFDM symbols (the length of one OFDM symbol determined with a subcarrier space of 15 kHz) at the end of the PDCCH of the BWP-1, as shown in FIG. 24.

Embodiment 5

In this embodiment, in the case that multiple uplink serving cells are configured for one UE and at least two uplink serving cells have different slot lengths (that is, subcarrier spaces are different), or multiple physical uplink shared channel (PUSCH) may be scheduled in a time-division manner in one slot of at least one serving cell (that is, a not-slot PUSCH scheduling), the PHRs of multiple serving cells are transmitted on the PUSCH of one serving cell, and the methods for transmitting the PHR are respectively described in the following cases.

The first case: the PUSCHs of the serving cell carrying the PHR (that is, the PHR is transmitted on the PUSCH of the serving cell) and the serving cell calculating the PHR (that is, the PHR is calculated according to the power control parameter of the PUSCH of the serving cell) are all scheduled in units of slots (the scheduling in units of slot is referred as to type A scheduling).

The second case: the PUSCH of the serving cell calculating the PHR is scheduled in units of slots (type A), and the PUSCH of the serving cell carrying the PHR is scheduled not in units of slots (the scheduling not in units of slots is referred as to type B scheduling);

The third case: the PUSCH of the serving cell calculating the PHR is scheduled not in units of slots (type B), and the PUSCH of the serving cell carrying the PHR is scheduled in units of slots (type A);

The fourth case: the PUSCH of the serving cell calculating the PHR is scheduled not in units of slots (type B), and the PUSCH of the serving cell carrying the PHR is not scheduled in units of slots (type B).

In general, the PHR of the serving cell calculating the PHR is obtained according to the condition of the PUSCH in one determined time unit m of a serving cell calculating the PHR which overlaps with the time unit n of a serving cell carrying the PHR, and the time unit m is obtained based on the slot structures of the serving cell calculating the PHR and the serving cell carrying the PHR and scheduling types of the PUSCHs (type A or type B), wherein the time unit may be a slot, or the time unit may also be one or more OFDM symbols.

Figure 25:
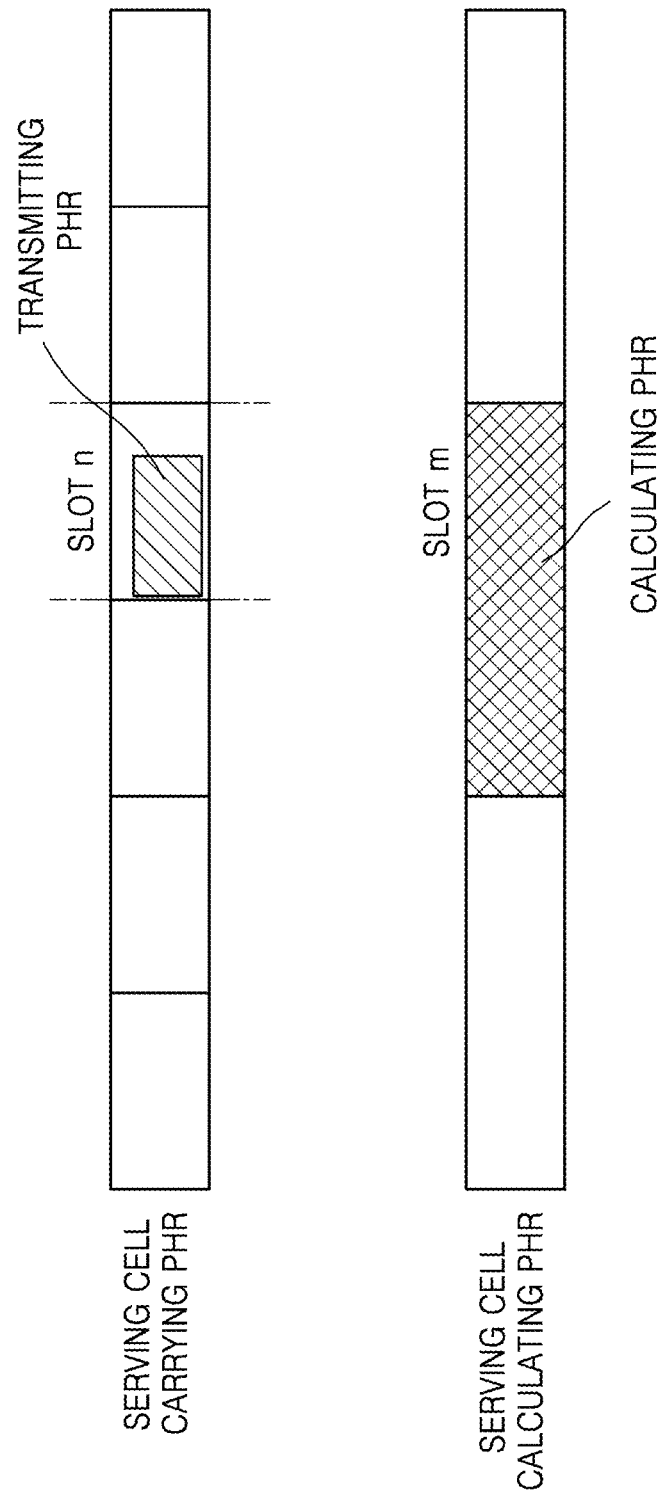
FIG. 25 is a schematic diagram 1 of a method for calculating power headroom report (PHR) according to Embodiment 5 of the present disclosure.

The First Case:

When the UE needs to report the PHR in the slot n of the serving cell carrying the PHR and the slot n of the serving cell carrying the PHR only overlaps with one slot m of the serving cell calculating the PHR, the UE calculates the PHR according to the condition of the PUSCH in a slot m of a serving cell calculating the PHR which overlaps with the slot n of a serving cell carrying the PHR, as shown in FIG. 25.

Figure 26:
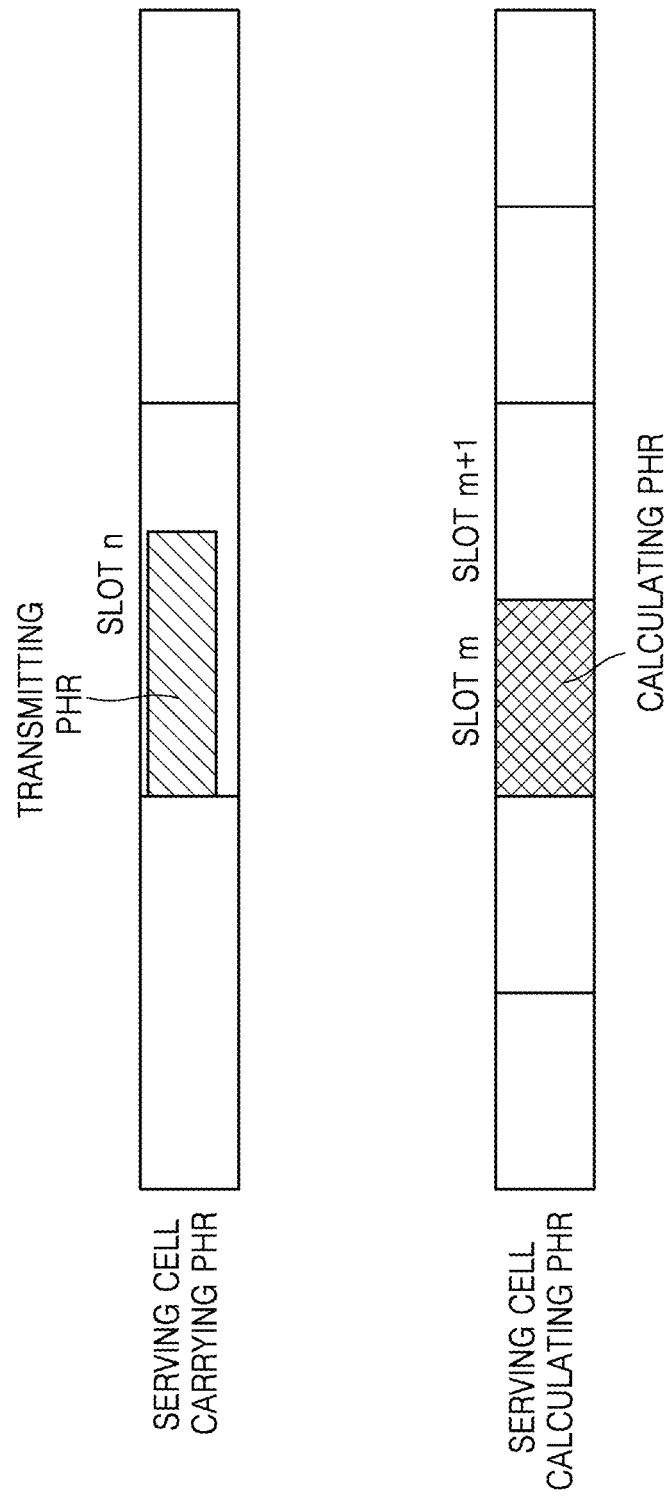
FIG. 26 is a schematic diagram 2 of a method for calculating PHR according to Embodiment 5 of the present disclosure.

When the UE needs to report the PHR in the slot n of the serving cell carrying the PHR and the slot n of the serving cell carrying the PHR overlaps with multiple slots (e.g., m, m+1, . . . , m+N slots) of the serving cell calculating the PHR, the UE calculates the PHR according to the condition of the PUSCH in one slot m of multiple slots of a serving cell calculating the PHR which overlaps with the slot n of a serving cell carrying the PHR (for example, the slot m may be the first slot of multiple slots of the serving cell calculating the PHR which overlaps with the slot n of the serving cell carrying the PHR), as shown in FIG. 26.

Or, in this case, the PHR of the serving cell calculating the PHR is a virtual PHR, the virtual PHR is the PHR calculated according to a power control parameter for assumed PUSCH transmission instead of the PHR calculated according to a power control parameter for actual PUSCH transmission.

The Second Case:

There are two ways to calculate PHR.

The First Method:

When the UE needs to report the PHR on one or more OFDM symbols scheduling the PUSCH transmission in the slot n of the serving cell carrying the PHR and the slot n of the serving cell carrying the PHR only overlaps with one slot m of the serving cell calculating the PHR, the UE calculates the PHR according to the condition of the PUSCH in the slot m of a serving cell calculating the PHR which overlaps with the slot n of a serving cell carrying the PHR.

When the UE needs to report the PHR on one or more OFDM symbols scheduling the PUSCH transmission in the slot n of the serving cell carrying the PHR and the slot n of the serving cell carrying the PHR overlaps with multiple slots of the serving cell calculating the PHR, the UE calculates the PHR according to the condition of the PUSCH in one slot m of multiple slots of a serving cell calculating the PHR which overlaps with the slot n of a serving cell carrying the PHR (for example, the slot m may be the first slot of multiple slots of the serving cell calculating the PHR which overlaps with the slot n of the serving cell carrying the PHR).

Figure 27:
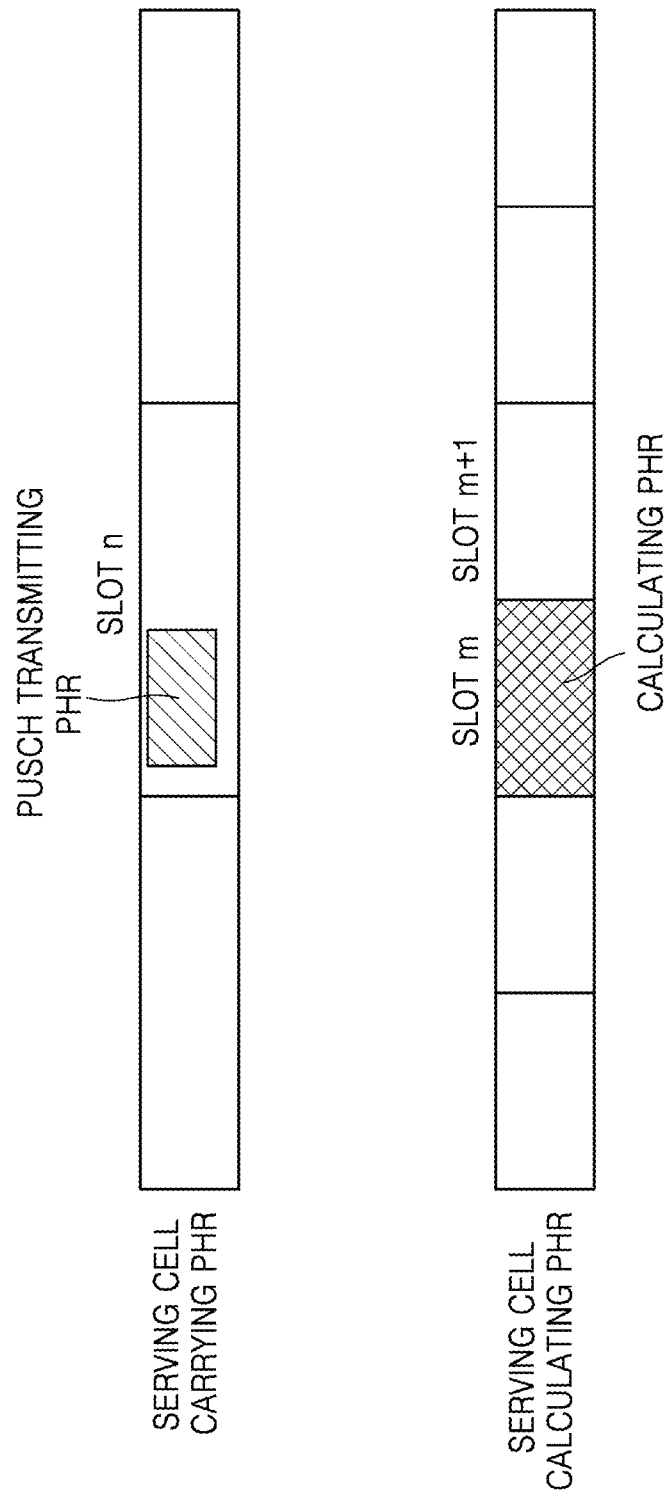
FIG. 27 is a schematic diagram 3 of a method for calculating PHR according to Embodiment 5 of the present disclosure.

The Second Method:

When the UE needs to report the PHR on one or more OFDM symbols of the PUSCH scheduled on the serving cell carrying the PHR and the one or more OFDM symbols of the PUSCH carrying the PHR only overlaps with one slot m of the serving cell calculating the PHR, the UE calculates the PHR according to the condition of the PUSCH in a slot m of a serving cell calculating the PHR which overlaps with the one or more OFDM symbols of the PUSCH carrying the PHR, as shown in FIG. 27.

Figure 28:
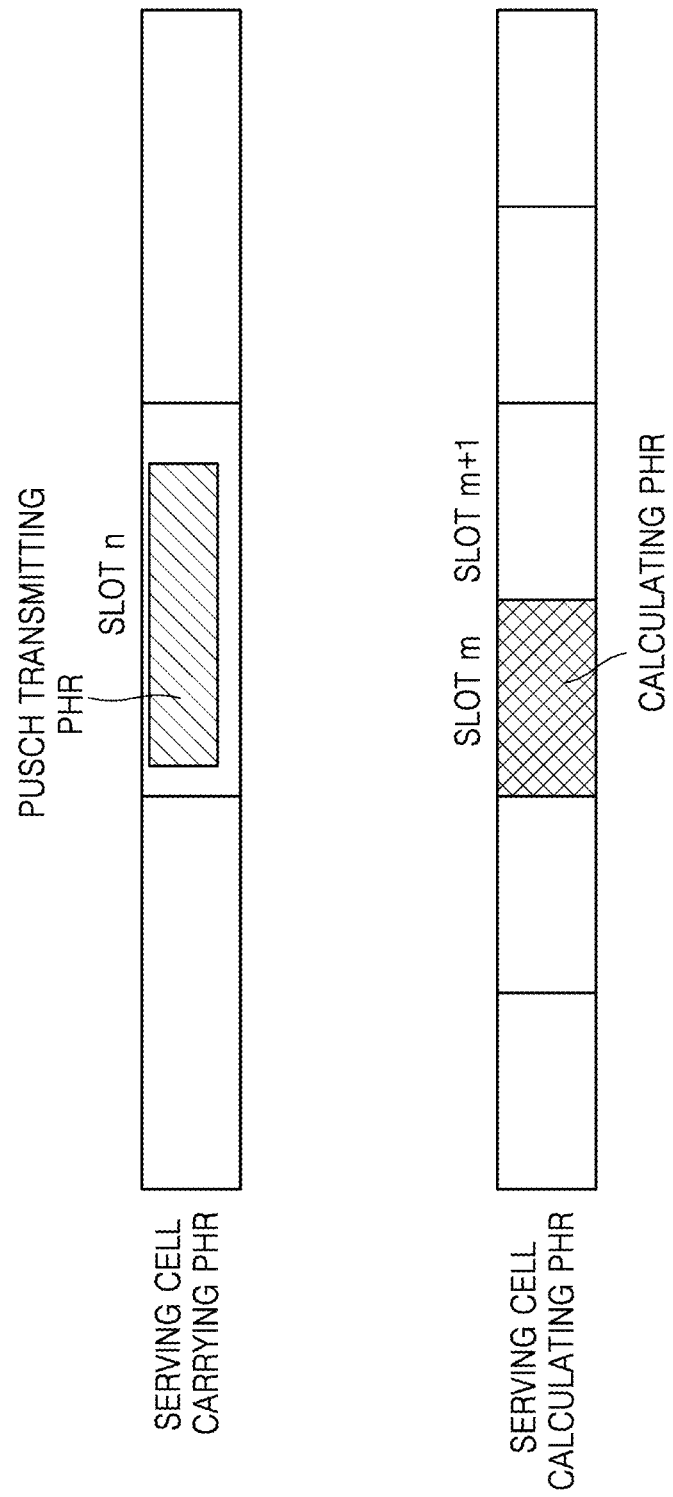
FIG. 28 is a schematic diagram 4 of a method for calculating PHR according to Embodiment 5 of the present disclosure.

When the UE needs to report the PHR on one or more OFDM symbols of the PUSCH scheduled on the serving cell carrying the PHR and the one or more OFDM symbols of the PUSCH carrying the PHR overlaps with multiple slots of the serving cell calculating the PHR, the UE calculates the PHR according to the condition of the PUSCH in one slot m of multiple slots of the serving cell calculating the PHR which overlaps with the one or more OFDM symbols of the PUSCH carrying the PHR (for example, the slot m may be the first slot of multiple slots of the serving cell calculating the PHR which overlaps with one or more OFDM symbols of the PUSCH carrying the PHR), as shown in FIG. 28.

The Third Method:

In this case, the PHR of the serving cell calculating the PHR is a virtual PHR, and the virtual PHR is the PHR calculated according to the power control parameter for the assumed PUSCH transmission, instead of the PHR calculated according to the power control parameter for the actual PUSCH transmission.

Figure 29:
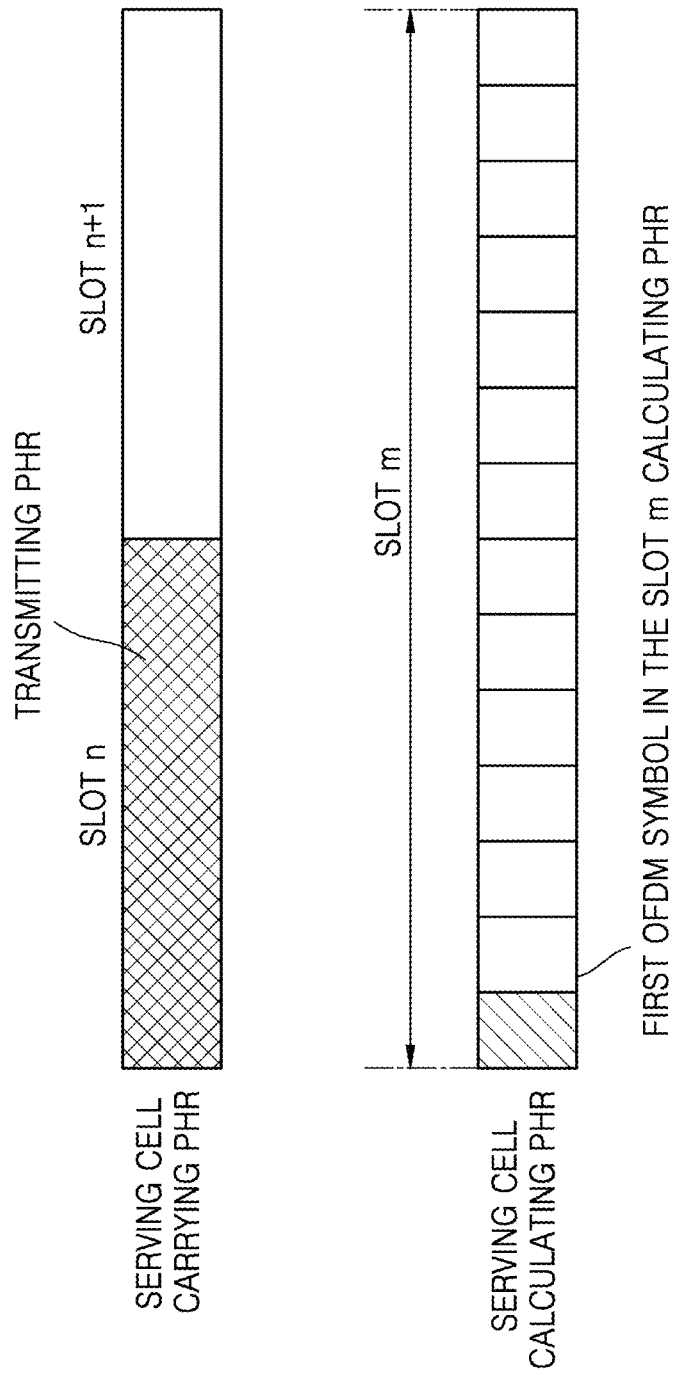
FIG. 29 is a schematic diagram 5 of a method for calculating PHR according to Embodiment 5 of the present disclosure.
Figure 30:
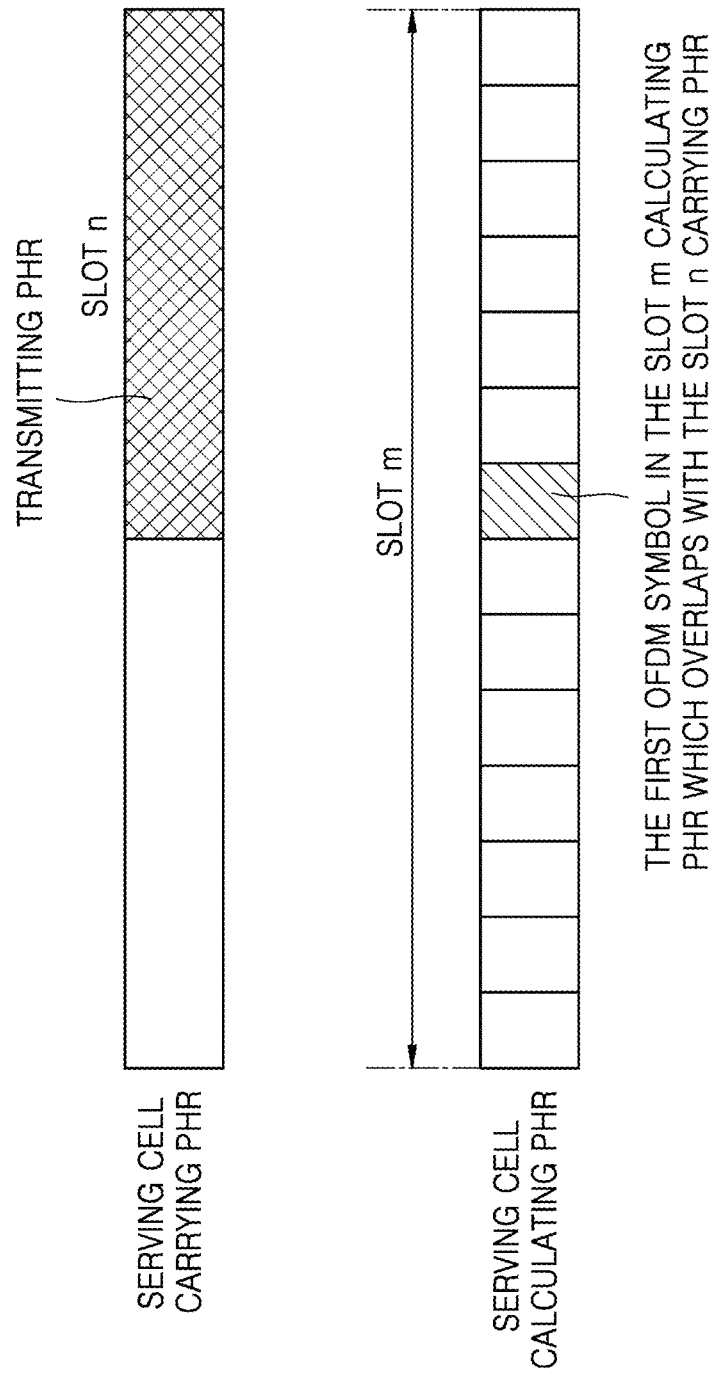
FIG. 30 is a schematic diagram 6 of a method for calculating PHR according to Embodiment 5 of the present disclosure.

The Third Case:

When the UE needs to report the PHR in the slot n of the serving cell carrying the PHR and the slot n of the serving cell carrying the PHR only overlaps with one slot m of the serving cell calculating the PHR, the UE calculates the PHR according to the condition of the PUSCH of the OFDM symbol with sequence number p in the slot m (for example, p=0, that is, the first OFDM symbol in the slot m) of the serving cell calculating the PHR which overlaps with the slot n of the serving cell carrying the PHR, as shown in FIG. 29; or, the UE calculates the PHR according to the condition of the PUSCH of the OFDM symbol with sequence number p in the slot m (for example, p is the first OFDM symbol in the slot m, which overlaps with the slot n) of the serving cell calculating the PHR, which overlaps with the slot n of the serving cell carrying the PHR, as shown in FIG. 30.

Figure 31:
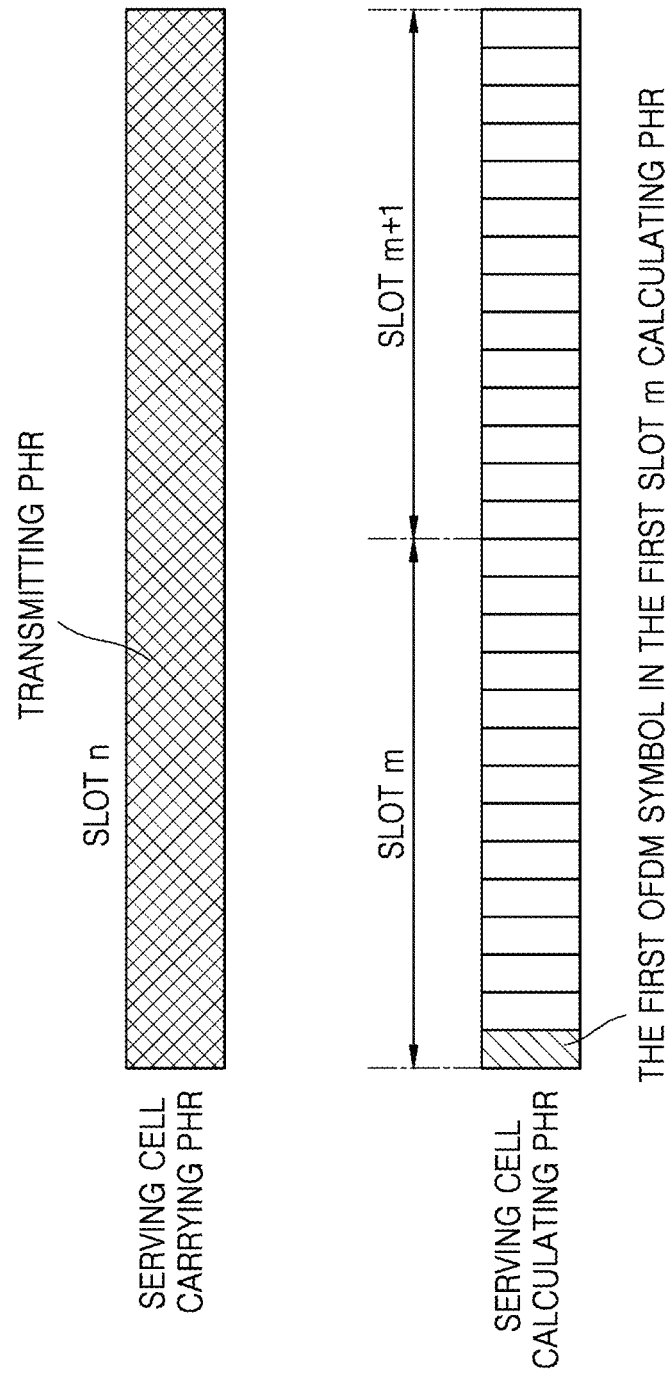
FIG. 31 is a schematic diagram 7 of a method for calculating PHR according to Embodiment 5 of the present disclosure.

When the UE needs to report the PHR in the slot n of the serving cell carrying the PHR and the slot n of the serving cell carrying the PHR overlaps with multiple slots of the serving cell calculating the PHR, the UE calculates the PHR according to the condition of the PUSCH of the OFDM symbol with sequence number p in the slot m (for example, the slot m may be the first slot of multiple slots of the serving cell calculating PHR, which overlaps with the slot n of the serving cell carrying the PHR, and p=0, that is, the first OFDM symbol in the slot m) of the slots of the serving cell calculating the PHR which overlaps with the slot n of the serving cell carrying the PHR, as shown in FIG. 31.

Figure 32:
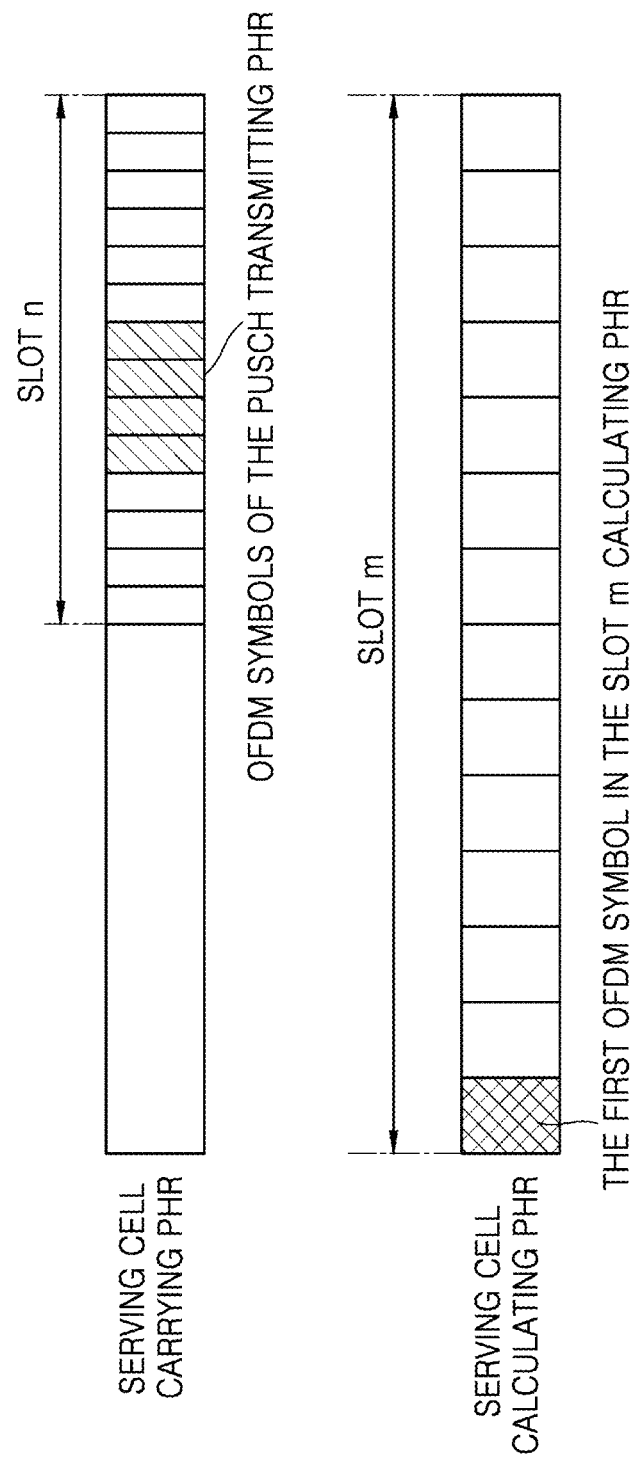
FIG. 32 is a schematic diagram 8 of a method for calculating PHR according to Embodiment 5 of the present disclosure.
Figure 33:
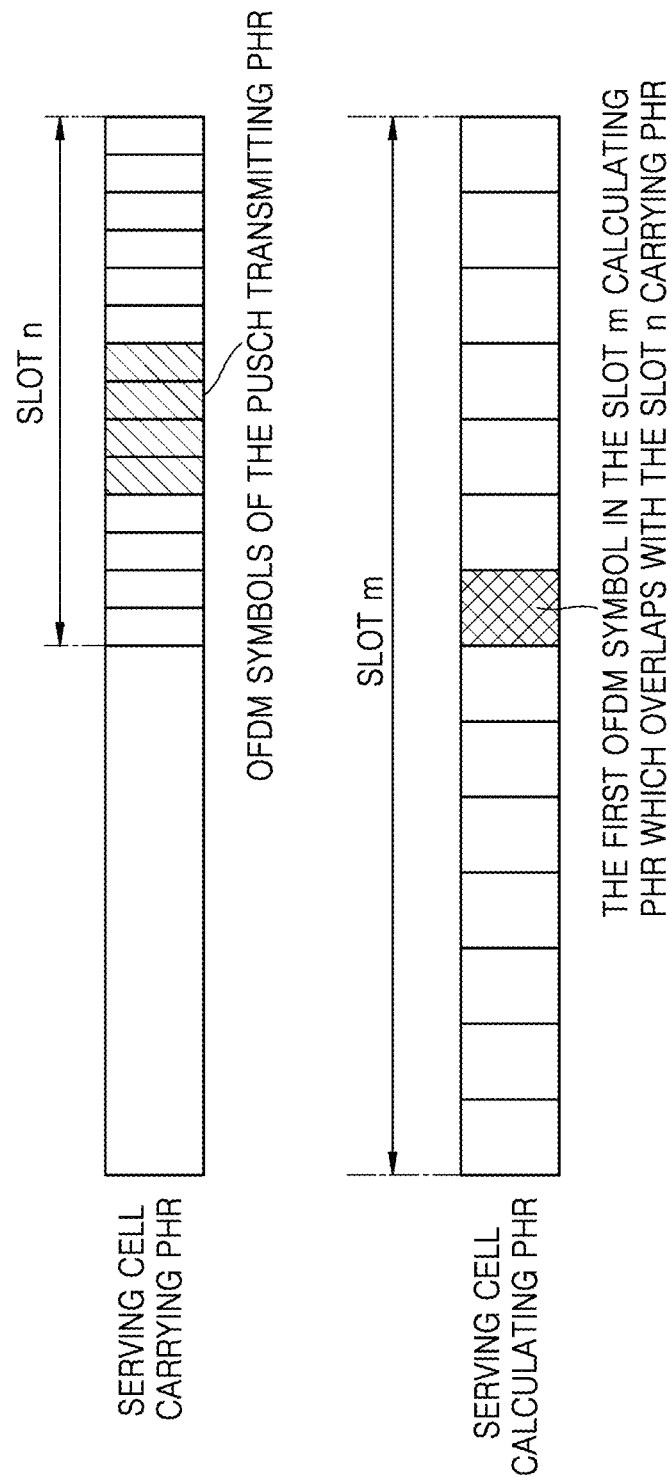
FIG. 33 is a schematic diagram 9 of a method for calculating PHR according to Embodiment 5 of the present disclosure.

The Fourth Case:

The First Method:

When the UE needs to report the PHR on one or more OFDM symbols scheduling the PUSCH transmission in the slot n of the serving cell carrying the PHR and the slot n of the serving cell carrying the PHR only overlaps with one slot m of the serving cell calculating the PHR, the UE calculates the PHR according to the condition of the PUSCH of the OFDM symbol with sequence number p in the slot m (for example, p=0, that is, the first OFDM symbol in the slot m) of the serving cell calculating the PHR which overlaps with the slot n of the serving cell carrying the PHR, as shown in FIG. 32; or, when the slot n of the serving cell carrying the PHR only overlaps with one slot m of the serving cell calculating the PHR, the UE calculates the PHR according to the condition of the PUSCH of the OFDM symbol with sequence number p in the slot m (for example, p is the first OFDM symbol in the slot m, which overlaps with the slot n) of the serving cell calculating the PHR which overlaps with the slot n of the serving cell carrying the PHR, as shown in FIG. 33.

Figure 34:
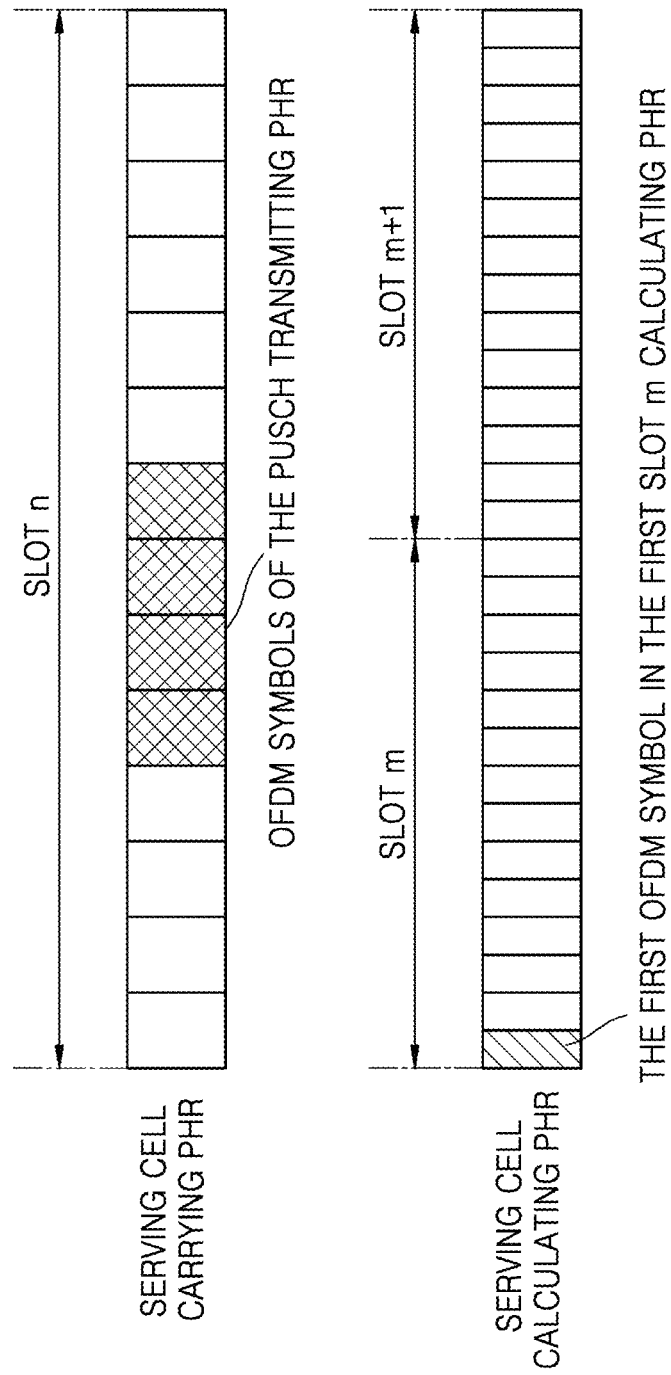
FIG. 34 is a schematic diagram 9 of a method for calculating PHR according to Embodiment 5 of the present disclosure.

When the UE needs to report the PHR on one or more OFDM symbols scheduling the PUSCH transmission in the slot n of the serving cell carrying the PHR and the slot n of the serving cell carrying the PHR overlaps with multiple slots of the serving cell calculating the PHR, the UE calculates the PHR according to the condition of the PUSCH of the OFDM symbols with sequence number p in one slot m (for example, the slot m may be the first slot of multiple slots of the serving cell calculating the PHR which overlaps with the slot n of the serving cell carrying the PHR, p=0, that is, the first symbol in the slot m) of multiple slots of the serving cell calculating the PHR which overlaps with the slot n of the serving cell carrying the PHR, as shown in FIG. 34.

Figure 35:
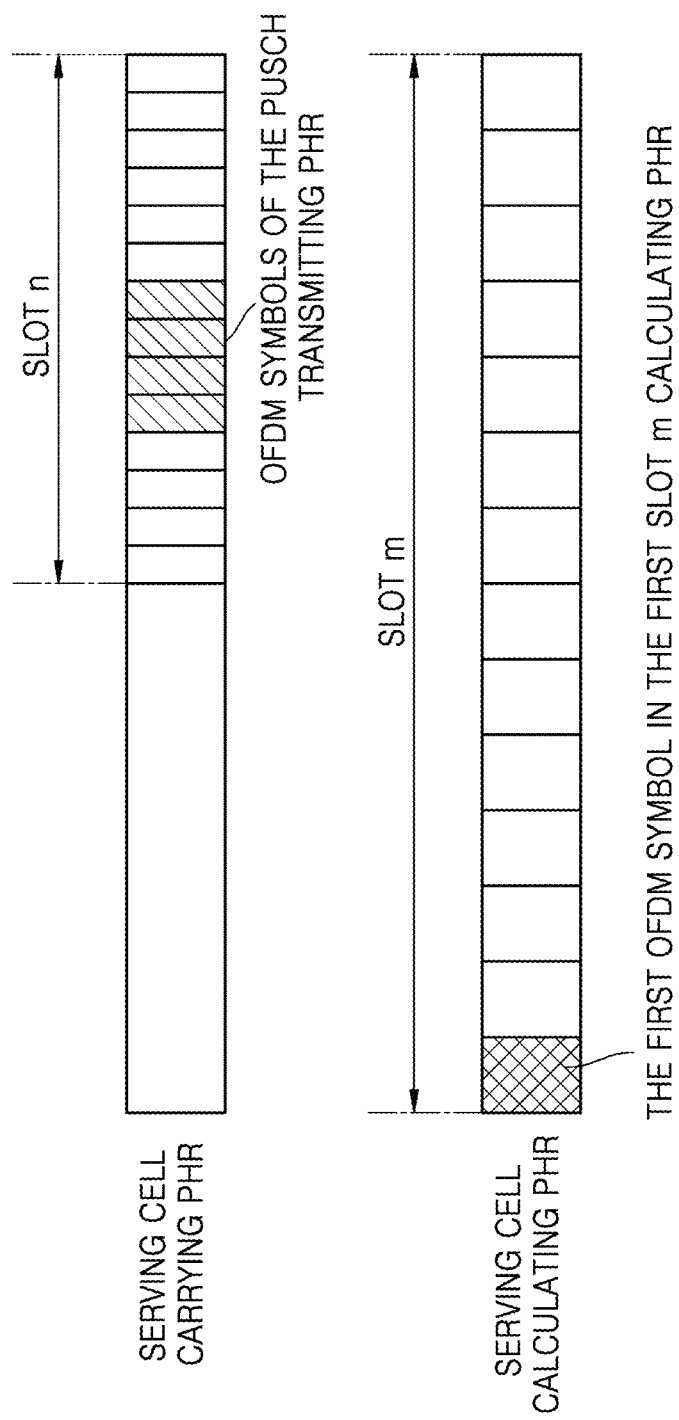
FIG. 35 is a schematic diagram 11 of a method for calculating PHR according to Embodiment 5 of the present disclosure.
Figure 36:
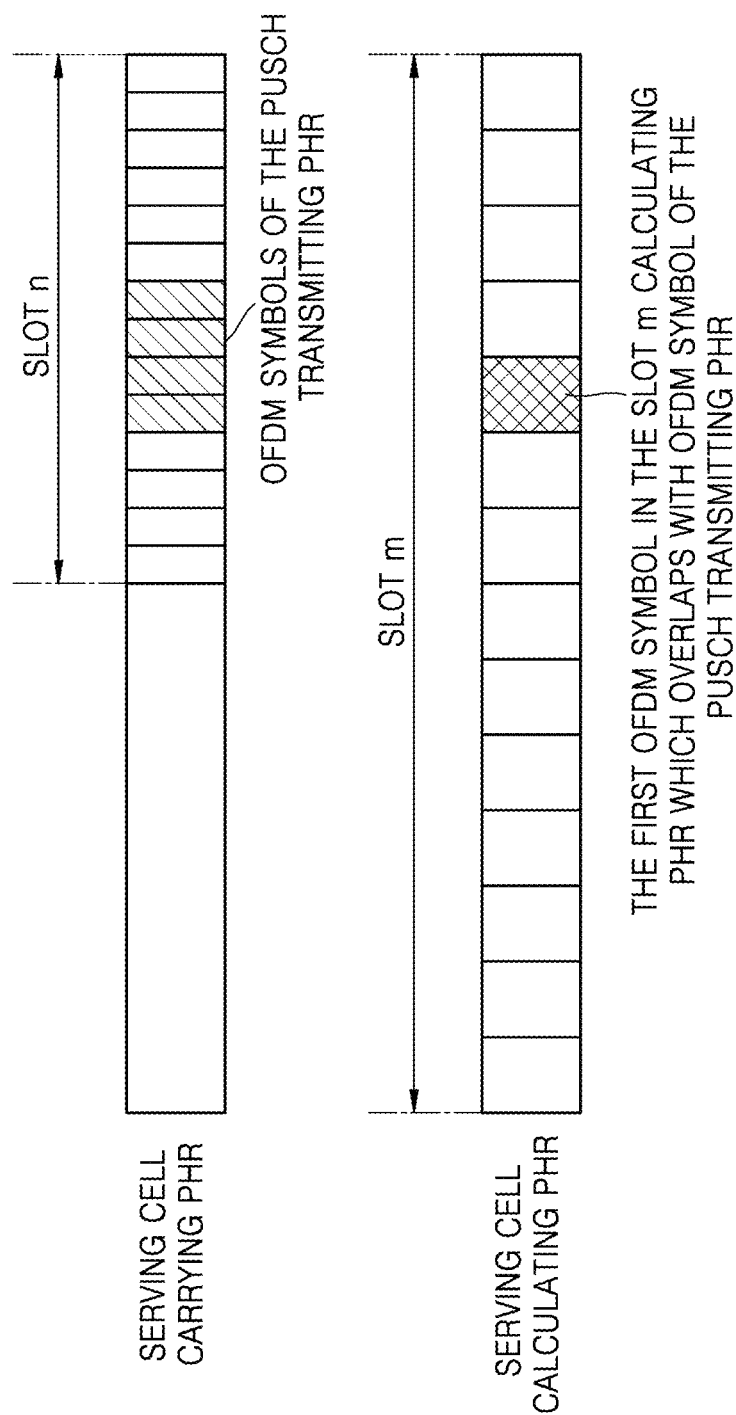
FIG. 36 is a schematic diagram 12 of a method for calculating PHR according to Embodiment 5 of the present disclosure.

The Second Method:

When the UE needs to report the PHR on one or more OFDM symbols of the PUSCH scheduled on the serving cell carrying the PHR and one or more OFDM symbols of the PUSCH carrying the PHR only overlap with one slot m of the serving cell calculating the PHR, the UE calculates the PHR according to the condition of the PUSCH of the OFDM symbol with sequence number p in the slot m (for example, p=0, that is, the first OFDM symbol in the slot m) of the serving cell calculating the PHR which overlaps with the one or more OFDM symbols of the PUSCH carrying the PHR, as shown in FIG. 35; or when the one or more OFDM symbols of the PUSCH carrying the PHR only overlaps with one slot m of the serving cell calculating the PHR, the UE calculates the PHR according to the condition of the PUSCH of the OFDM symbol with sequence number p in the slot m (for example, p is the first OFDM symbol in the slot m overlapping with one or more OFDM symbols of the PUSCH carrying the PHR in the slot n) of the serving cell calculating the PHR which overlaps with one or more OFDM symbols of the PUSCH carrying the PHR, as shown in FIG. 36.

Figure 37:
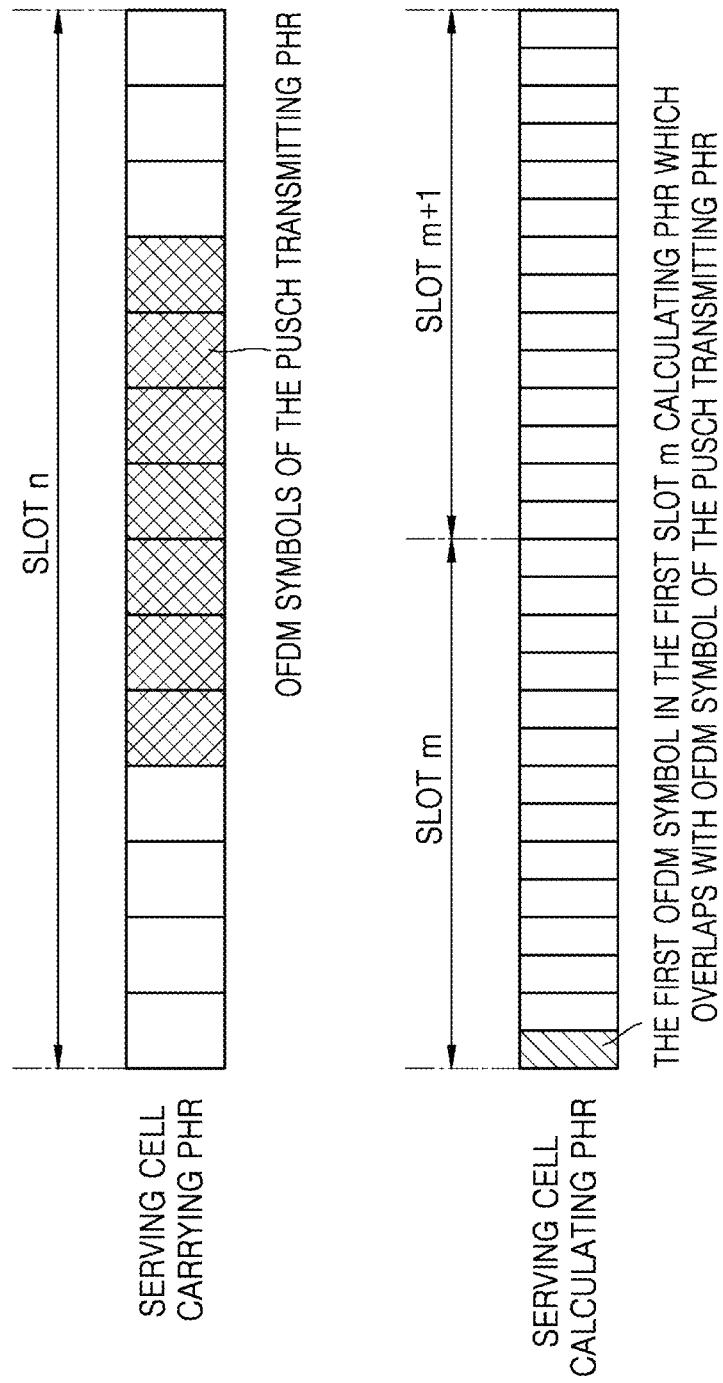
FIG. 37 is a schematic diagram 13 of a method for calculating PHR according to Embodiment 5 of the present disclosure.
Figure 38:
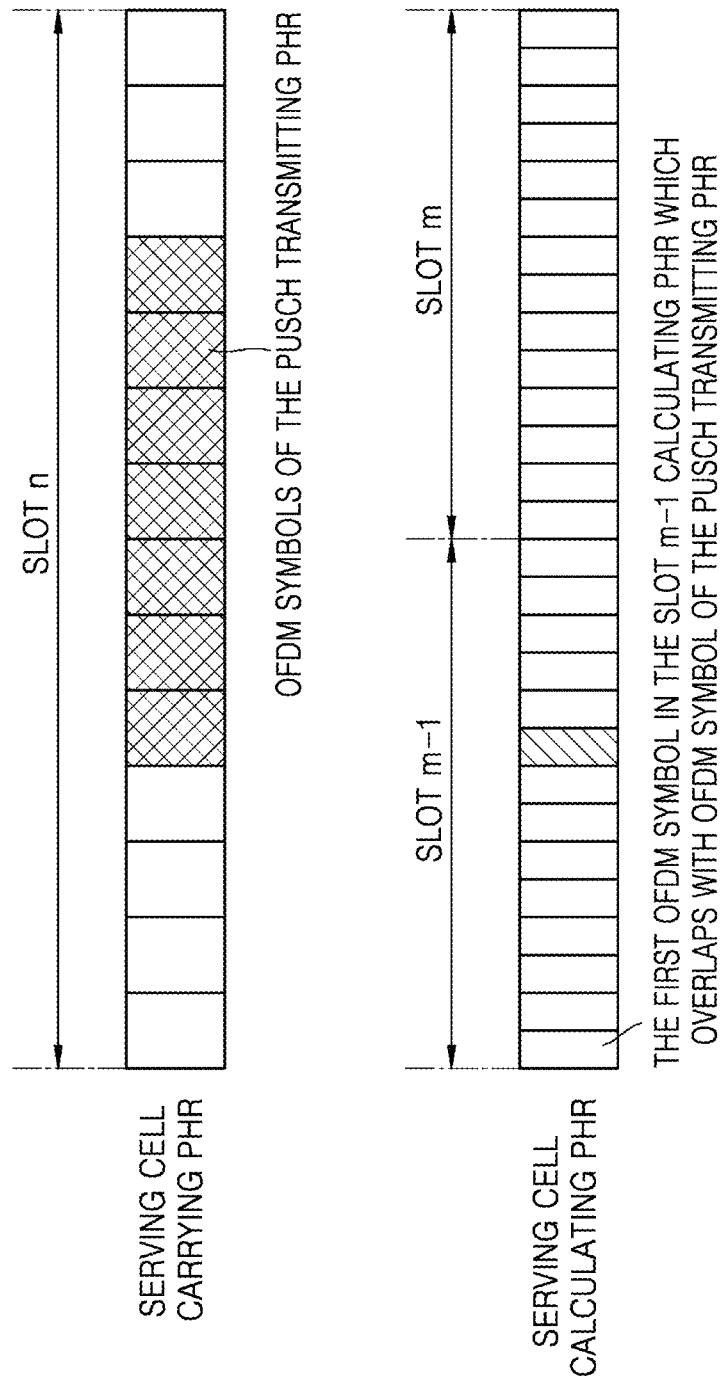
FIG. 38 is a schematic diagram 14 of a method for calculating PHR according to Embodiment 5 of the present disclosure.

When the UE needs to report the PHR on one or more OFDM symbols of the PUSCH scheduled on the serving cell carrying the PHR and one or more OFDM symbols of the PUSCH carrying the PHR only overlap with multiple slots of the serving cell calculating the PHR, the UE calculates the PHR according to the condition of the PUSCH of the OFDM symbol with sequence number p in one slot m (for example, the slot m may be the first slot of multiple slots of the serving cell calculating the PHR which overlaps with one or more symbols of the PUSCH carrying the PHR) of multiple slots of the serving cell calculating the PHR which overlaps with the one or more OFDM symbols of the PUSCH carrying the PHR, as shown in FIG. 37; or when one or more OFDM symbols of the PUSCH carrying the PHR overlaps with multiple slots of the serving cell calculating the PHR, the UE calculates the PHR according to the condition of the PUSCH of the OFDM symbols with the sequence number p in one slot m (for example, the slot m may be the first slot of multiple slots of the serving cell calculating the PHR which overlaps with the one or more OFDM symbols of the PUSCH carrying the PHR, and p is the first OFDM symbol in the slot m which overlaps with the one or more OFDM symbols of the PUSCH carrying the PHR) of multiple slots of the serving cell calculating the PHR which overlaps with one or more OFDM symbols of the PUSCH carrying the PHR, as shown in the FIG. 38.

Figure 39:
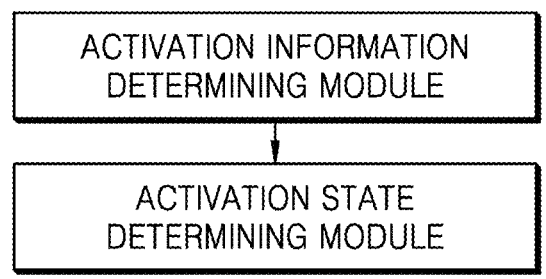
FIG. 39 is a module block diagram of a user equipment for implementing a method for determining the activation state of bandwidth part according to the present disclosure.

Referring to FIG. 39, the user equipment for determining the activation state of bandwidth part of the present disclosure includes:
an activation information determining module, configured to determining activation information;
an activation state determining module, configured to determine an activation state of DL BWP according to the activation information.

The user equipment illustrated in FIG. 39 may correspond to the UE 4500 illustrated in FIG. 45. The processor 4505 of the UE 4500 may comprise the activation information determining module and the activation state determining module of the user equipment illustrated in FIG. 39, or perform the operations performed by the activation information determining module and the activation state determining module described herein.

Figure 40:
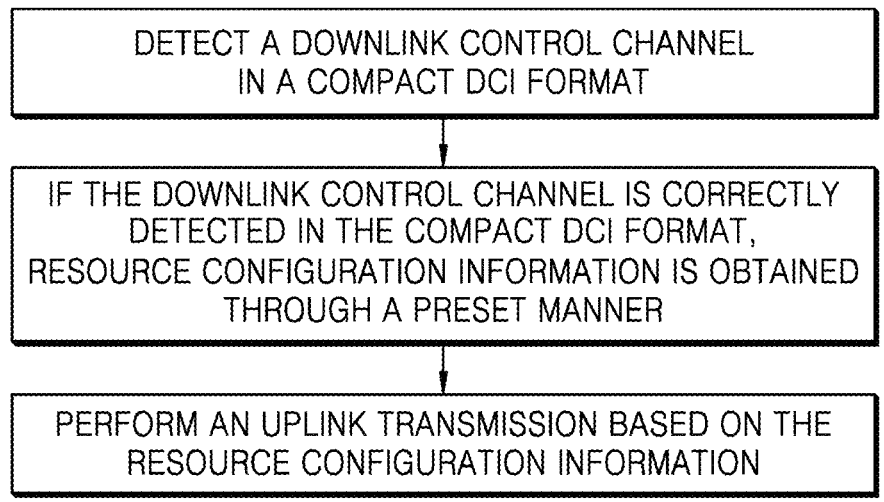
FIG. 40 is a schematic diagram of a method for transmitting signals provided by the present disclosure.
Figure 41:
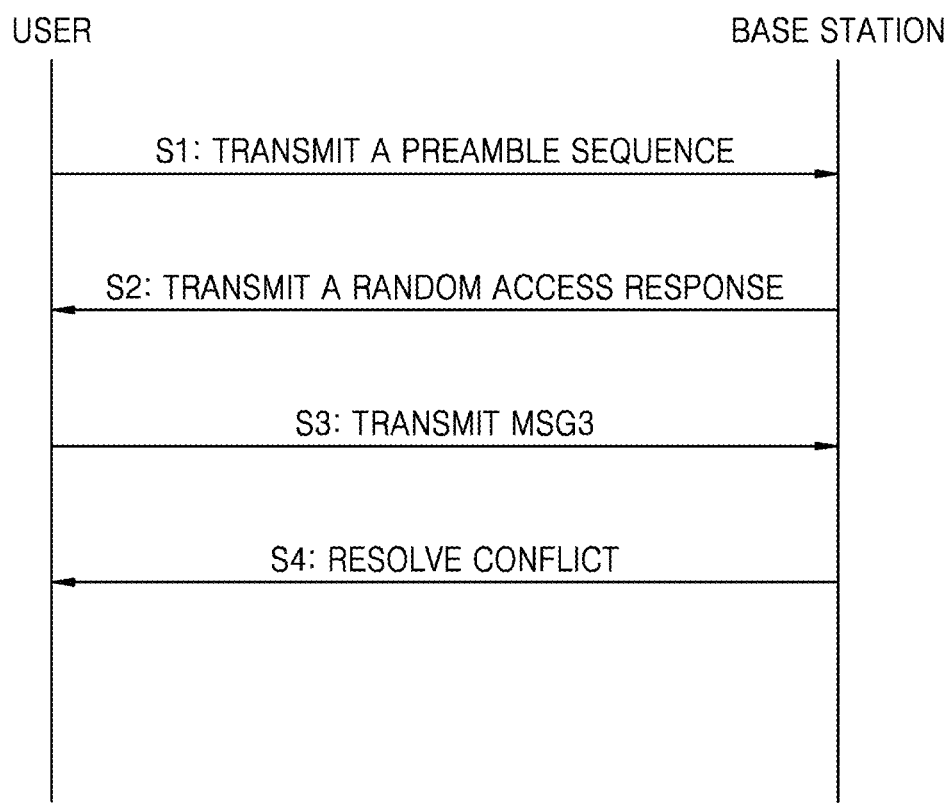
FIG. 41 is a schematic diagram of a conventional contention-based random access procedure.

An example of the method for transmitting a signal provided by the present disclosure is illustrated in FIG. 40, wherein the UE detects a downlink control channel using a compact DCI format; when the UE has correctly detected the downlink control channel using the compact DCI format, the UE acquires a configuration information by using a preconfigured manner; the UE performs an uplink transmission based on the configuration information.

Before the establishment of the radio resource control (RRC) link, the UE does not obtain specific system configuration information, so it does not require a complex control signaling to schedule an uplink transmission or a downlink transmission, that is, it may use an extremely compact downlink control signaling to send scheduling information, as illustrated in the following table.

TABLE 12 an example table of the compact downlink control signaling

| Parameter domains | The number of bits required | Description |
| --- | --- | --- |
| Head | X | Indicating an uplink or a downlink scheduling, for example, X = 1, "0" indicates an uplink scheduling; "1" indicates a downlink scheduling. |
| Frequency domain resource configuration | Y | Using a fixed resource configuration type, such as a resource configuration type 1; the specific number of occupied bits Y is determined by the size of the frequency band portion in which the configured resource is located. |
| Time domain resource configuration | Z | Indicating the location of the configured resource in the time domain. |
| Modulation code combination | M | Using a limited number of optional modulation code parameters. |

The operating steps of the activation information determining module and the activation state determining module respectively correspond to steps 1801 and 1802 of the method for determining an activation state of bandwidth part of the present disclosure, and details are not described herein again.

As can be seen from the above detailed description of the disclosure, the present disclosure has at least the following beneficial technical effects compared to the prior art:

First, the activation state of DL BWP is determined by the activation information, which saves the signaling overhead, reduces the impact of the adjustment time interval of the BWP switching on the normal receiving data of the UE, and ensures the reception performance and the throughput level of receiving data of the UE.

Second, a solution for determining multiple active DL BWPs is provided. Since different active BWPs use different subcarrier spaces, the reliability and delay requirements of different types of services can be better ensured.

Third, a switching scheme for the active DL BWP is provided, and the effect of frequency-domain diversity is obtained, and the overall performance of the communication system is improved.

Therefore, the size of the compact DCI (i.e., the number of bits required) may be smaller than the size of the DCI used by a normal scheduling, when the UE finds that the received PDCCH is successfully detected using the compact DCI format, it needs to determine some configuration information for receiving and/or transmitting subsequent data.

When the uplink transmission is scheduled by using the compact downlink control signaling, for example, when the random access message 3 is retransmitted, (if the CRC of the DCI is scrambled using the TC-RNTI), the UE needs to set one or more of the following parameters to perform the uplink transmission based on a specified configuration:
a redundancy version (RV);
a frequency hopping flag (FH flag);
a transmit power control command (TPC command).

Wherein, the configuration of one or more of the above parameters may be determined based on a preset configuration or a preset rule to perform the uplink transmission.

When the downlink transmission is scheduled by using a compact downlink control signaling, for example, when the random access conflict resolution, i.e. message 4, is scheduled, (if the CRC of the DCI is scrambled using the TC-RNTI), the UE needs to set one or more of the following parameters based on a specified configuration to receive downlink data and send subsequent acknowledgement feedback (ACK feedback):
Transmit power control command (TPC command);
an ACK resource indication (ARI);
a hybrid auto retransmission request timing (HARQ timing).

Wherein, the configuration of one or more of the above parameters may be determined based on a preset configuration or a preset rule to perform the uplink transmission.

In order to facilitate the understanding of the present disclosure, the above technical solutions of the present disclosure are further described below in the interaction mode of devices in combination with specific application situations as follows.

Embodiment 6

In this embodiment, before the establishment of the radio resource control (RRC) link, the UE does not obtain specific system configuration information, so it does not require a complex control signaling to schedule uplink transmission, such as scheduling of retransmission of random access message 3, that is, it may use a compact downlink control signaling to transmit scheduling information, as illustrated in the following table.

TABLE 13 an example table of the compact downlink control signaling for uplink scheduling

| Parameter domains | The number of bits required | Description |
|---|---|---|
| Head | X = 1 | Indicating and uplink or a downlink scheduling, for example, X = 1, "0" indicates an uplink scheduling; "1" indicates a downlink scheduling. In this embodiment, the value of the parameter domain is "0". |
| Frequency domain resource configuration | Y = 5 | Using a fixed resource configuration type, such as resource configuration type 1; the specific number of occupied bits Y is determined by the size of the frequency band portion in which the configured resource is located. |
| Time domain resource configuration | Z = 2 | Indicating the location of the configured resource in the time domain. |
| Modulation code combination | M = 4 | Using a limited number of optional modulation code parameters. |

Each of the above number of bits required is an example and may be set to other values according to actual requirements. Moreover, the size of the compact DCI (i.e., the number of bits required) may be smaller than the size of the DCI used by a normal scheduling, so when the UE finds that the received PDCCH is successfully detected using the compact DCI format, it needs to determine some configuration information for receiving and/or transmitting the subsequent data.

When the retransmission of the random access message 3 is scheduled by using a compact downlink control signaling, (if the CRC of the DCI is scrambled using the TC-RNTI), the UE needs to set one or more of the following parameters to perform the uplink transmission based on the specified configuration.

Redundancy Version (RV)
1. Using the same redundancy version as the redundancy version configured by an uplink license carried in the random access response; or
2. Using a preset redundancy version number, such as RV0, or RV3, etc.; or 3. Determining the redundancy version used in a certain order; if the predefined order is 0312, the first transmission of the message 3 uses redundancy version 0, and then the retransmission of the message 3 scheduled by the downlink control signaling uses the redundancy version determined in order; for example, the retransmission of the message 3 that receives the downlink control signaling scheduling at the first time uses redundancy version 3, and the retransmission of the message 3 that receives the downlink control signaling scheduling at the second time uses redundancy version 1, and so on, when the number of retransmissions is greater than the number of redundancy versions, the redundancy version may be determined cyclically, that is, after redundancy version 2 is used, redundancy version 0 is used when message 3 is transmitted at the next time.

Frequency Hopping Flag (FH Flag)
1. Using the same flag as the frequency hopping flag configured by an uplink license carried in the random access response, for example, if the frequency hopping flag configured by the uplink license carried in the random access response is enabled, the subsequent retransmission of the message 3 also enables the frequency hopping; or
2. According to a preset frequency hopping flag, such as, the retransmission of the message 3 corresponding to the DCI scheduling is preset to enable the frequency hopping, or the retransmission of the message 3 corresponding to the DCI scheduling is preset to disenable the frequency hopping; or
3. Determining the frequency hopping flag based on a preset rule; if the preset rule is the retransmission of the message 3 that receives the DCI scheduling at the Nth time, the frequency hopping is enabled, wherein the value of N may be 0, 1, a preset value, or a half of the maximum number of transmissions of the preset message 3.

Transmit Power Control Command (TPC Command)
1. Using the same value as the TPC command configured by an uplink license carried in the random access response; or,
2. Using a preset value, for example, the TPC command is set to 0; or
3. Determining the TPC command based on a preset rule, for example, the TPC command is sequentially increased based on the number of retransmissions of the received message 3; for example, when the first message 3 is transmitted, it is TPC command=0, and when the first message 3 is retransmitted, TPC command=TPC command_old+step size=0+2=2; and so on.

Embodiment 7 (a Compact DCI Scheduling Downlink Msg 4)

In this embodiment, before the establishment of the radio resource control (RRC) link, the UE does not obtain a specific system configuration information, so it does not require a complex control signaling to schedule a downlink transmission, such as the scheduling of random access message 4, and the corresponding configuration of ACK feedback of message 4, that is, it may use an extremely compact downlink control signaling to send scheduling information, as illustrated in the following table.

TABLE 14 an example table of the extremely compact downlink control signaling for downlink scheduling

| Parameter domains | The number of bits required | Description |
| --- | --- | --- |
| Head | X = 1 | Indicating an uplink or a downlink scheduling, for example, X = 1, "0" indicates an uplink scheduling; "1" indicates a downlink scheduling. In this embodiment, the value of the parameter domain is "1". |
| Frequency domain resource configuration | Y = 5 | Using a fixed resource configuration type, such as resource configuration type 1; the specific number of occupied bits Y is determined by the size of the frequency band portion in which the configured resource is located. |
| Time domain resource configuration | Z = 2 | Indicating the location of the configured resource in the time domain. |
| Modulation code combination | M = 4 | Using a limited number of optional modulation code parameters. |

Each of the above number of bits required is an example and may be set to other values according to actual requirements. Moreover, the size of a compact DCI (i.e., the number of bits required) may be smaller than the size of a DCI used by a normal scheduling, so when the UE finds that the received PDCCH is successfully detected using a compact DCI format, it needs to determine some configuration information for receiving and/or transmitting subsequent data.

When the compact downlink control signaling is used to schedule the random access message 4 and the corresponding configuration of the ACK feedback of the message 4, (if the CRC of the DCI is scrambled using the TC-RNTI or C-RNTI), the UE needs to set one or more of the following parameters to perform the uplink transmission based on a specified configuration:

Transmit Power Control Command (TPC Command)
1. Using the same value as the TPC command configured by un uplink license carried in the random access response; or
2. Using the configuration of the TPC command in the scheduling information which scheduled the last transmitted message 3; or
3. Using a preset value, for example, the TPC command is set to 0; or
4. Determining the TPC command based on a preset rule, for example, the TPC command is sequentially increased according to the number of retransmissions of the received message 3; for example, when the first message 3 is transmitted, it is TPC command=0, and when the first message 3 is retransmitted, TPC command=TPC command_old+step size=0+2=2; and so on.

Figure 42:
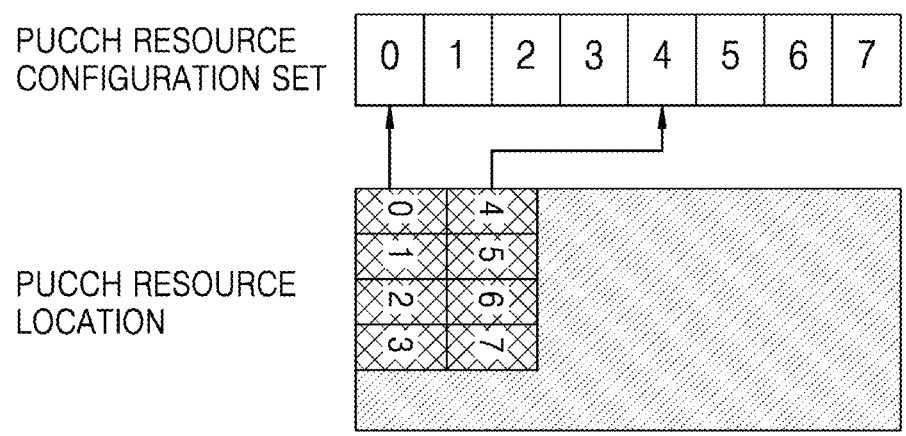
FIG. 42 is a diagram showing an example of determining a PUCCH resource configuration according to a PDCCH.

ACK resource indication (ARI), for example, a PUCCH resource indication used to send ACK feedback.
1. Determining, based on a resource index of searching the correct PDCCH (which may also be a CCE index, an index of a search space, and an index of a control resource set), the used PUCCH resource configuration used from a PUCCH resource configuration set configured or pre-configured in the system information; as illustrated in FIG. 42, for example, when the UE determines that the 0th PDCCH in the search space is its own matching PDCCH (such as, the CRC of the PDCCH is correctly descrambled using the TC-RNTI), the corresponding UE uses the 0th PUCCH resource configuration in the PUCCH resource set configured in the system information; or
2. Determining based on a pre-configured PUCCH resource configuration that for example, the system is pre-configured to use the ACK feedback resource in the random access conflict resolution message scheduled by the compact DCI; and as long as the random access conflict resolution message is obtained by the UE using the scheduling of the compact DCI, the ACK feedback resource pre-configured by the system is always used.

Hybrid Auto Retransmission Request Timing (HARQ Timing)
1. Determining a hybrid auto retransmission request timing based on a preset time interval, that is, after K time units (such as K time slots, but it may also be other time units, such as a OFDM symbol index, a symbol group index, and a subframe index) are preset, and then the ACK feedback is prepared to be sent, for example, if the time at which the correct PDCCH or PDSCH is received is the time slot N, the ACK feedback is sent on the corresponding time slot of N+K; or
2. Determining a hybrid auto retransmission request timing based on an index of searching the correct PDCCH (which may also be a CCE index, an index of a search space, an index of a control resource set) and a preset rule; if a reference time interval is preset to K time units, based on the index of searching the correct PDCCH, such as the fourth PDCCH, the hybrid auto retransmission request timing of the UE is K+4*T_step, wherein T_step is a preset time unit step size, if the time at which the correct PDCCH or PDSCH is received is time slot N, the ACK feedback is sent on the corresponding time slot at N+K+4*T_step.

Figure 43:
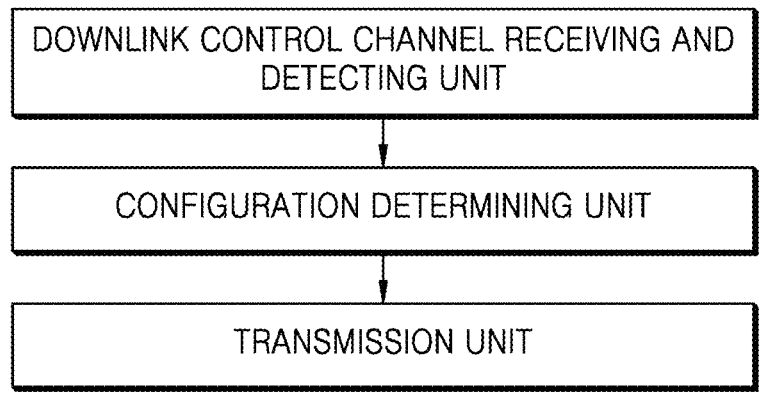
FIG. 43 is a diagram showing one example of a user equipment used for transmitting signals of the present disclosure.

This embodiment provides a user equipment (UE) for transmitting a signal according to the present disclosure, as illustrated in FIG. 43, the UE includes: a downlink control channel receiving and detecting unit, a configuration determining unit, and a transmission unit; wherein: the downlink control channel receiving and detecting unit is configured to detect a downlink control channel using a compact DCI format; the configuration determining unit is configured to acquire configuration information in a preconfigured manner when the user equipment correctly detected the downlink control channel using the compact DCI format; and the transmission unit is configured to perform an uplink transmission based on the configuration information.

Figure 44:
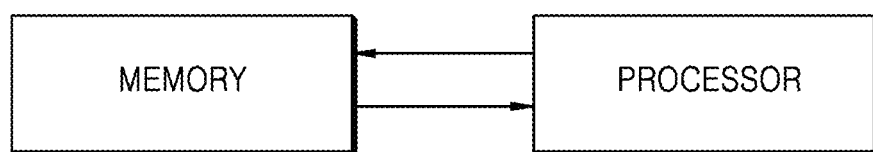
FIG. 44 is a diagram showing another example of a user equipment used for transmitting signals of the present disclosure.

The user equipment illustrated in FIG. 43 may correspond to the UE 4500 illustrated in FIG. 45. The transceiver 4510/processor 4505 of the UE 4500 may comprise the downlink control channel receiving and detecting unit and the transmission unit/the configuration determining unit of the user equipment illustrated in FIG. 43, or perform the operations performed by the downlink control channel receiving and detecting unit and the transmission unit/the configuration determining unit described herein, respectively. This embodiment further provides a user equipment for transmitting a signal according to the present disclosure, as illustrated in FIG. 44, the user equipment includes: a processor; and a memory configured to store machine readable instructions that, when executed by the processor, cause the processor to perform the foregoing method for transmitting a signal.

The "memory" herein may be any type suitable for the technical environment herein, and may be implemented using any suitable data storage technology, including but not limited to semiconductor-based memory devices, magnetic memory devices and systems, optical memory devices and systems, fixed memory and removable memory.

The processor herein may be of any type suitable for the technical environment herein, including but not limited to one or more of the following: a general purpose computer, a special purpose computer, a microprocessor, a digital signal processor DSP, and a processor based on a multi-core processor architecture.

FIG. 45 is a diagram showing a UE (User Equipment) according to an embodiment of the present disclosure.

The UEs described above may correspond to the UE 4500. For example, the user equipment 1400 illustrated in FIG. 14, the user equipment illustrated in FIG. 39, the user equipment illustrated in FIG. 43, and the user equipment illustrated in FIG. 44 may correspond to the UE 4500.

Referring to the FIG. 45, the UE 4500 may include a processor 4505, a transceiver 4510 and a memory 4515. However, all of the illustrated components are not essential. The UE 4500 may be implemented by more or less components than those illustrated in FIG. 45. In addition, the processor 4505 and the transceiver 4510 and the memory 4515 may be implemented as a single chip according to another embodiment.

The aforementioned components will now be described in detail.

The processor 4505 may include one or more processors or other processing devices that control the proposed function, process, and/or method. Operation of the UE 4500 may be implemented by the processor 1010.

The processor 1010 may detect a PDCCH on a configured control resource set. The processor 1010 determines a method for dividing CBs and a method for rate matching of a PDSCH according to the PDCCH. The processor 1010 may control the transceiver 4510 to receive the PDSCH according to the PDCCH. The processor 1010 may generate HARQ-ACK information according to the PDSCH. The processor 1010 may control the transceiver 4510 to transmit the HARQ-ACK information.

The transceiver 4510 may include a RF transmitter for up-converting and amplifying a transmitted signal, and a RF receiver for down-converting a frequency of a received signal. However, according to another embodiment, the transceiver 4510 may be implemented by more or less components than those illustrated in components.

The transceiver 4510 may be connected to the processor 1010 and transmit and/or receive a signal. The signal may include control information and data. In addition, the transceiver 4510 may receive the signal through a wireless channel and output the signal to the processor 1010. The transceiver 4510 may transmit a signal output from the processor 1010 through the wireless channel.

The memory 4515 may store the control information or the data included in a signal obtained by the UE 4500. The memory 4515 may be connected to the processor 1010 and store at least one instruction or a protocol or a parameter for the proposed function, process, and/or method. The memory 4515 may include read-only memory (ROM) and/or random access memory (RAM) and/or hard disk and/or CD-ROM and/or DVD and/or other storage devices.

Figure 46:
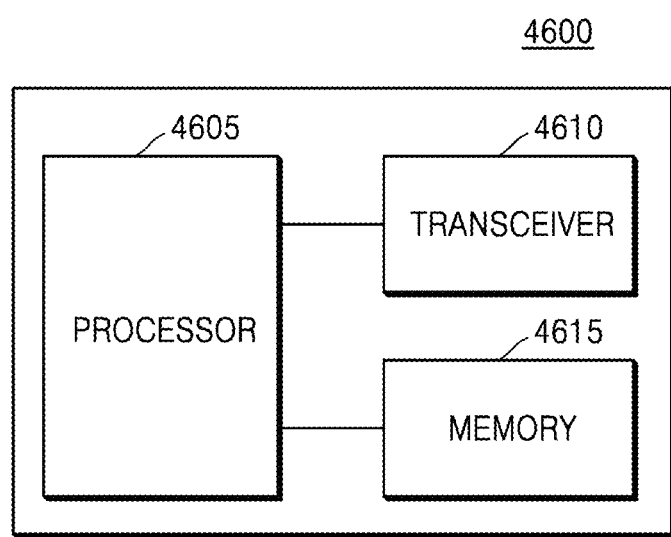
FIG. 46 is a diagram showing a BS according to an embodiment of the present disclosure.

FIG. 46 is a diagram showing a BS (Base Station) according to an embodiment of the present disclosure.

The BSs described above may correspond to the BS 4600.

Referring to the FIG. 46, the BS 4600 may include a processor 4605, a transceiver 4610 and a memory 4615. However, all of the illustrated components are not essential. The BS 4600 may be implemented by more or less components than those illustrated in FIG. 46. In addition, the processor 4605 and the transceiver 4610 and the memory 4615 may be implemented as a single chip according to another embodiment.

The aforementioned components will now be described in detail.

The processor 4605 may include one or more processors or other processing devices that control the proposed function, process, and/or method. Operation of the BS 4600 may be implemented by the processor 1010.

The processor 1010 may detect a PDCCH on a configured control resource set. The processor 1010 determines a method for dividing CBs and a method for rate matching of a PDSCH according to the PDCCH. The processor 1010 may control the transceiver 4610 to receive the PDSCH according to the PDCCH. The processor 1010 may generate HARQ-ACK information according to the PDSCH. The processor 1010 may control the transceiver 4610 to transmit the HARQ-ACK information.

The transceiver 4610 may include a RF transmitter for up-converting and amplifying a transmitted signal, and a RF receiver for down-converting a frequency of a received signal. However, according to another embodiment, the transceiver 4610 may be implemented by more or less components than those illustrated in components.

The transceiver 4610 may be connected to the processor 1010 and transmit and/or receive a signal. The signal may include control information and data. In addition, the transceiver 4610 may receive the signal through a wireless channel and output the signal to the processor 1010. The transceiver 4610 may transmit a signal output from the processor 1010 through the wireless channel.

A "computer readable medium" as used herein should be taken to include any medium or combination of media capable of storing instructions executed by a computer, a device capable of temporarily or permanently storing instructions and data, and may include, but is not limited to, a random access memory (RAM), a read only memory (ROM), a buffer memory, a flash memory, an optical media, a magnetic media, a cache memory, other types of memory (e.g., erasable programmable read-only memory (EE-PROM)) and/or any suitable combination thereof. A "computer readable medium" may refer to a single storage apparatus or device and/or a "cloud-based" storage system or storage network that includes a plurality of storage apparatus or device.

The terminology used herein is for the purpose of describing particular embodiments only and is not intended to be limiting of the disclosure. Furthermore, the terms "include", "comprise", etc. as used herein indicate the presence of stated features, steps, operations, and/or components but do not preclude the presence or addition of one or more other features, steps, operations, or components.

Each block in the flowcharts or block diagrams in the embodiments of the present disclosure may represent a hardware module, a program segment, or a part of code, and the above-mentioned module, program segment, or part of code may include one or more executable instructions for the implementation of the specified logic function. It should also be noted that in some alternative implementations, the functions annotated in the flowcharts and blocks may also occur in a different order than that annotated in the figures. For example, two consecutively represented blocks may actually be executed substantially in parallel, and they may sometimes be executed in the reverse order, depending on the function involved. It is also to be noted that each block in the block diagrams or the flowcharts, and combinations of blocks in the block diagrams and the flowcharts, may be implemented by a dedicated hardware-based system that performs specified functions or operations, or may be implemented by a combination of dedicated hardware and computer instructions.

The embodiments of the present disclosure have been described above. However, these embodiments are for illustrative purposes only and are not intended to limit the scope of the present disclosure. Although the respective embodiments are separately described above, this does not mean that the measures in the respective embodiments cannot be advantageously used in combination. The scope of the disclosure is defined by the appended claims and their equivalents. Numerous alternatives and modifications may be made by those skilled in the art without departing from the scope of the present disclosure, and such alternatives and modifications should all fall within the scope of the present disclosure.

The methods and apparatus provided by the present disclosure have been described in detail above. Variations of the specific embodiments and application scopes may be made by those skilled in the art in light of the concept of the embodiments of the present disclosure. In conclusion, the content of the specification should not be construed as limiting the disclosure.

The invention claimed is:

1. A method performed by a user equipment (UE) in a wireless communication system, the method comprising:
   receiving, from a base station (BS), downlink control information (DCI) for scheduling of uplink data, wherein the DCI includes interlace allocation information and resource block (RB) set allocation information;
   performing a carrier sensing on a plurality of RB sets, wherein the plurality of RB sets is identified based on the RB set allocation information included in the DCI; and
   transmitting, to the BS, the uplink data on at least one RB of the plurality of RB sets, based on the interlace allocation information and a result of the carrier sensing on the plurality of RBs,
   wherein the RB set allocation information indicates the plurality of RB sets is consecutive RB sets corresponding to a frequency bandwidth for the carrier sensing, and
   wherein the interlace allocation information includes a bitmap indicating whether frequency domain resource allocation units is allocated to the UE, and a size of the bitmap is a number of the frequency domain resource allocation units.

2. The method of claim 1, wherein the interlace allocation information comprises information bits indicating at least one interlace among a plurality of interlaces.

3. The method of claim 1, wherein the RB set allocation information comprises information about the plurality of RB sets for the carrier sensing.

4. A user equipment (UE) in a wireless communication system, the UE comprising:
   a transceiver; and
   at least one processor configured to:
      control the transceiver to receive, from a base station (BS), downlink control information (DCI) for scheduling of uplink data, wherein the DCI includes interlace allocation information and resource block (RB) set allocation information;
      perform a carrier sensing on a plurality of RB sets, wherein the plurality of RB sets is identified based on the RB set allocation information included in the DCI; and
      control the transceiver to transmit, to the BS, the uplink data on RB of the plurality of RB sets, based on the interlace allocation information and a result of the carrier sensing on the plurality of RB sets,
   wherein the RB set allocation information indicates the plurality of RB sets is consecutive RB sets corresponding to a frequency bandwidth for the carrier sensing, and
   wherein the interlace allocation information includes a bitmap indicating whether frequency domain resource allocation units is allocated to the UE, and a size of the bitmap is a number of the frequency domain resource allocation units.

5. The UE of claim 4, wherein the interlace allocation information comprises information bits indicating at least one interlace among a plurality of interlaces.

6. The UE of claim 4, wherein the RB set allocation information comprises information about the plurality of RB sets for the carrier sensing.

7. A method performed by a base station (BS) in a wireless communication system, the method comprising:
- transmitting, to a user equipment (UE), downlink control information (DCI) for scheduling of uplink data, wherein the DCI includes interlace allocation information and resource block (RB) set allocation information; and
- receiving, from the UE, the uplink data on RB of a plurality of RB sets,
- wherein the uplink data is received from the UE, based on the interlace allocation information and a result of a carrier sensing of the UE on the plurality of RB sets,
- wherein the plurality of RB sets is identified based on the RB set allocation information included in the DCI,
- wherein the RB set allocation information indicates the plurality of RB sets is consecutive RB sets corresponding to a frequency bandwidth for the carrier sensing, and
- wherein the interlace allocation information includes a bitmap indicating whether frequency domain resource allocation units is allocated to the UE, and a size of the bitmap is a number of the frequency domain resource allocation units.

8. The method of claim 7, wherein the interlace allocation information comprises information bits indicating at least one interlace among a plurality of interlaces.

9. The method of claim 7, wherein the RB set allocation information comprises information about the plurality of RB sets for the carrier sensing.

10. A base station (BS) in a wireless communication system, the BS comprising:
- a transceiver; and
- at least one processor configured to:
  - control the transceiver to transmit, to a user equipment (UE), downlink control information (DCI) for scheduling of uplink data, wherein the DCI includes interlace allocation information and resource block (RB) set allocation information; and
  - control the transceiver to receive, from the UE, the uplink data on RB of a plurality of RB sets,
- wherein the uplink data is received from the UE, based on the interlace allocation information and a result of a carrier sensing of the UE on the plurality of RB sets,
- wherein the plurality of RB sets is identified based on the RB set allocation information included in the DCI,
- wherein the RB set allocation information indicates the plurality of RB sets is consecutive RB sets corresponding to a frequency bandwidth for the carrier sensing, and
- wherein the interlace allocation information includes a bitmap indicating whether frequency domain resource allocation units is allocated to the UE, and a size of the bitmap is a number of the frequency domain resource allocation units.

11. The BS of claim 10, wherein the interlace allocation information comprises information bits indicating at least one interlace among a plurality of interlaces.

12. The BS of claim 10, wherein the RB set allocation information comprises information about the plurality of RB sets for the carrier sensing.

* * * * *